(12) United States Patent
Ye et al.

(10) Patent No.: US 11,883,966 B2
(45) Date of Patent: Jan. 30, 2024

(54) METHOD AND COMPUTING SYSTEM FOR PERFORMING OBJECT DETECTION OR ROBOT INTERACTION PLANNING BASED ON IMAGE INFORMATION GENERATED BY A CAMERA

(71) Applicant: Mujin, Inc., Tokyo (JP)

(72) Inventors: Xutao Ye, Tokyo (JP); Puttichai Lertkultanon, Tokyo (JP); Rosen Nikolaev Diankov, Tokyo (JP)

(73) Assignee: MUJIN, INC., Tokyo (JP)

( * ) Notice: Subject to any disclaimer, the term of this patent is extended or adjusted under 35 U.S.C. 154(b) by 481 days.

(21) Appl. No.: 17/116,436

(22) Filed: Dec. 9, 2020

(65) Prior Publication Data

US 2021/0178593 A1   Jun. 17, 2021

Related U.S. Application Data

(60) Provisional application No. 62/946,973, filed on Dec. 12, 2019.

(51) Int. Cl.
*B25J 19/02* (2006.01)
*B25J 9/16* (2006.01)
(Continued)

(52) U.S. Cl.
CPC ........... *B25J 9/1697* (2013.01); *B25J 9/1612* (2013.01); *B25J 9/1653* (2013.01); *B25J 9/1664* (2013.01);
(Continued)

(58) Field of Classification Search
CPC ...... B25J 9/1697; B25J 9/1612; B25J 9/1653; B25J 9/1664; B25J 9/1669; B25J 9/1671;
(Continued)

(56) References Cited

U.S. PATENT DOCUMENTS 9,507,995 B2* 11/2016 Konolige ................ G06T 7/521
2018/0126553 A1* 5/2018 Corkum ................. B25J 9/1697
(Continued)

FOREIGN PATENT DOCUMENTS

JP        6-71088 U     10/1994
JP        7-286820 A    10/1995
(Continued)

OTHER PUBLICATIONS

Chinese Office Action dated Sep. 1, 2021 in corresponding Chinese Patent Application No. 202110433348.X.
(Continued)

*Primary Examiner* — Jonathan L Sample
*Assistant Examiner* — Mohammed Yousef Abuelhawa
(74) *Attorney, Agent, or Firm* — MEDLER FERRO WOODHOUSE & MILLS PLLC

(57) ABSTRACT

A method and computing system for performing object detection are presented. The computing system may be configured to: receive first image information that represents at least a first portion of an object structure of an object in a camera's field of view, wherein the first image information is associate with a first camera pose; generate or update, based on the first image information, sensed structure information representing the object structure; identify an object corner associated with the object structure; cause the robot arm to move the camera to a second camera pose in which the camera is pointed at the object corner; receive second image information associated with the second camera pose; update the sensed structure information based on the second image information; determine, based on the updated sensed structure information, an object type associated with the object; determine one or more robot interaction locations based on the object type.

20 Claims, 38 Drawing Sheets

(51) Int. Cl.
| | |
|---|---|
| *G06T 7/73* | (2017.01) |
| *B25J 13/08* | (2006.01) |
| *B25J 15/00* | (2006.01) |
| *B65G 59/02* | (2006.01) |
| *G05B 19/4155* | (2006.01) |
| *G06T 7/60* | (2017.01) |
| *G06F 18/2413* | (2023.01) |
| *H04N 23/54* | (2023.01) |
| *H04N 23/695* | (2023.01) |
| *G06V 10/764* | (2022.01) |
| *G06V 20/10* | (2022.01) |

(52) U.S. Cl.
CPC ........... *B25J 9/1669* (2013.01); *B25J 9/1671* (2013.01); *B25J 13/08* (2013.01); *B25J 15/0061* (2013.01); *B25J 19/023* (2013.01); *B65G 59/02* (2013.01); *G05B 19/4155* (2013.01); *G06F 18/2413* (2023.01); *G06T 7/60* (2013.01); *G06T 7/74* (2017.01); *G06V 10/764* (2022.01); *G06V 20/10* (2022.01); *H04N 23/54* (2023.01); *H04N 23/695* (2023.01); *G05B 2219/40269* (2013.01); *G06T 2207/10028* (2013.01); *G06T 2207/20164* (2013.01); *G06T 2207/30244* (2013.01)

(58) Field of Classification Search
CPC . B25J 13/08; G06T 7/74; G06V 20/10; G06V 10/764; H04N 23/695; H04N 23/54; G06F 18/2413
See application file for complete search history.

(56) References Cited

U.S. PATENT DOCUMENTS

| | | |
|---|---|---|
| 2019/0033837 A1 | 1/2019 | Zanger et al. |
| 2020/0372287 A1* | 11/2020 | Sawhney ............. G06V 10/507 |
| 2021/0171283 A1* | 6/2021 | Deacon ..................... G06T 7/60 |

FOREIGN PATENT DOCUMENTS

| | | |
|---|---|---|
| KR | 10-2017-0031252 A | 3/2017 |
| KR | 10-2017-0131635 A | 11/2017 |
| KR | 10-2019-0102250 A | 9/2019 |
| WO | 2019/041952 A1 | 3/2019 |
| WO | 2019/097004 A1 | 5/2019 |

OTHER PUBLICATIONS

International Search Report dated Apr. 7, 2021 in corresponding International Patent Application No. PCT/US2020/063938.
Written Opinion dated Apr. 7, 2021 i in corresponding International Patent Application No. PCT/US2020/063938.

* cited by examiner

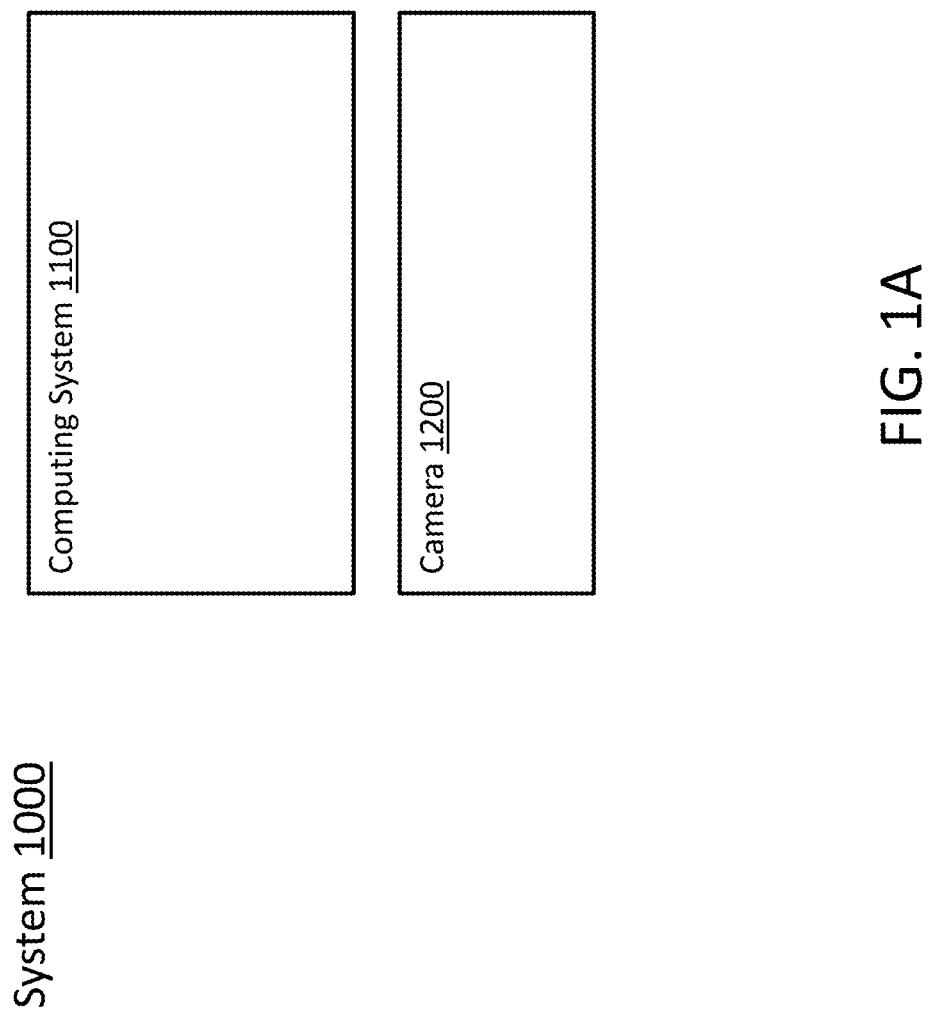

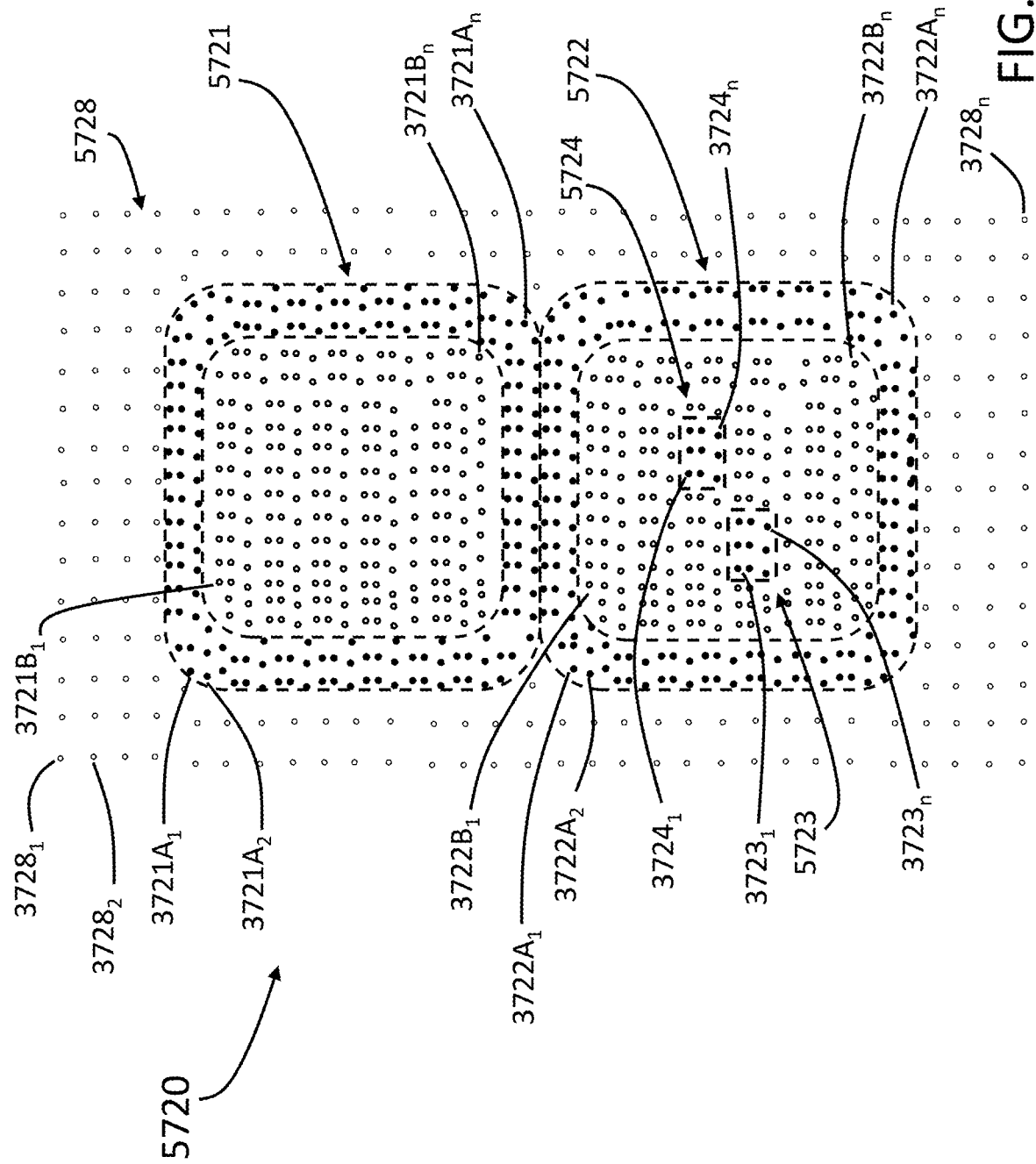

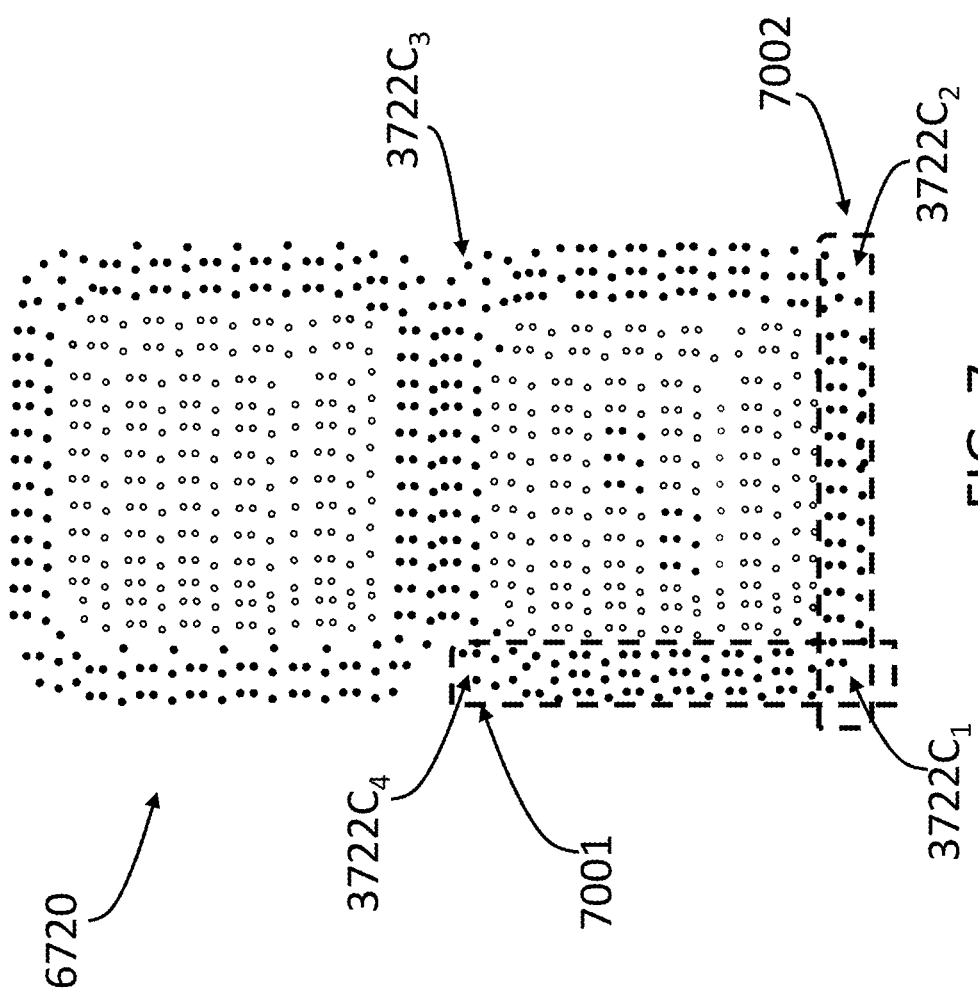

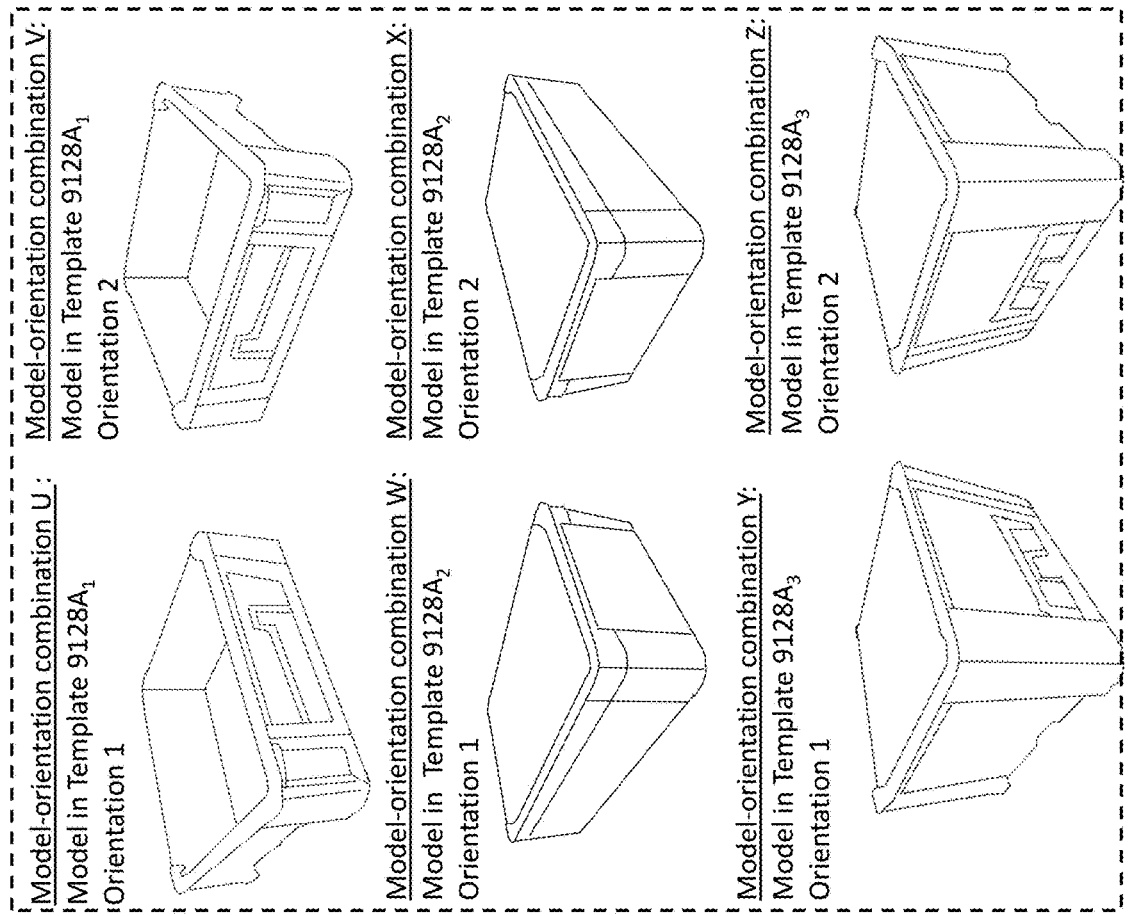
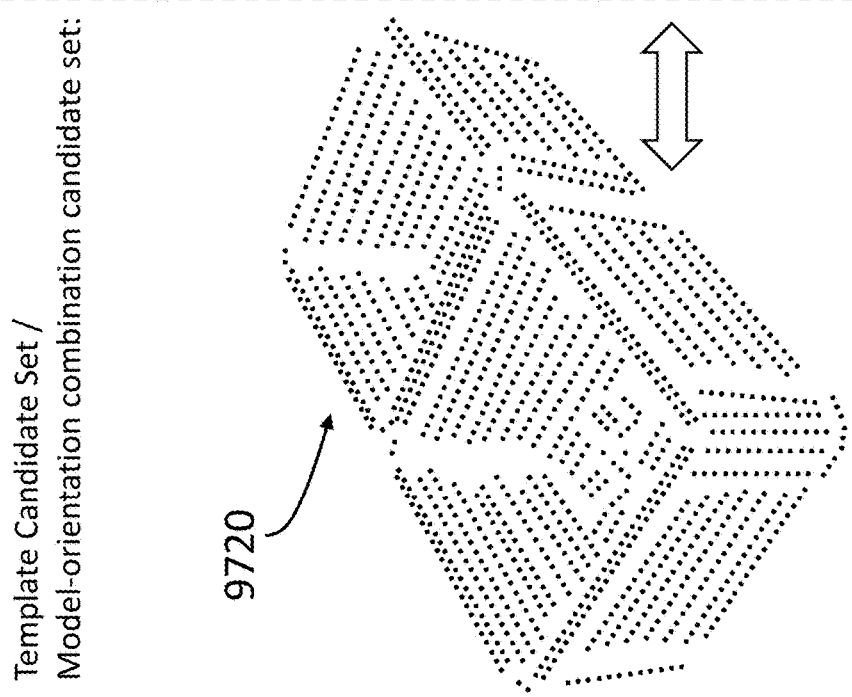
FIG. 12A

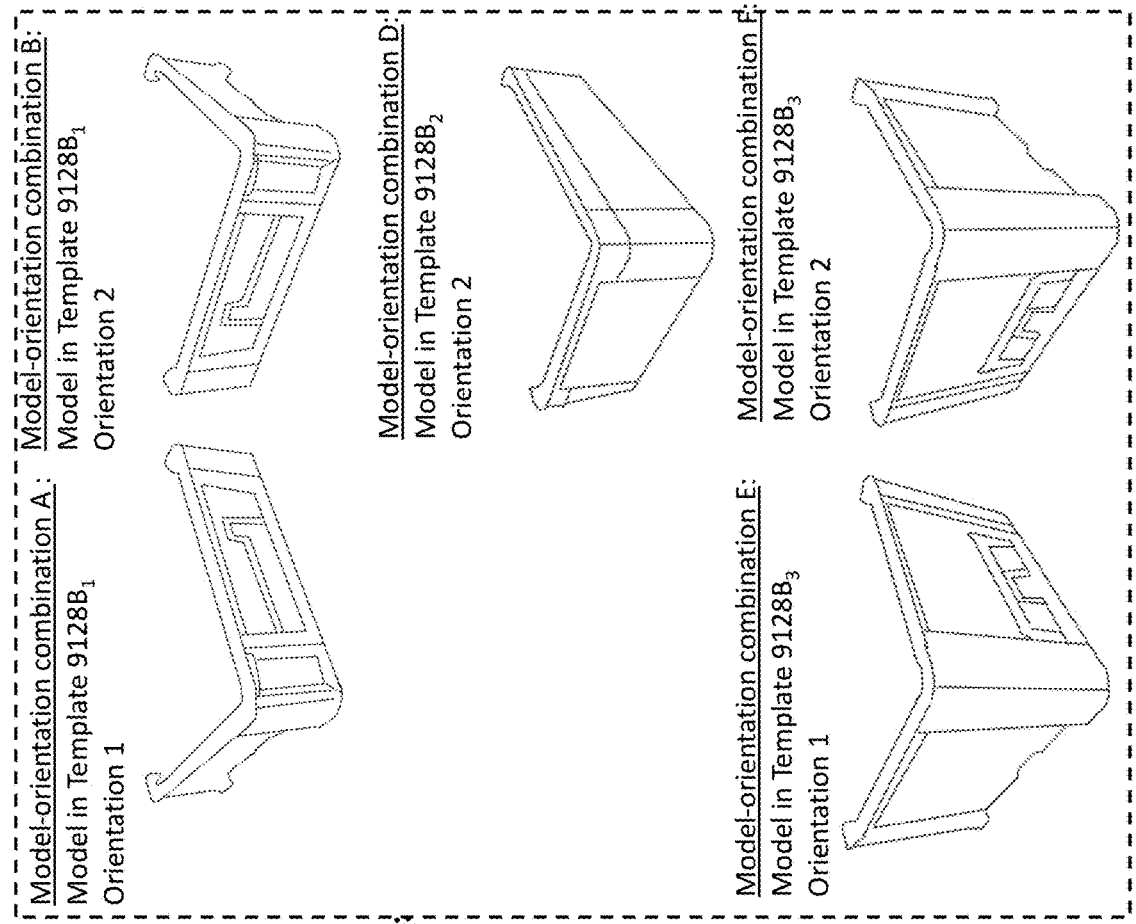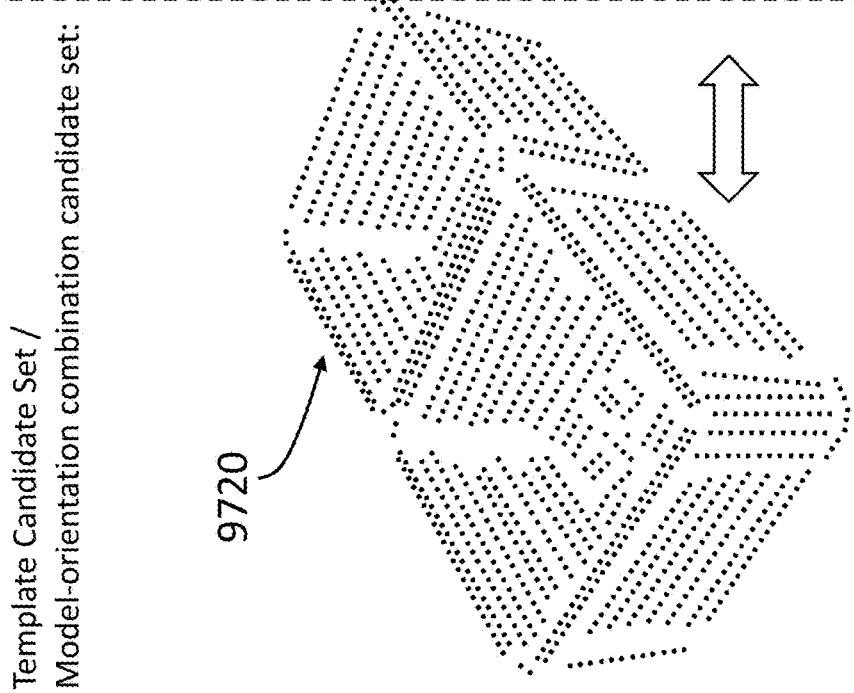
FIG. 13B

METHOD AND COMPUTING SYSTEM FOR PERFORMING OBJECT DETECTION OR ROBOT INTERACTION PLANNING BASED ON IMAGE INFORMATION GENERATED BY A CAMERA

CROSS-REFERENCE TO RELATED APPLICATION(S)

The present application claims the benefit of U.S. Provisional Application No. 62/946,973, entitled "ROBOTIC SYSTEM WITH GRIPPING MECHANISM," and filed Dec. 12, 2019, the entire content of which is incorporated by reference herein.

FIELD OF THE INVENTION

The present disclosure is related to a method and computing system for performing object detection or planning of robot interaction based on image information generated by a camera.

BACKGROUND OF THE INVENTION

As automation becomes more common, robots are being used in more environments, such as in warehousing and retail environments. For instance, robots may be used to interact with merchandise or other objects in a warehouse. The movement of the robot may be fixed, or may be based on an input, such as information generated by a sensor in the warehouse.

SUMMARY

One aspect of the present disclosure relates to a method performed by a computing system for performing object detection. In some instances, the computing system may include a non-transitory computer-readable medium having instructions which cause the computing system to perform the method. In an embodiment, the computing system may comprise a communication interface and at least one processing circuit. The communication interface is configured to communicate with: (i) a robot having a robot arm and an end effector apparatus disposed at or forming one end of the robot arm, and (ii) a camera mounted on the robot arm and having a camera field of view. The at least one processing circuit is configured, when an object is in the camera field of view, to perform the following: receiving first image information that represents at least a first portion of an object structure associated with the object, wherein the first image information is generated by the camera when the camera is in a first camera pose in which the camera is pointed at the first portion of the object structure; generating or updating, based on the first image information, sensed structure information that represents the object structure associated with the object; identifying, based on the sensed structure information, an object corner associated with the object structure; outputting one or more camera placement movement commands which, when executed by the robot, causes the robot arm to move the camera to a second camera pose in which the camera is pointed at the object corner; receiving second image information for representing the object structure, wherein the second image information is generated by the camera while the camera is in the second camera pose; updating the sensed structure information based on the second image information to generate updated sensed structure information; determining, based on the updated sensed structure information, an object type associated with the object; determining one or more robot interaction locations based on the object type, wherein the one or more robot interaction locations are one or more locations for interaction between the end effector apparatus and the object; and output one or more robot interaction movement commands for causing the interaction at the one or more robot interaction locations, wherein the one or more robot interaction movement commands are generated based on the one or more robot interaction locations.

BRIEF DESCRIPTION OF THE FIGURES

FIGS. 1A-1D illustrate a system for processing image information consistent with embodiments hereof.

FIGS. 5A-5C illustrate various aspects of generating image information for representing an object in a camera field of view, according to an embodiment hereof.

FIG. 7 illustrates an aspect of identifying an object corner, according to an embodiment hereof.

FIGS. 12A and 12B illustrate a comparison between sensed structure information and a set of object recognition templates, according to an embodiment hereof.

FIGS. 13A-13C illustrate various aspects of a filtering operation for a candidate set of object recognition templates or model-orientation combinations, according to an embodiment hereof.

DETAILED DESCRIPTION OF THE FIGURES

Figure 1B:
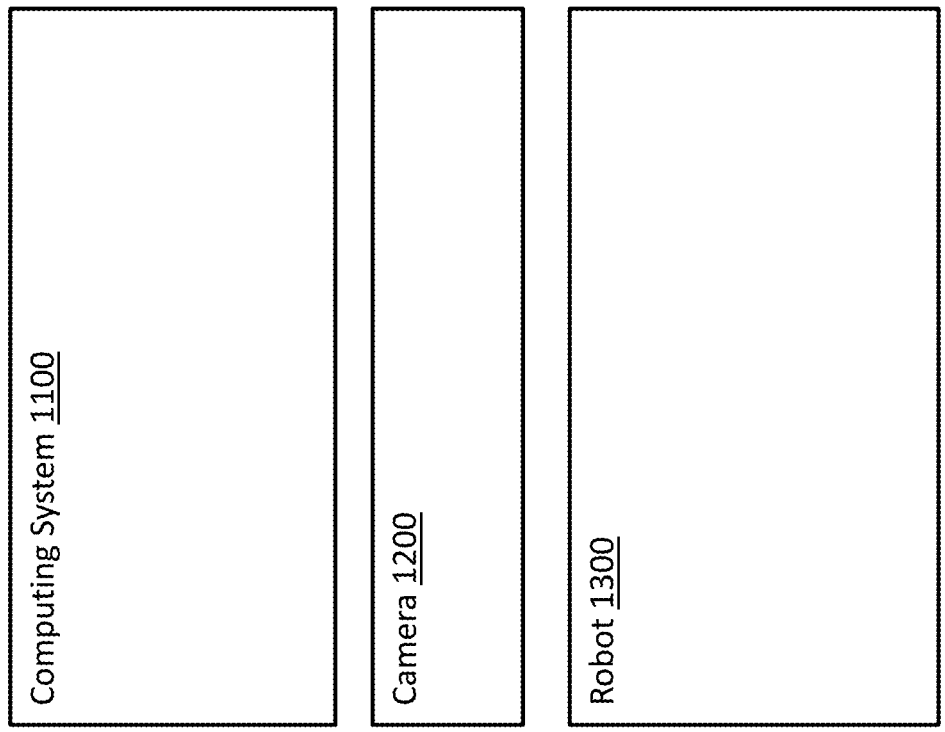

One aspect of the present disclosure relates to performing object detection for an object in a field of view of a camera (also referred to as a camera field of view). For instance, the object may be a box, bin, crate, or other container in a warehouse, retail space, or other premises. In an embodiment, performing the object detection may involve determining a characteristic of the object, such as an object type associated with the object. One aspect of the present disclosure relates to planning robot interaction based on information obtained via performing object detection. The robot interaction may involve, e.g., a robot engaging with the object in the camera field of view, such as an interaction in which the robot grips or otherwise picks up the object and moving the object to a destination location (e.g., as part of a de-palletization operation).

In an embodiment, the object detection may be performed based on multiple sets of image information generated by a camera, wherein the multiple sets of image information may represent multiple views or viewpoints from which the camera senses or otherwise generates image information for representing an object in the camera field of view. For instance, the multiple sets of image information may include a first set of image information that represents a top view of an object, and a second set of image information that represents a perspective view of the object. In some implementations, the top view of the object may be used to perform rough detection, which may involve obtaining image information which has a sufficient level of detail to identify an object corner of the object. The camera may be moved or otherwise positioned so as to point at the identified object corner, and the second set of image information that represents the perspective view may be generated when the camera is pointed at the object corner. In some instances, the second image information may, relative to the first image information, include a greater level of detail for a structure of the object. In such instances, the second image information may be used to refine a description of an estimate of the structure of the object. In some implementations, the first image information and the second image information may be used to generated sensed structure information, such as a global point cloud, which represents the structure of the object.

In an embodiment, performing the object detection may involve comparing the sensed structure information with a set of object recognition templates, or more specifically with a set of respective object structure models (e.g., CAD models) described by the set of object recognition templates. The comparison may be used to, e.g., select one of the object recognition templates, wherein the selected object recognition template may be associated with the object type for the object. In some instances, the comparison may take into account different orientations for the object structure models. In such instances, the structure information may be compared against a set of model-orientation combinations, each of which may include an object structure model and an orientation for the object structure model.

In an embodiment, selecting an object recognition template or a model-orientation combination may involve calculating a set of error values. Each of the error values may indicate a respective degree of deviation between the sensed structure information and an object structure model in one of the object recognition templates or model-orientation combinations. More particularly, each of the error values may indicate how well or how poorly a particular object structure model is explained or supported by the sensed structure information (e.g., global point cloud). In some instances, the selected object recognition template may have a lowest error value among the set of error values.

In an embodiment, a filtering operation may be performed to remove certain object recognition templates or model-orientation combinations from being considered as potential matches to the sensed structure information. For instance, the sensed structure information may define an estimated region of space occupied by the object in the camera field of view. In such implementations, the filtering operation may involve determining whether any of the object recognition templates or model-orientation combinations have an object structure model which fails to substantially fit within the estimated region. If there is such an object structure model, the object recognition template or model-orientation combination associated with the object structure model may be filtered out.

In an embodiment, a pose refinement operation may be performed to adjust an object structure model, to cause it to more closely match sensed structure information. In some instances, the object structure model may describe various physical features of an object structure, and more specifically may include pose information that describe poses of the physical features. In such instances, the pose refinement operation may involve adjusting the pose information, which may change an orientation and/or location of the various physical features described by the object structure model.

In an embodiment, the object type associated with an object may be used to plan a robot interaction with the object. For instance, the object type may be associated with a particular object design, which may include a physical design and/or visual design for a type or class of objects. In some implementations, the physical design, such as a physical shape or size of an object structure, may be used to plan the robot interaction. In an embodiment, if the robot interaction involves the robot gripping the object, then planning the robot interaction may involve determining one or more gripping locations on the object at which the robot is to grip the object. In some instances, if determining an object type is based on selecting an object recognition template associated with the object type, the one or more robot gripping locations may be determined based on the object recognition template, or more specifically based on an object structure model described by the object recognition template.

FIG. 1A illustrates a system 1000 for performing object detection and/or planning robot interaction based on image information. More particularly, the system 1000 may include a computing system 1100 and a camera 1200. In this example, the camera 1200 may be configured to generate image information which describes or otherwise represents an environment in which the camera 1200 is located, or more specifically represents an environment in the camera 1200's field of view (also referred to as a camera field of view). The environment may be, e.g., a warehouse, a manufacturing plant, a retail space, or some other premises (the term "or" in this disclosure is used interchangeably with "and/or"). In such cases, the image information may represent objects located at such premises, such as containers (e.g., boxes) holding various items. The computing system 1100 may be configured to receive and process the image information, such as by performing object detection based on the image information. The object detection may involve, e.g., determining an object's type (also referred to as object type) for an object that is in the camera field of view. In some instances, the computing system may plan robot interaction based on the object type. The robot interaction may involve, e.g., a robot gripping, grasping, or otherwise picking up or engaging the object. For example, if the object is a container, the robot interaction may involve the robot picking up the container by gripping or grasping the container, and moving the container to a destination location. The computing system 1100 and the camera 1200 may be located at the same premises, or may be located remotely from each other. For instance, the computing system 1100 may be part of a cloud computing platform hosted in a data center which is remote from the warehouse or retail space, and may be communicating with the camera 1200 via a network connection.

In an embodiment, the camera 1200 may be a 3D camera (also referred to as a spatial structure sensing camera or spatial structure sensing device) that is configured to generate 3D image information (also referred to as spatial structure information) regarding an environment in the camera's field of view. In an embodiment, the camera 1200 may be a 2D camera that is configured to generate 2D image information, or more specifically a 2D image, which describes a visual appearance of the environment in the camera's field of view. In some instances, the camera 1200 may be a combination of a 3D camera and a 2D camera that is configured to generate 3D image information and 2D image information. The 3D image information may include depth information which describes respective depth values of various locations relative to the camera 1200, such as locations on surfaces of various objects in the camera 1200's field of view, or more specifically locations on the structures of those objects. The depth information in this example may be used to estimate how the objects are spatially arranged in three-dimensional (3D) space. In some instances, the 3D image information may include a point cloud that describes locations on one or more surfaces of an object in the camera's field of view. More specifically, the 3D image information may describe various locations on a structure of the object (also referred to as an object structure).

As stated above, the camera 1200 may be a 3D camera and/or a 2D camera. The 2D camera may be configured to generate a 2D image, such as a color image or a grayscale image, or other 2D image information. The 3D camera may be, e.g., a depth-sensing camera, such as a time-of-flight (TOF) camera or a structured light camera, or any other type of 3D camera. In some cases, the 2D camera and/or 3D camera may each include an image sensor, such as a charge coupled devices (CCDs) sensor and/or complementary metal oxide semiconductors (CMOS) sensor. In an embodiment, the 3D camera may include lasers, a LIDAR device, an infrared device, a light/dark sensor, a motion sensor, a microwave detector, an ultrasonic detector, a RADAR detector, or any other device configured to capture or otherwise generate 3D image information.

In an embodiment, the system 1000 may be a robot operation system for interacting with various objects in the environment of the camera 1200. For example, FIG. 1B illustrates a robot operation system 1000A, which may be an embodiment of the system 1000 of FIG. 1A. The robot operation system 1000A may include the computing system 1100, the camera 1200, and a robot 1300. In an embodiment, the robot 1300 may be used to interact with one or more objects in the environment of the camera 1200, such as with boxes, crates, cases, bins, or other containers. For example, the robot 1300 may be configured to pick up the containers from one location and move them to another location. In some scenarios, the robot 1300 may be used to perform a de-palletization operation in which a stack of containers are unloaded and moved to, e.g., a conveyor belt, or may be used to perform a palletization operation in which containers are stacked onto a pallet to prepare them for transport.

Figure 1C:
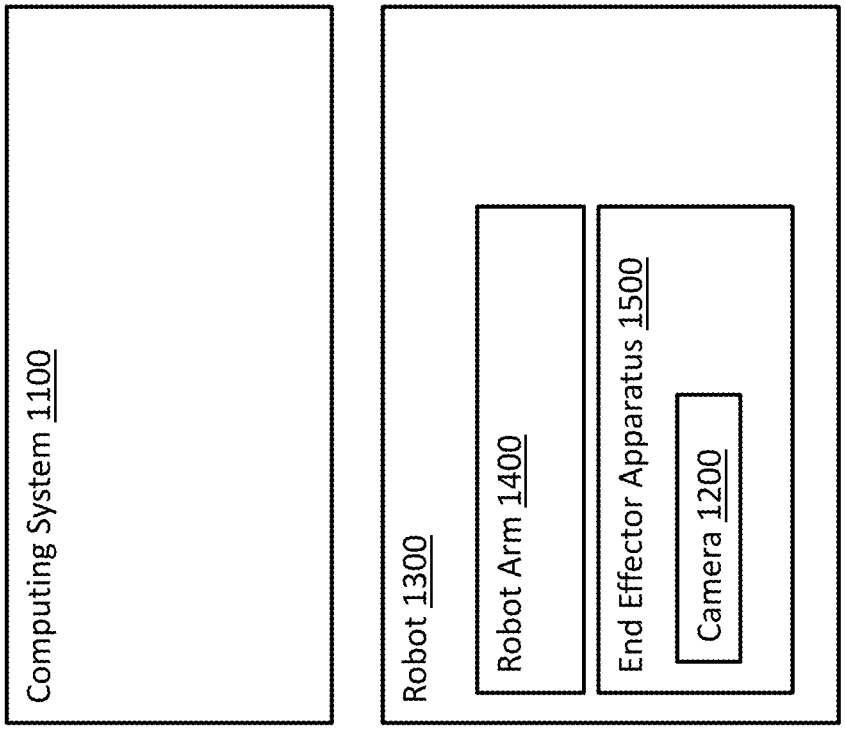

In some instances, the camera 1200 may be separate from the robot 1300. For example, the camera 1200 in such instances may be a stationary camera that is mounted on a ceiling or some other location at a warehouse or other premises. In some instances, the camera 1200 may be part of or otherwise attached to the robot 1300, which may provide the robot 1300 with an ability to move the camera 1200. For example, FIG. 1C depicts a system 1000B (which may be an embodiment of the system 1000) that includes the computing system 1100, camera 1200, and robot 1300 of FIG. 1B, and in which the robot 1300 has a robot arm 1400 and an end effector apparatus 1500. The end effector apparatus 1500 may be attached to, disposed at, or form one end of the robot arm 1400. In the embodiment of FIG. 1C, the end effector apparatus 1500 may be movable via motion of the robot arm 1400. The camera 1200 in this example may be mounted on or otherwise attached to the end effector apparatus 1500. If the end effector apparatus 1500 is a robot hand (e.g., a gripper apparatus), the camera 1200 may be referred to as an on-hand camera. By attaching the camera 1200 to the end effector apparatus 1500, the robot 1300 may be able to move the camera 1200 to different poses (also referred to as camera poses) via motion of the robot arm 1400 and/or end effector apparatus 1500. For example, as discussed below in more detail, the end effector apparatus 1500 may position the camera 1200 to have various camera poses. The camera 1200 may generate respective sets of image information at these camera poses. In such an example, the respective sets of image information may represent different viewpoints or perspectives from which an environment of the camera 1200 and/or robot 1300 is sensed, wherein such image information may facilitate accurate object detection and planning of robot interaction.

In an embodiment, the computing system 1100 of FIGS. 1A-1C may form or be part of a robot control system (also referred to as a robot controller), which is part of the robot operation system 1000A/1000B. The robot control system may be a system that is configured to, e.g., generate movement commands or other commands for the robot 1300. In such an embodiment, the computing system 1100 may be configured to generate such commands based on, e.g., image information generated by the camera 1200.

In an embodiment, the computing system 1100 may form or be part of a vision system. The vision system may be a system which generates, e.g., vision information which describes an environment in which the robot 1300 is located, or more specifically describes an environment in which the camera 1200 is located. In some implementations, the vision information may include the image information discussed above. In some implementations, the vision information may describe an object type or other characteristic of an object in an environment of the camera 1200 and/or robot 1300. In such implementations, the computing system 1100 may generate such vision information based on the image information. If the computing system 1100 forms a vision system, the vision system may be part of the robot control system discussed above, or may be separate from the robot control system. If the vision system is separate from the robot control system, the vision system may be configured to output information describing the environment in which the robot 1300 is located, such as the information describing the object type or other characteristic of an object in the environment of the camera 1200 and/or robot 1300. The information determined by the vision system may be outputted to the robot control system, which may receive such information from the vision system and control movement of the robot 1300 based on the information.

In an embodiment, if the computing system 1100 is configured to generate one or more movement commands, the movement commands may include, e.g., a camera placement movement command and/or a robot interaction movement command. In this embodiment, the camera placement movement command may be a movement command used to control placement of the camera 1200, and more specifically to cause the robot 1300 to move or otherwise position the camera 1200 to a particular camera pose, wherein the camera pose may include a combination of a particular camera location and a particular camera orientation. The robot interaction movement command (also referred to as an object interaction movement command) may be used to control interaction between the robot 1300, or more specifically an end effector apparatus thereof, and one or more objects, such as a stack of containers in a warehouse. For instance, the robot interaction movement command may cause the robot arm 1400 of the robot 1300 in FIG. 1C to move the end effector apparatus 1500 to approach one of the containers, cause the end effector apparatus 1500 to grip or otherwise pick up the container, and then cause the robot arm 1400 to move the container to a specified or calculated destination location. If the end effector apparatus 1500 has a gripper member, the robot interaction movement command may in some implementations include a gripper member positioning command that causes movement of the gripper member relative to the rest of the end effector apparatus, so as to place or otherwise position the gripper member to a location from which it will grip a portion (e.g., rim) of the container.

In an embodiment, the computing system 1100 may communicate with the camera 1200 and/or with the robot 1300 via a direct wired connection, such as a connection provided via a dedicated wired communication interface, such as a RS-232 interface, a universal serial bus (USB) interface, and/or via a local computer bus, such as a peripheral component interconnect (PCI) bus. In some implementations, the computing system 1100 may communicate with the camera 1200 and/or with the robot 1300 via a wireless communication interface. In an embodiment, the computing system 1100 may communicate with the camera 1200 and/or with the robot 1300 via a network. The network may be any type and/or form of network, such as a personal area network (PAN), a local-area network (LAN), e.g., Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

Figure 1D:

In an embodiment, the computing system 1100 may communicate information directly with the camera 1200 and/or with the robot 1300, or may communicate via an intermediate storage device, or more generally an intermediate non-transitory computer-readable medium. For instance, FIG. 1D depicts a system 1000C (which may be an embodiment of the system 1000/1000A/1000B) that includes an intermediate non-transitory computer-readable medium 1600 for storing information generated by the camera 1200, the robot 1300, and/or by the computing system 1100. Such an intermediate non-transitory computer-readable medium 1600 may be external to the computing system 1100, and may act as an external buffer or repository for storing, e.g., image information generated by the camera 1200, storing commands generated by the computing system 1100, and/or other information (e.g., sensor information generated by the robot 1300). For example, if the intermediate non-transitory computer-readable medium 1600 is used to store the image information generated by the camera 1200, the computing system 1100 may retrieve or otherwise receive the image information from the intermediate non-transitory computer-readable medium 1600. Examples of the non-transitory computer readable medium 1600 include an electronic storage device, a magnetic storage device, an optical storage device, an electromagnetic storage device, a semiconductor storage device, or any suitable combination thereof. The non-transitory computer-readable medium may form, e.g., a computer diskette, a hard disk drive (HDD), a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), and/or a memory stick.

As stated above, the image information generated by the camera 1200 may be processed by the computing system 1100. In an embodiment, the computing system 1100 may include or be configured as a server (e.g., having one or more server blades, processors, etc.), a personal computer (e.g., a desktop computer, a laptop computer, etc.), a smartphone, a tablet computing device, and/or other any other computing system. In an embodiment, any or all of the functionality of the computing system 1100 may be performed as part of a cloud computing platform. The computing system 1100 may be a single computing device (e.g., a desktop computer), or may include multiple computing devices.

Figure 2A:
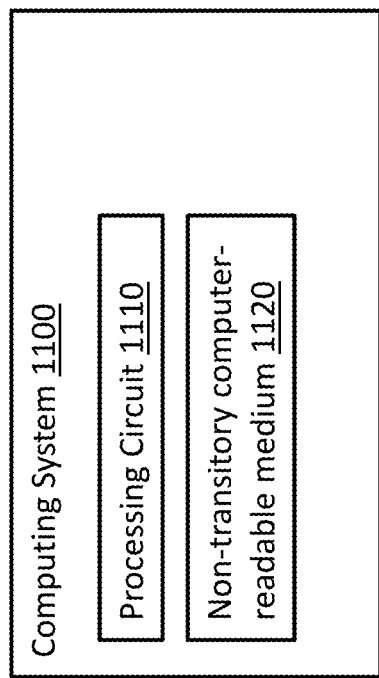
FIGS. 2A-2D provide block diagrams that illustrate a computing system configured for receiving and processing image information and/or for performing object detection consistent with embodiments hereof.

FIG. 2A provides a block diagram that illustrates an embodiment of the computing system 1100. The computing system 1100 includes at least one processing circuit 1110 and a non-transitory computer-readable medium (or media) 1120. In an embodiment, the processing circuit 1110 includes one or more processors, one or more processing cores, a programmable logic controller ("PLC"), an application specific integrated circuit ("ASIC"), a programmable gate array ("PGA"), a field programmable gate array ("FPGA"), any combination thereof, or any other processing circuit. In an embodiment, the non-transitory computer-readable medium 1120, which is part of the computing system 1100, may be an alternative or addition to the intermediate non-transitory computer-readable medium 1600 discussed above. The non-transitory computer-readable medium 1120 may be a storage device, such as an electronic storage device, a magnetic storage device, an optical storage device, an electromagnetic storage device, a semiconductor storage device, or any suitable combination thereof, for example, such as a computer diskette, a hard disk drive (HDD), a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, any combination thereof, or any other storage device. In some instances, the non-transitory computer-readable medium 1120 may include multiple storage devices. In certain cases, the non-transitory computer-readable medium 1120 is configured to store image information generated by the camera 1200. The non-transitory computer-readable medium 1120 may alternatively or additionally store computer readable program instructions that, when executed by the processing circuit 1110, causes the processing circuit 1110 to perform one or more methodologies described herein, such as the operation described with respect to FIG. 4.

Figure 2B:
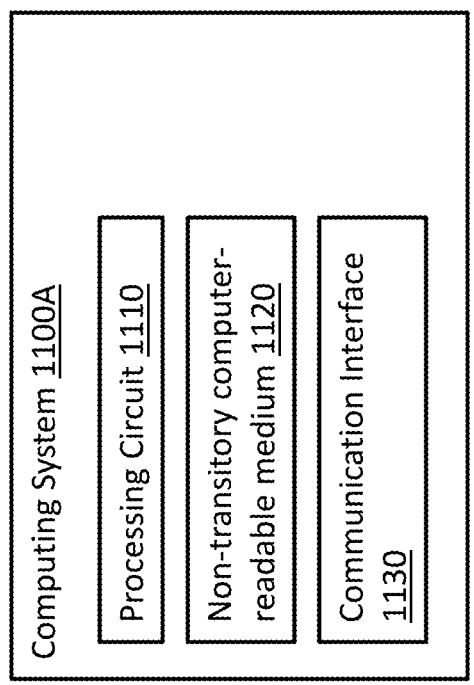

FIG. 2B depicts a computing system 1100A that is an embodiment of the computing system 1100 and includes a communication interface 1130. The communication interface 1130 (also referred to as a communication component or communication device) may be configured to, e.g., receive image information generated by the camera 1200 of FIGS. 1A-1D. The image information may be received via the intermediate non-transitory computer-readable medium 1600 or the network discussed above, or via a more direct connection between the camera 1200 and the computing system 1100/1100A. In an embodiment, the communication interface 1130 may be configured to communicate with the robot 1300 of FIGS. 1B and 1C. If the computing system 1100 is not part of a robot control system, the communication interface 1130 of the computing system 1100 may be configured to provide communication between the computing system 1100 and the robot control system. The communication interface 1130 may include or may be, e.g., a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof.

Figure 2C:
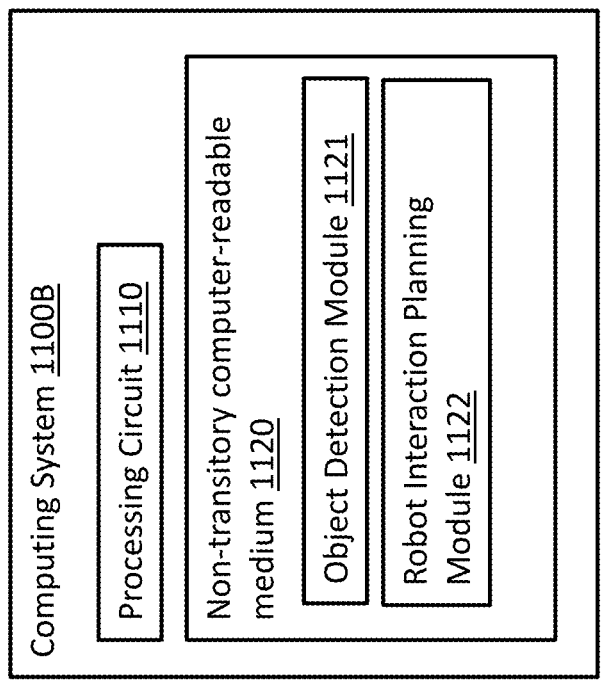

In an embodiment, the processing circuit 110 may be programmed by one or more computer-readable program instructions stored on the non-transitory computer-readable medium 1120. For example, FIG. 2C illustrates a computing system 1100B, which is an embodiment of the computing system 1100/1100A, in which the processing circuit 1110 is programmed by one or more modules, including an object detection module 1121 and a robot interaction planning module 1122.

In an embodiment, the object detection module 1121 may be configured to determine information associated with an object (e.g., a container) which is currently or has been in a camera field of view of the camera 1200 of FIGS. 1A-1D. The information may describe a characteristic of the object, such as a type or class of objects to which the object belongs (also referred to as an object type associated with the object), a size of the object, a shape of the object (also referred to as an object size and an object shape, respectively), and/or any other characteristic of the object. In some implementations the object detection module 1121 may be configured to perform object recognition by comparing image information that represents the object against object recognition templates, as discussed below in more detail.

In an embodiment, the robot interaction planning module 1122 may be configured to determine how the robot 1300 of FIGS. 1B and 1C is to interact with an object in an environment of the robot 1300 and/or of the camera 1200, or more specifically an object that is or has been in the camera field of view. The interaction may involve, e.g., the robot 1300 gripping or otherwise picking up the object and moving the object to a destination location. In some instances, the robot interaction planning module 1122 may be configured to generate a motion plan to implement or execute the interaction. The motion plan for interacting with the object may be generated based on, e.g., information determined by the object detection module 1121, such as an object type associated with the object. In an embodiment, the motion plan may identify one or more gripping locations or gripping portions of the object at which the robot 1300 is to grip the object. The motion plan may further cause at least a portion of the robot 1300 (e.g., the end effector apparatus 1500) to be moved to the one or more gripping locations. In some instances, if the robot 1300, or more specifically the end effector apparatus 1500, includes one or more grippers, the robot interaction planning module 1122 may be configured to plan operation of the one or more grippers. More particularly, if the one or more grippers are able to transition from an open state to a closed state for gripping or otherwise engaging an object, and are able to transition from the closed state to the open state to release the object, the robot interaction planning module 1122 may be configured to control or otherwise determine when the one or more grippers transitions between the open state and the closed state. In some implementations, the motion plan may include or describe a trajectory for the robot 1300 or a portion thereof (e.g., end effector apparatus 1500) to follow after the robot 1300 has gripped or otherwise picked up the object. The trajectory may cause the robot 1300 to move the object to a desired destination location. It will be understood that the functionality of the modules as discussed herein is representative and not limiting.

In various embodiments, the terms "computer-readable instructions" and "computer-readable program instructions" are used to describe software instructions or computer code configured to carry out various tasks and operations. In various embodiments, the term "module" refers broadly to a collection of software instructions or code configured to cause the processing circuit 1110 to perform one or more functional tasks. The modules and computer-readable instructions may be described as performing various operations or tasks when a processing circuit or other hardware component is executing the modules or computer-readable instructions.

Figure 2D:
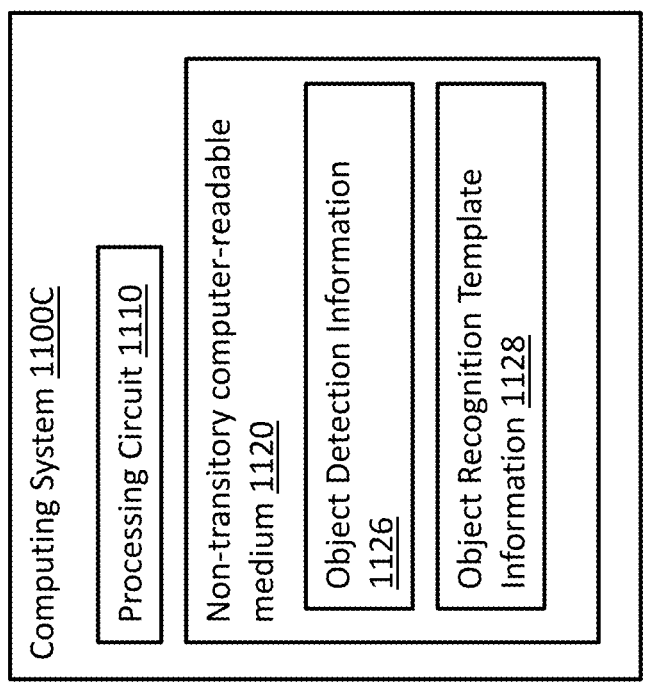

In an embodiment, as illustrated in FIG. 2D, the non-transitory computer-readable medium 1120 may store or otherwise include object detection information 1126, which may be generated by the computing system 1100C (which may be an embodiment of the computing system 1100/1100A/1100B). In an embodiment, the object detection information 1126 may describe one or more objects in a camera field of view of the camera 1200, or more specifically one or more objects in an environment of the camera 1200 and/or the robot 1300. For example, the object detection information 1126 may include sensed structure information and/or object type information. The sensed structure information (also referred to as measured structure information) may be or may include information (e.g., global point cloud) which describes a structure of the one or more objects, wherein the structure is also referred to as a physical structure or an object structure. The sensed structure information may be based on depth information or other image information sensed by the camera 1200 or another sensing device. In other words, the sensed structure information may be structure information that is generated based on values (e.g., depth values) sensed or measured by the camera 1200. In an embodiment, the object type information may describe an object type associated with the object in the environment of the camera 1200 and/or robot 1300. In some instances, the object type may be associated with an object recognition template, which is discussed below, and the object type information may include or identify the object recognition template.

In an embodiment, the computing system 1100 may have access to one or more object recognition templates (also referred to as object templates), which may be stored as part of the object recognition template information 1128 on the non-transitory computer-readable medium 1120, as illustrated in FIG. 2D, may be stored on the non-transitory computer-readable medium 1600, and/or may be stored on another device. In some implementations, the one or more object recognition templates may have been manually generated, and may have been received (e.g., downloaded) by the computing system 1100/1100A/1100B/1100C via the communication interface 1300 or in some other manner. In some implementations, the one or more object recognition templates may have been generated as part of an object registration process performed by the computing system 1100/1100A/1100B/1100C or by another device. Templates are discussed in more detail in U.S. patent application Ser. No. 16/991,466 and in U.S. patent application Ser. No. 16/991,510, the entire contents of which are incorporated by reference herein.

In an embodiment, each of the one or more object recognition templates (also referred to as one or more object templates) may describe an object design associated with a type or class of objects. The object design may include, e.g., a visual design that describes or defines an appearance of objects associated with the type or class of objects (also referred to as object type), and/or a physical design that describes or defines a structure of objects associated with the object type. For example, if an object design described by an object recognition template is more specifically a container design associated with a particular container type, then the object recognition template may be a container template that describes, e.g., a visual design and/or a physical design associated with the container type. In some implementations, the object recognition template may include visual description information (also referred to as object appearance description) that describes the visual design, and/or may include an object structure description (also referred to as structure description information) that describes the physical design.

In some instances, the visual description information may include or describe one or more feature descriptors, which may represent a visual feature, visual pattern, or other visual detail (e.g., logo or picture) that form the visual design. In some instances, the object structure description may describe an object size, object shape or contour, and/or some other aspect of a structure of objects associated with a particular object type. For example, the object structure description may include values which describe the object size (e.g., a combination of length, width, and/or height) associated with the object type, include a computer-aided design (CAD) file that describes an object structure associated with the object type, and/or a point cloud that describes a contour of the object structure. More specifically, the point cloud may, e.g., include a plurality of coordinates that describe a plurality of respective locations on one or more surfaces of the object structure. In some implementations, the one or more object recognition templates described by the object recognition template information 1128 may be, e.g., compared against the sensed structure information discussed above to determine which object recognition template best matches the sensed structure information. Such a comparison may be part of an object recognition operation. As discussed below in more detail, the object recognition operation may be used to determine an object type associated with an object in a camera field of view of the camera 1200 of FIGS. 1A-1D. The computing system 1100/1100A/1100B/1100C or another computing system may be configured to use the object type of an object to plan robot interaction with the object.

Figure 3A:
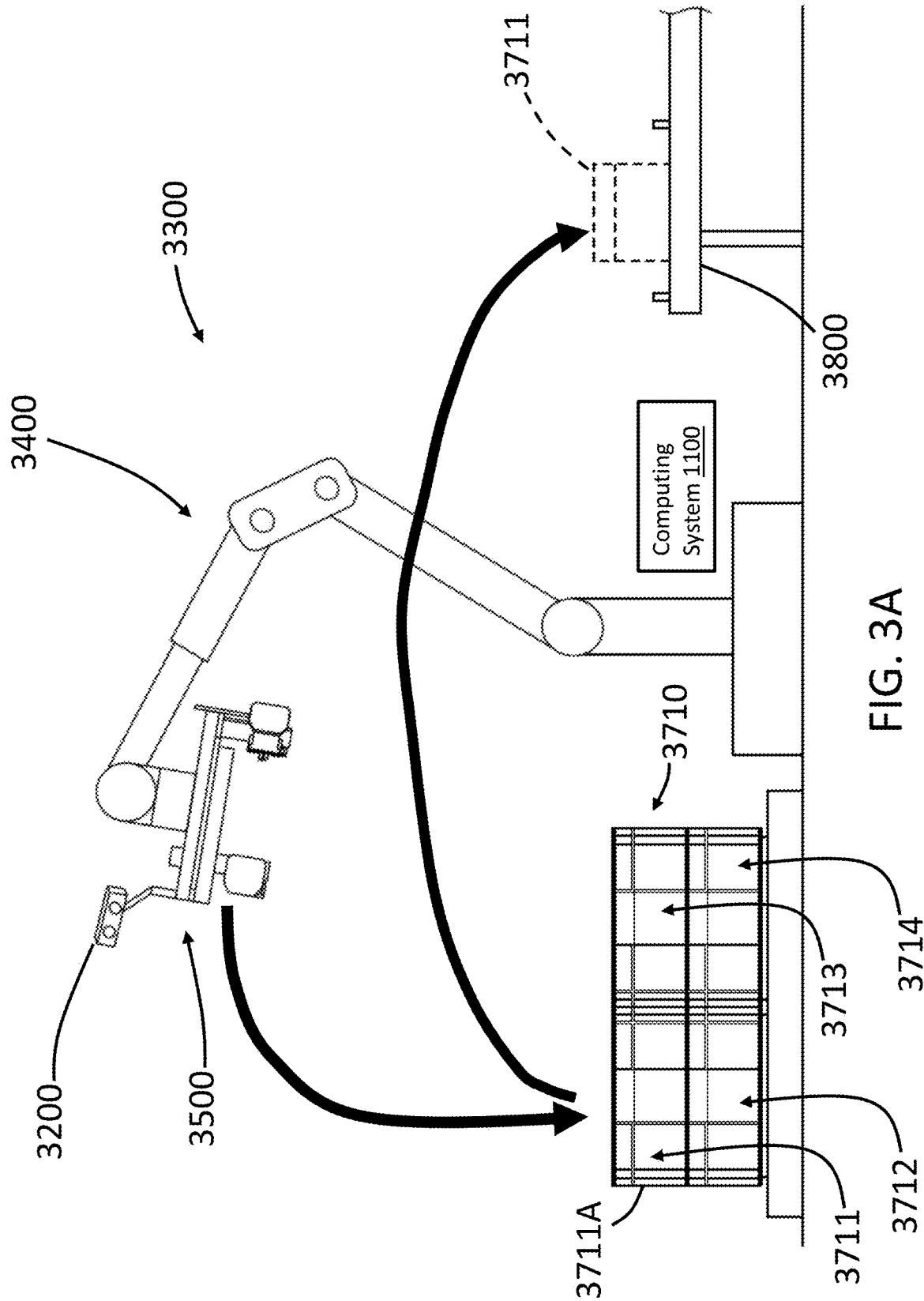
FIGS. 3A and 3B illustrate an environment having a robot arm and an end effector apparatus for performing robot interaction, consistent with an embodiment hereof.
Figure 3B:
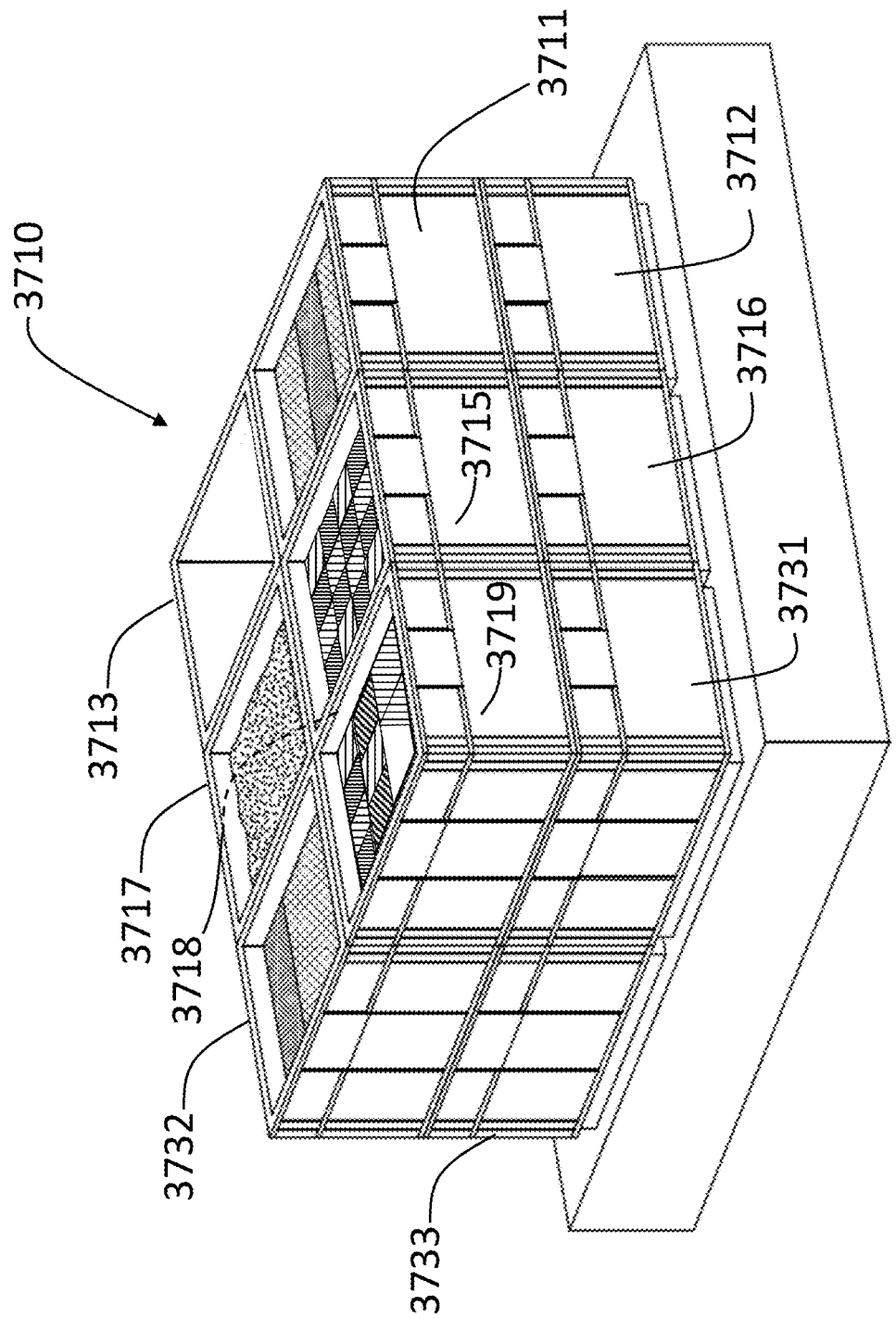

FIGS. 3A and 3B illustrate an example environment in which object detection and/or robot interaction may occur. More particularly, the environment includes the computing system 1100, a camera 3200 (which may be an embodiment of the camera 1200 of FIGS. 1A-1D), and a robot 3300 (which may be an embodiment of the robot 1300). In this embodiment, the robot 3300 may include a robot arm 3400 and an end effector apparatus 3500. In an embodiment, the end effector apparatus 3500 may form one end of the robot arm 3400, or be attached to one end of the robot arm 3400.

In the example of FIG. 3A, the robot 3300 may, via the robot arm 3400, operate to move the end effector apparatus 3500 toward one or more objects, such as a stack of cases, crates or other containers disposed on a pallet. The end effector apparatus 3500 may further be able to engage (e.g., grip) at least one of the one or more objects, and to move the object from the pallet to another location (e.g., as part of a de-palletization operation). More specifically, FIGS. 3A and 3B depict an environment having a stack 3710 of objects, or more specifically a stack of containers. In some scenarios, as illustrated in FIG. 3B, some or all of the containers may hold smaller objects (which may also be referred to as smaller items). The stack 3710 in FIGS. 3A and 3B may include at least objects 3711-3719 and 3731-3733, while the end effector apparatus 3500 may be used to grip or otherwise pick up one of the objects in the stack 3710, such as object 3711, and to move the object from the stack 3710 to a destination location, such as a location on a conveyor 3800 of FIG. 3A. To pick up the object 3711, the end effector apparatus 3500 may be moved and tilted to align with the object 3711. In the environment depicted in FIGS. 3A and 3B, an object on the pallet may have a physical structure (also referred to more simply as a structure) that forms a 3D pattern on at least one of its outer side surfaces. For instance, the 3D pattern may be a pattern of ridges (also referred to as a ridge pattern) protruding from an outer side surface. As an example, FIG. 3A depicts a ridge pattern 3711A on an outer side surface of the object 3711. In some scenarios, an object on the pallet may have visual detail forming a 2D pattern on its outer side surface, such as a logo or other visual pattern. In some instances, if the object is a container, the object may include a container rim. As discussed below in more detail, the ridge pattern and/or container rim may be used to determine robot interaction locations, such as locations at which an end effector apparatus (e.g., 3500) of the robot is to grip the container.

In an embodiment, the end effector apparatus 3500 may include one or more gripper members. For instance, the end effector apparatus 3500 may include a mounting plate or other mounting structure, and include a plurality of gripper members mounted on or otherwise attached to a surface (e.g., bottom surface) of the mounting structure. In some implementations, the camera 3200 may be mounted on or otherwise attached to an opposite surface (e.g., top surface) of the mounting structure. In some instances, the plurality of gripper members may include at least a first gripper member that is movable (e.g., slidable) along a first axis, and a second gripper member that is movable along a second axis perpendicular to the first axis. The first axis may be, e.g., parallel with a first edge of the mounting structure, while the second axis may be, e.g., parallel with a second edge of the mounting structure. In some instances, the plurality of gripper members may further include a third gripper member that is disposed at a location at which the first axis and the second axis intersect. Such a location may be, e.g., near a corner of the mounting structure.

In some implementations, each of the gripper members may have a respective gripper body that is formed by or attached to a respective gripper finger assembly. The gripper finger assembly may be used to grip an object (e.g., a container) by clamping around or pinching a portion of the object, such as a portion of a lip that forms an outer edge of a container. In one example, the gripper finger assembly may include two components, also referred to as gripper fingers, that are movable relative to each other. The two gripper fingers may form a chuck or clamp, in which the two gripper fingers are movable toward each other to transition to a closed state in which they grip the portion of the object, or to tighten a grip around the object. The two gripper fingers may further be movable away from each other, to transition to an open state in which the gripper fingers loosen or release the grip. End effector apparatuses and gripper members are discussed in more detail in U.S. application Ser. No. 17/084,272, the entire content of which is incorporated by reference herein.

Figure 4:
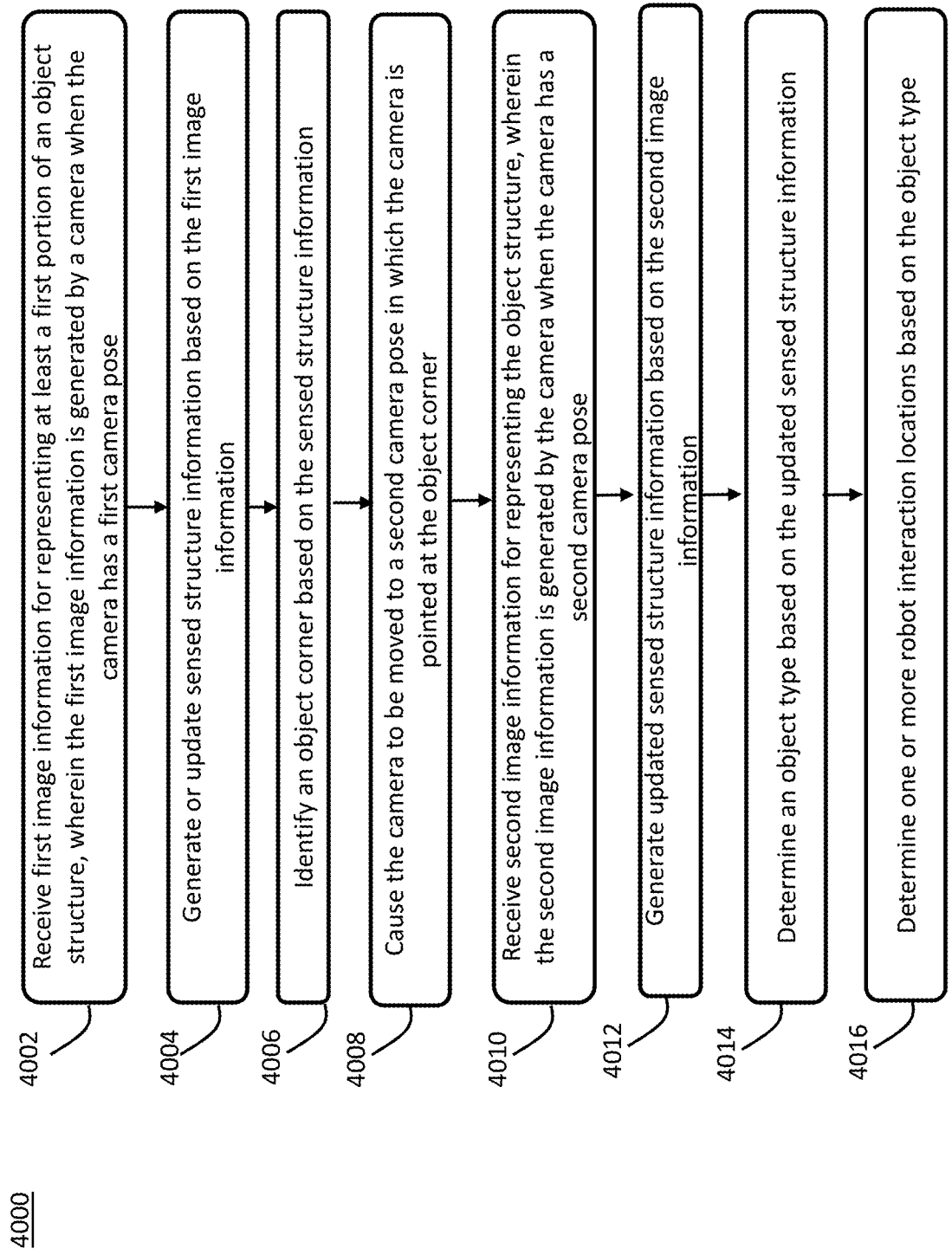
FIG. 4 illustrates a flow diagram which illustrates an example method for generating a motion plan, according to an embodiment hereof.

As stated above, one aspect of the present application relates to performing object detection, which may involve determining an object type for an object in a camera field of view. The object type may be used to plan robot interaction with the object, such as an interaction in which a robot grips the object and moves the object from a current location to a destination location. FIG. 4 depicts a flow diagram for an example method 4000 for performing object detection and/or planning robot interaction. The method 4000 may be performed by, e.g., the computing system 1100 of FIGS. 2A-2D or of FIG. 3A, or more specifically by the at least one processing circuit 1110 of the computing system 1100. In some scenarios, the at least one processing circuit 1100 may perform the method 4000 by executing instructions stored on a non-transitory computer-readable medium, such as the non-transitory computer-readable medium 1120. For instance, the instructions may cause the processing circuit 1110 to execute the object detection module 1121 and the robot interaction planning module 1122, which may perform some or all of the steps of method 4000. In an embodiment, the method 4000 may be performed in an environment in which the computing system 1100 is currently in communication with a robot and a camera, such as the robot 3300 and the camera 3200 in FIGS. 3A and 3B, or with any other robot discussed in this disclosure. For example, the computing system 1100 may perform the method 4000 when an object is currently in a camera field of view of the camera 3200, or has been in the camera field of view. In some scenarios, the camera (e.g., 3200) may be mounted on an end effector apparatus (e.g., 3500) of the robot (e.g., 3300), as illustrated in FIG. 3A. In other scenarios, the camera may be mounted elsewhere, and/or may be stationary.

Figure 5A:
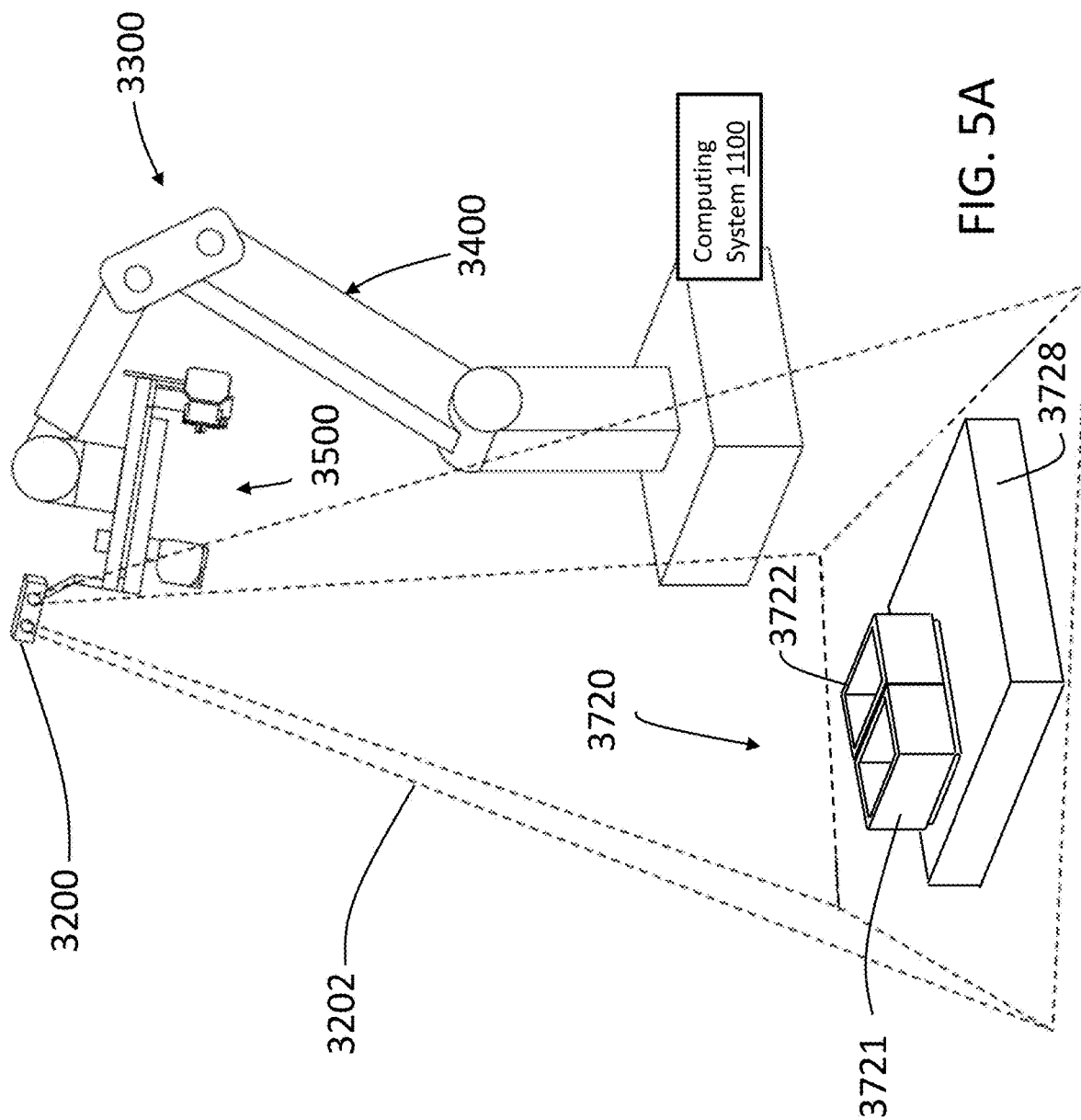

In an embodiment, the method 4000 of FIG. 4 may begin with or otherwise include a step 4002, in which the computing system 1100 (e.g., via object detection module 1121) receives first image information (also referred to as a first set of image information) for representing at least a first portion of an object structure associated with an object in a field of view of a camera (also referred to as a camera field of view). For instance, FIG. 5A depicts a scenario in which a group 3720 of objects 3721, 3722 is in a camera field of view 3202 of the camera 3200. Each of the objects 3721, 3722 may be, e.g., a box, crate, case, bin, or other container. The group 3720 of objects 3721, 3722 may be disposed on another object 3728, such as a pallet, which may also be at least partially disposed within the camera field of view 3202. In some scenarios, the pallet 3728 may be used to stack or otherwise dispose containers or other objects which may have a large variety of sizes (e.g., wide variety of length, width, and height values), and with a large variety of stacking or placement configurations.

In an embodiment, the first image information that is received by the computing system 1100 may be generated by the camera (e.g., 3200) when the camera is in or has a first camera pose, such as the camera pose illustrated in FIG. 5A. The camera pose may refer to a location and orientation of the camera (e.g., 3200). In some scenarios, the camera pose may affect a perspective or viewpoint of the camera (e.g., 3200). For example, the first camera pose depicted in FIG. 5A may involve the camera 3200 having a location that is above the group 3720 of objects 3721, 3722 and having an orientation in which the camera 3200 is pointed at a first portion, or more specifically a top portion (e.g., top surface), of the objects 3721, 3722. In some situations, the orientation for the first camera pose may be associated with the camera 3200 having a top view of the object. For instance, the first camera pose may involve the camera 3200 have an orientation in which its image sensor directly faces the top portion of the objects 3721, 3722, and/or an orientation in which a focal axis of one or more lenses of the camera 3200 is vertical or substantially vertical. In some scenarios, the camera 3200 may be disposed directly above the objects 3721, 3722, and may be pointed directly at the first portion (e.g., top portion) of the objects 3721, 3722.

In an embodiment, the first image information of step 4002 may be used for a rough detection phase in which the computing system 1100 may determine a relatively incomplete or simpler description or estimate of the object structure. For instance, the description or estimate of the object structure may be incomplete because the first image information may describe the first portion (e.g., top portion) of the object structure, but may fail to describe other portions (e.g., side portions) of the object structure, or may do so in only a limited manner. In some instances, the rough detection phase may further involve positioning a camera (e.g., 3200) sufficiently far from the object structure so as to fit an entirety of the object structure within the camera field of view. In such instances, the first image information which is generated by the camera may not be as detailed as image information which is generated when the camera is closer to the object structure. Thus, the resulting estimate or description of the object structure based on the first image information may be simpler in its level of detail. As discussed below in more detail, this estimate or description may be, e.g., a global point cloud or some other sensed structure information. The sensed structure information which is generated using the rough detection phase may be used to identify an object corner of the object structure, and to receive second image information associated with the object corner. In some implementations, the second image information may be more detailed, and/or may supplement the first image information. Thus, the second image information may be used to refine a description or estimate of the object structure.

As discussed below in more detail, the steps of method 4000 may be performed to facilitate robot interaction with individual objects of the group 3720 of objects 3721, 3722, such as object 3722. In such instances, a particular object that is a target for the robot interaction may be referred to as a target object. In some scenarios, the steps of method 4000 (e.g., steps 4004-4016) may be performed multiple times or multiple iterations, so as to facilitate robot interaction with multiple target objects.

As stated above, the first image information may represent a particular view of the group 3720 of objects 3721, 3722, or more specifically a particular view of each of the objects 3721, 3722. In the example of FIG. 5A, the first image information may represent a top view of the objects 3721, 3722, because the first image information may be generated when the camera 3200 has the first camera pose illustrated in FIG. 5A, in which the camera 3200 is above the objects 3721, 3722 and is pointed at a top portion (e.g., top end or top side) of each of the objects 3721, 3722.

In the example of FIG. 5A, the objects 3721, 3722 may each be a crate or other open-top container having one or more walls that enclose a bottom inner surface of the container. The one or more walls may form a rim at the top end of the container. In such an example, the top view of the object 3721/3722 may include a view of a surface of the rim (also referred to as a rim surface) for the object 3721/3722. For instance, FIG. 5B depicts an example in which the first image information includes 3D image information 5720 (also referred to as spatial structure information) that describes a structure of the group 3720 of objects 3721, 3722. In such an embodiment, the camera 3200 that generated the 3D image information 5720 may be a 3D camera. The 3D image information 5720 in this example may describe a structure (also referred to as object structure) of object 3721 and describe an object structure for the object 3722, and more particularly may represent a top view of the object structures for the objects 3721, 3722.

In an embodiment, the 3D image information 5720 may include depth information, such as a depth map which describes respective depth values of one or more portions of the object structure for the objects 3721, 3722 relative to a reference point, such as a point at which the camera (e.g., 3200) is located when the camera generates the 3D image information 5720 or other image information used in step 4002. More particularly, the depth information may describe respective depth values for a plurality of locations (also referred to as a plurality of points) on one or more surfaces of an object structure for the object 3721 and/or an object structure for the object 3722. In the example of FIG. 5B, the 3D image information 5720 may include image portions 5721, 5722, and 5728 that describe depth values for the objects 3721, 3722, and 3728, respectively. More particularly, the image portion 5728 may include respective depth values for locations $3728_1$ through $3728_n$ on a top surface of the object 3728 (e.g., pallet). Further in this example, the object 3721 may be a container having a rim and a bottom inner surface. The image portion 5721 may include respective depth values for locations $3721A_1$ through $3721A_n$ on a surface of the rim of the object 3721 (also referred to as a rim surface), and include respective depth values for locations $3721B_1$ through $3721B_n$ on the bottom inner surface of the object 3721. Similarly, the image portion 5722 may include respective depth values for locations $3722A_1$ through $3722A_n$ on a rim surface of the object 3722, and include respective depth values for locations $3722B_1$ through $3722B_n$ on a bottom inner surface of the object 3722.

In some situations, if the object 3721/3722 is a container which contains one or more other items, such items may also be represented in the 3D image information or other image information. For instance, the 3D image information 5720 of FIG. 5B may include image portions 5723, 5724 that describe respective depth values for locations on two respective or items contained within object 3722. More specifically, the image portion 5723 may include respective depth values for locations $3723_1$ through $3723_n$ on one of the objects, while the image portion 5724 may include respective depth values for locations $3724_1$ through $3724_n$ on another one of the objects.

In some scenarios, the first image information may describe the respective depth values with a depth map, which may include an array of pixels that correspond to, e.g., a grid of locations on one or more object surfaces in the camera field of view (e.g., 3202). In such scenarios, some or all of the pixels may each include a respective depth value for a respective location that corresponds to the pixel, wherein the respective location is on the one or more object surfaces in the camera field of view.

In some situations, the first image information may describe the respective depth values through a plurality of 3D coordinates, which may describe various locations on the one or more object surfaces. For example, the 3D coordinates may describe locations $3728_1$ through $3728_n$, locations $3721A_1$ through $3721A_n$, locations $3721B_1$ through $3721B_n$, locations $3722A_1$ through $3722A_n$, locations $3722B_1$ through $3722B_n$, locations $3723_1$ through $3723_n$, and locations $3724_1$ through $3724n$ in FIG. 5B. The plurality of 3D coordinates may, e.g., form a point cloud or part of a point cloud that describes at least a portion of an object structure, such top portions of the object structures for the objects 3721, 3722, 3723, 3724, and 3728. The 3D coordinate may be expressed in a camera coordinate system, or in some other coordinate system. In some instances, a depth value for a particular location may be represented by or based on a component of a 3D coordinate for that location. As an example, if the 3D coordinate for a location is a [X Y Z] coordinate, the depth value for that location may be equal to or based on the Z-component of the 3D coordinate.

In the example of FIG. 5B, the first image information may represent a bottom inner surface of an object structure. More particularly, the first image information depicted in FIG. 5B includes the 3D image information 5720, which includes respective depth values or coordinates for locations $3721B_1$ through $3721B_n$ on the bottom inner surface of the object 3721, and for locations $3722B_1$ through $3722B_n$ on the bottom inner surface of the object 3722. In another example, the bottom inner surface of the object structure for an object (e.g., 3721/3722) may not be represented by the first image information, because the bottom inner surface may be completely covered or otherwise occluded from view. In such an example, if the object (e.g., 3721/3722) is a container, the bottom inner surface of the container may be completely covered by content of the container, such as a material or items disposed within the container, and/or may be completely covered by a lid, flap, or other component used to enclose the container. In such an example, the first image information may describe respective depth values or coordinates for locations on a surface or surfaces of the material or items within the container, or for locations on the lid or flap.

Figure 5C:
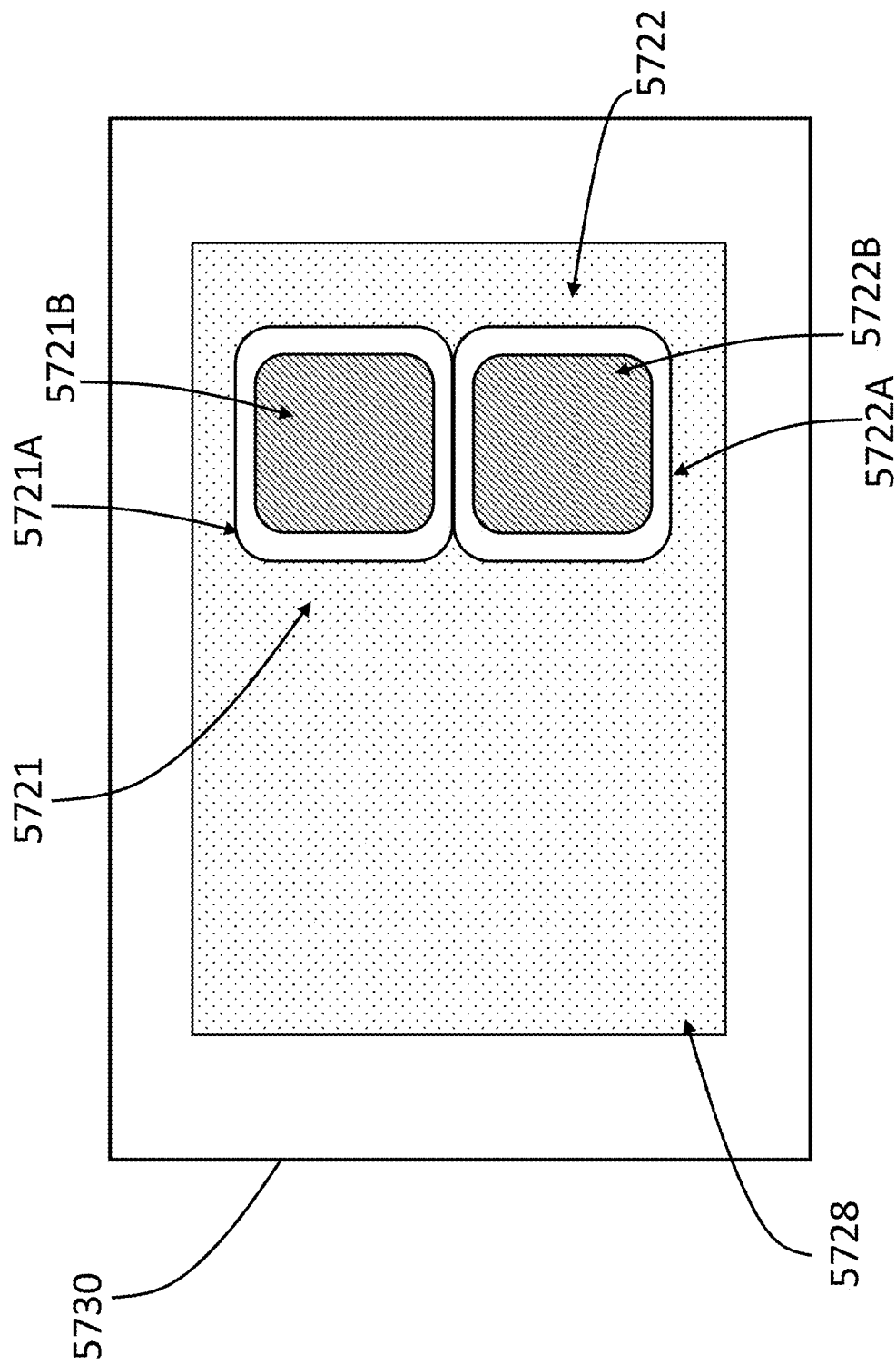

In an embodiment, the first image information received in step 4002 may describe a visual appearance of the group 3720 of objects 3721, 3722. For instance, FIG. 5C provides an example in which the first image information includes or forms a 2D image 5730 (e.g., a grayscale or color image) that includes an image portion 5731 (e.g., a region of pixels) that describes an appearance of the object 3721 of FIG. 5A, an image portion 5732 that describes an appearance of the object 3722, and an image portion 5728 that describes an appearance of the object 3728. More particularly, the image 5730 may describe the appearance of the objects 3721, 3722 and of the object 3728 from a viewpoint of the camera 3200 of FIG. 5A, and more specifically may represent the top view of the objects 3721, 3722. As stated above, the 2D image 5730 may be generated by the camera 3200 when the camera 3200 has the first camera pose depicted in FIG. 5A. More particularly, the 2D image 5730 may represent visual detail(s) on one or more surfaces of the object 3721/3722. For example, the image portion 5721 of the 2D image 5730 may more specifically include an image portion 5721A which represents a first surface (e.g., rim surface) of the object 3721, and include an image portion 5721B that represents a second surface (e.g., bottom inner surface) of the object 3721. Similarly, the image portion 5722 may include an image portion 5722A that represents a first surface (e.g., rim surface) of the object 3722 of FIG. 5A, and an image portion 5722B that represents a second surface (e.g., bottom inner surface) of the object 3722. In another example, if the objects 3721, 3722 are containers filled with items or material, as discussed above, the image portions 5721, 5722 may describe an appearance of the items or material disposed within the containers.

Figure 6:
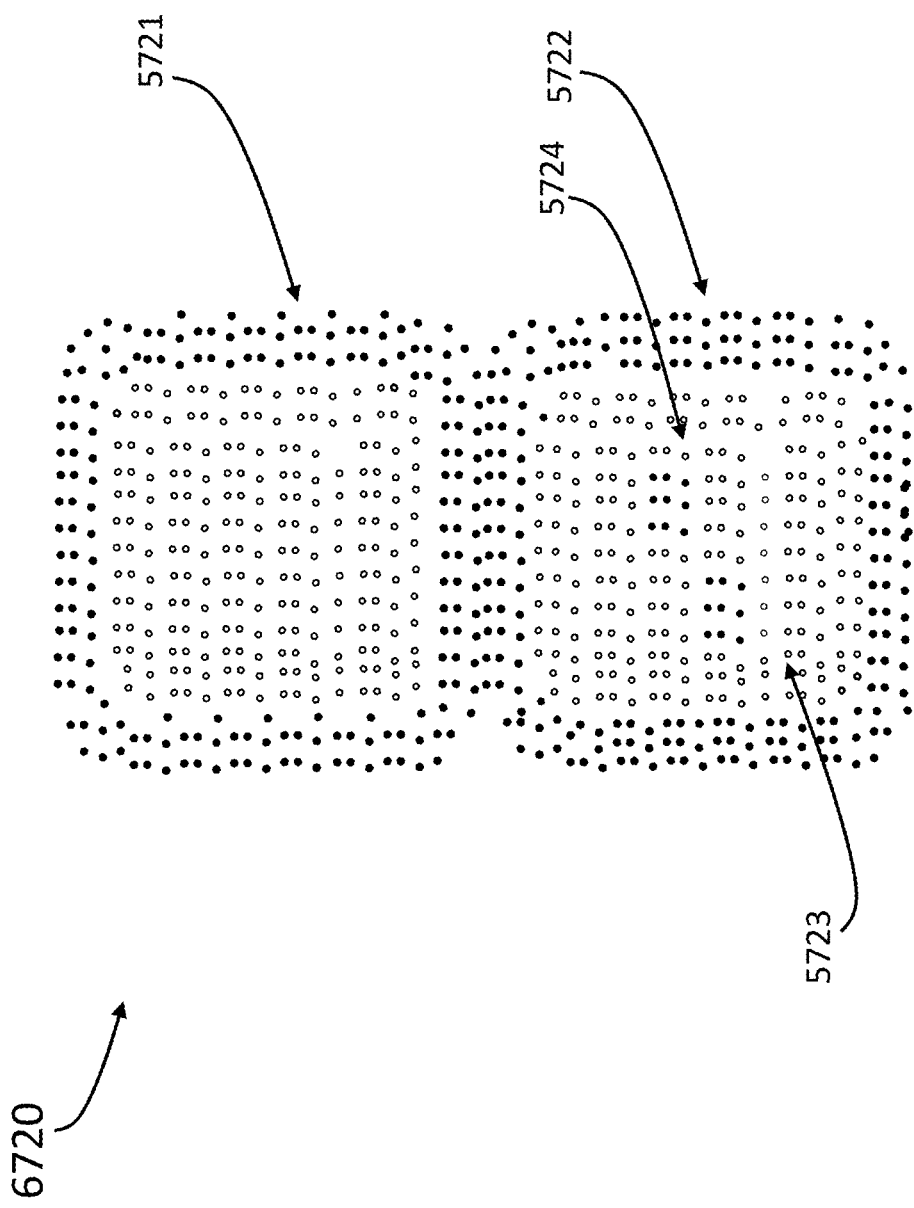
FIG. 6 illustrates sensed structure information based on image information, according to an embodiment hereof.

Returning to FIG. 4, the method 4000 may in an embodiment include a step 4004, in which the computing system 1100 (e.g., via object detection module 1121) generates or updates, based on the first image information, sensed structure information that represents an object structure associated with the object (e.g., 3721/3722) in the camera field of view (e.g., 3202). As stated above, the sensed structure information (also referred to as measured structure information) may be or may include information which describes or otherwise represents an object structure associated with an object, such as an object structure for the object 3721/3722. For instance, the sensed structure information may be a global point cloud that includes a plurality of coordinates for describing locations on one or more surfaces of the object 3721, and/or a plurality of coordinates for locations on one or more surfaces of the object 3722. In some implementations, the computing system 1100 may generate the sensed structure information by incorporating the first image information or an image portion(s) thereof into the sensed structure information, such that the sensed structure information includes values from the first image information. As an example, FIG. 6 depicts sensed structure information 6720 generated by the computing system. The sensed structure information 6720 may include values, such as depth values or coordinates, that are in the first image information 5720. More particularly, the sensed structure information 6720 may be a point cloud that includes coordinates of locations represented in image portions 5721, 5722, 5723, and 5724 of the first image information 5720. In other words, the sensed structure information 6720 may directly incorporate image portions 5721-5724 of the first image portion 5720. These image portions may describe at least a portion of object structures for the objects 3721, 3722, 3723, and 3724. For example, the image portion 5722 may describe a rim of the object structure for the object 3722, and describe at least a portion of a bottom inner surface of the object structure for the object 3722. As discussed above, the computing system 1100 may store the sensed structure information (e.g., 6720) as part of the object detection information 1126 in the non-transitory computer-readable medium 1120.

In an embodiment, if the sensed structure information already includes values for describing the first portion of the object structure at or before a beginning of step 4004, the computing system 1100 may update the sensed structure information based on values in the first image information (e.g., 5720). For example, the sensed structure information may be generated based on multiple sets of image information that all represent a top view of one or more objects in a camera field of view (e.g., 3202). The multiple sets of image information may have been generated by the camera (e.g., 3200) at different respective locations (as the camera is moved laterally), but with the same or similar orientation for the camera, such as an orientation in which an image sensor of the camera directly faces a respective region on the top portion of the one or more objects. In this example, the first image information may be one of the multiple sets of image information. If, at a start of step 4004, the sensed structure information already includes coordinates that are obtained from another one of the multiple sets of image information, the computing system 1100 may update the sensed structure information to incorporate coordinates obtained from the first image information (e.g., 5720). Thus, the computing system 1100 may include, as a new part of the sensed structure information, the set of coordinates which are obtained from the first image information. In this manner, the sensed structure information may function as a composite set of image information that combines the multiple sets of image information discussed above. In some instances, the computing system 1100 may generate the composite set of image information by merging the multiple sets of image information discussed above, such as in a situation in which the multiple sets of image information represent overlapping regions of the top portion of the one or more objects. Such a merging operation may involve, e.g., adjusting one or more existing values (e.g., depth values or coordinates) of the sensed structure information based on values in the first image information. In some instances, the merging operation may involve discarding duplicative values (e.g., coordinates or depth values) which are described in more than one of the multiple sets of image information discussed above.

As discussed above, the sensed structure information may be generated or updated based on image information representing a particular viewpoint, such as a top view of one or more objects. As discussed below in more detail with respect to step 4012, the sensed structure information may be updated based on image information that represents another viewpoint, such as a perspective viewpoint. Because the sensed structure information may be updated to incorporate or reflect values from multiple sets of image information, the sensed structure information may function as global structure information that acts as a composite set of image information that combines the multiple sets of image information, which may be associated with multiple camera poses. Thus, if the sensed structure information is or includes a point cloud or depth map, this point cloud or depth map may be a global point cloud or global depth map that is updated during method 4000 to incorporate values from multiple sets of image information.

Returning to FIG. 4, the method 4000 may in an embodiment include a step 4006, in which the computing system 1100 identifies an object corner associated with the object structure. For instance, the object corner may be an outer corner of an object structure for the object 3722 in FIG. 5A. In some implementations, the computing system 1100 may identify the object corner based on the sensed structure information (e.g., 6720). For instance, the computing system 1100 may identify multiple outer edges described by the sensed structure information, or multiple edge regions described by the sensed structure information. In such an example, the computing system 1100 may identify the object corner as a location which is at or near where the multiple outer edges intersect, and/or as a location which is in a region at which the multiple edge regions intersection.

In one example, the computing system 1100 may identify an edge of the object structure by, e.g., identifying a set of outermost locations among the locations described by the sensed structure information, wherein the set of locations may approximate part of a contour of the object structure (e.g., for object 3722). In some instances, the computing system 1100 may estimate or otherwise identify the edge as a line which fits through the set of outermost locations. In some implementations, the computing system 1100 may identify an edge region of the object structure as a region of locations which include the set of outermost locations.

As an example, FIG. 7 illustrates the computing system 1100 identifying a first edge region 7001 and a second edge region 7002 that are described or otherwise represented by the sensed structure information 6720. The first edge region 7001 may be, e.g., a strip or band of locations that represent one portion of an object rim for the object 3722, wherein the object rim forms a set of edges for the object structure of the object 3722. Similarly, the second edge region 7002 may be, e.g., another strip or band of locations that are on another portion of the object rim. In this example, the computing system 1100 may identify an object corner $3722C_1$ for the object 3722 based on an intersection of the edge regions 7001, 7002. More particularly, the computing system 1100 may determine the object corner $3722C_1$ as a location that is in an intersecting region, which may be a region in which the edge regions 7001, 7002 overlap or otherwise intersect. In some implementations, each of the edge regions 7001, 7002 may be identified as a respective set of locations which are described in the sensed structure information 6720 and which have respective depth values that are the same or substantially the same. In such implementations, the computing system 1100 may determine each of the edge regions 7001, 7002 as a respective 2D plane which fits through a corresponding set of locations having substantially the same depth value or same Z-component in their 3D coordinates. In some scenarios, the computing system 1100 may identify a convex corner of the object structure as the object corner of step 4004. The convex corner may be, e.g., a corner at which two orthogonal edges of the object structure intersect. Convex corners are discussed in more detail in U.S. application Ser. No. 16/578,900, the entire content of which is incorporated by reference herein.

In an embodiment, the computing system 1100 may identify a particular object corner in step 4004 based on its accessibility or visibility. In such an embodiment, the sensed structure information may describe multiple object corners for an object structure. For example, the sensed structure information 6720 in FIG. 7 may describe multiple object corners $3722C_1$ through $3722C_4$ for an object structure of the object 3722. More particularly, the object corners $3722C_1$ through $3722C_4$ may be corners of a rim of the object 3722. In such a scenario, the computing system 1100 may be configured to select one of the object corners (e.g., $3722C_1$) from among the multiple object corners $3722C_1$ through $3722C_4$. The selection may be based on at least one of: (i) respective levels of accessibility to the multiple object corners $3722C_1$ through $3722C_4$ or (ii) respective levels of occlusion of the multiple object corners $3722C_1$.

In an embodiment, a level of accessibility to an object corner may refer to how accessible is the object corner for robot interaction with a robot arm (e.g., 3400), or more specifically an end effector apparatus (e.g., 3500) forming or disposed at one end of the robot arm. For example, if the robot interaction involves the end effector apparatus (e.g., 3500) reaching a particular object corner of an object (e.g., 3721/3722) and gripping the object at that object corner, the level of accessibility to that object corner may be affected by, e.g., whether there are other objects in an environment of the robot (e.g., 3300) which would physically obstruct the end effector apparatus (e.g., 3500) from reaching the object corner. Such obstructing objects may include, e.g., another object (e.g., another container), which may be disposed directly above the object corner.

In an embodiment, a level of occlusion of an object corner may refer to how well the object corner can be sensed by a camera (e.g., 3200), and more specifically refer to a level of visibility of the object corner to the camera (e.g., 3200). The level of visibility may be affected by whether a line of sight from the object corner to the camera (e.g., 3200) is blocked or otherwise occluded by another object. The occlusion may occur when the camera (e.g., 3200) is at the first camera pose discussed above, and/or when the camera is at a second camera pose, which is discussed below. In an embodiment, the computing system 1100 may in step 4004 select an object corner which is associated with a highest level of accessibility and/or a lowest level of occlusion among the multiple object corners. If the multiple object corners are associated with the same or substantially the same level of accessibility or occlusion, the computing system 1100 may randomly select one of the object corners from among the multiple object corners.

Figure 8A:
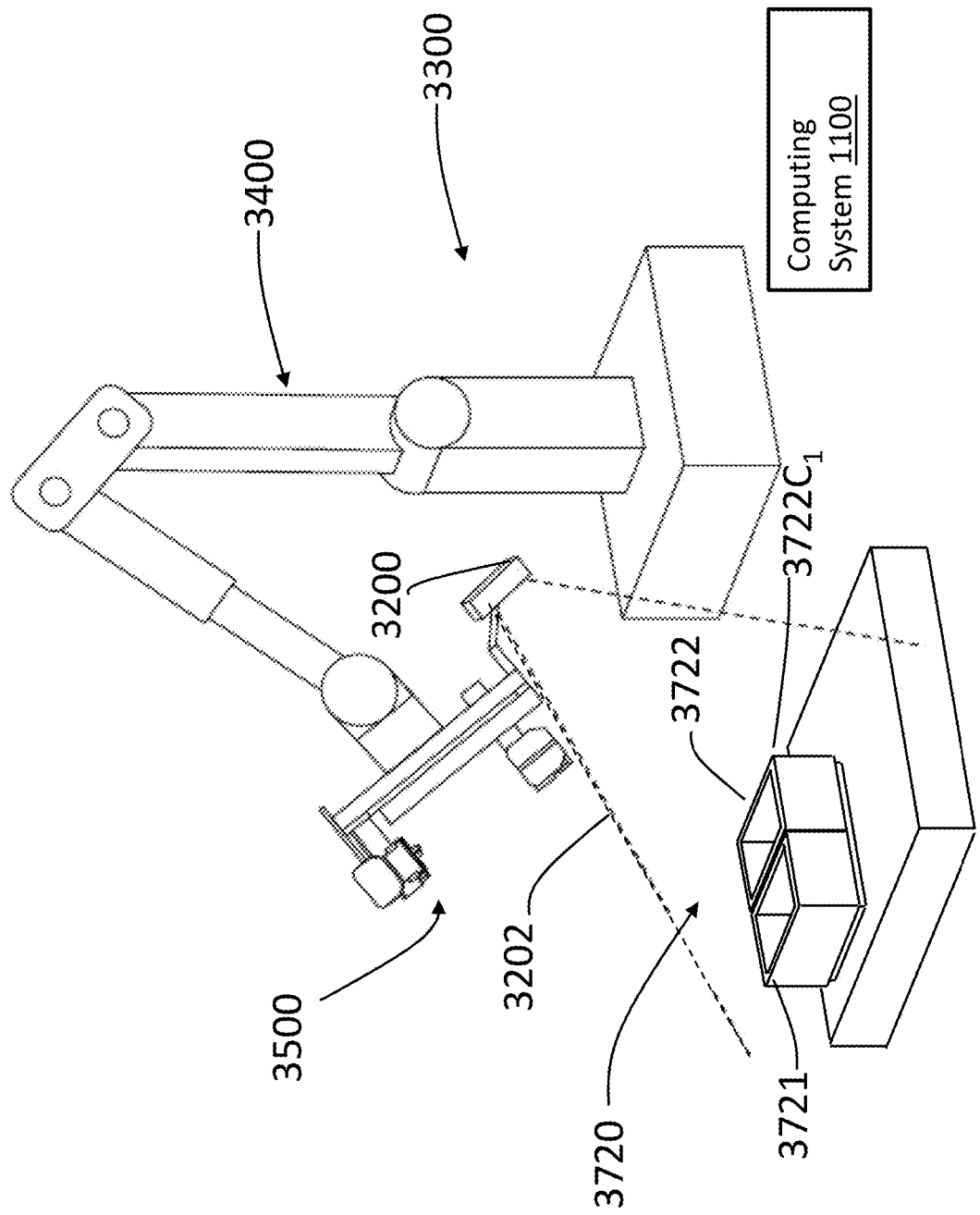
FIGS. 8A-8C illustrate various aspects of generating image information for representing an object in a camera field of view, according to an embodiment hereof.

Referring back to FIG. 4, the method 4000 may in an embodiment include a step 4008, in which the computing system 1100 causes the camera (e.g., via one or more camera placement movement commands) to be positioned to have a second camera pose in which the camera (e.g., 3200) is pointed at the object corner identified in step 4006. In this embodiment, the second camera pose of step 4008 may be different than the first camera pose associated with step 4002. As stated above, a camera pose may be a combination of a location and orientation of a camera (e.g., 3200). FIG. 8A depicts an example in which the camera 3200 has a second camera pose in which the camera 3200 is pointed at the object corner $3722C_1$ of the object 3722. In an embodiment, the second camera pose may be a camera pose in which the camera (e.g., 3200) has a perspective view of the object (e.g., 3722). More particularly, when the camera 3200 has the first camera pose illustrated in FIG. 5A, at least one portion of the object 3721/3722, such a side portions (e.g., outer side surface), may not be within a line of sight of the camera 3200, or more specifically may not be within a line of sight of an image sensor within the camera 3200. When the camera 3200 has the second camera pose, that portion of the object 3721/3722 (e.g., side portion), along with the object corner $3722C_1$, may come within the camera field of view 3202 of the camera 3200, and may be within the line of sight of the image sensor of the camera 3200.

In an embodiment, when the camera (e.g., 3200) has the first camera pose associated with the first image information, the first camera may have a first distance from an object (e.g., 3722) that is in the camera field of view (e.g., 3202). For instance, the computing system 1100 may, as part of step 4002, generate a first set of one or more camera placement movement commands for causing the robot arm 3400 of FIG. 5A to move or otherwise position the camera 3200 to a camera pose in which the camera is disposed directly above the object (e.g., 3722) and has a predefined first distance from the object (e.g., 3722), or more specifically from a top portion (e.g., rim surface) of the object. In some instances, the first distance may be sufficiently far from the object (e.g., 3722) to allow the camera field of view (e.g., 3202) to encompass an entirety of the top portion of the object, or more specifically encompass multiple object corners of the object. As a result, when the camera (e.g., 3200) generates the first image information while having the first camera pose, the first image information may represent the entirety of the top portion of the object (e.g., 3722), including multiple object corners (e.g., $3722C_1$-$3722C_4$) of the object. Such image information may facilitate an ability of the computing system 1100 to identify an object corner in step 4006. However, if the first distance has a large value, the resulting image information may not be as detailed as image information associated with closer distances. Thus, in one example, the second camera pose associated with the second image information in step 4010 may involve positioning the camera (e.g., 3200) closer to the object (e.g., 3722), or more specifically to the object corner (e.g., $3722C_1$) of the object (e.g., 3722). More particularly, the computing system 1100 may generate a second set of one or more camera placement movement commands for causing the robot arm (e.g., 3400) to move the camera (e.g., 3200) to the second camera pose. The second set of one or more camera placement movement commands may cause the robot arm (e.g., 3400) to position the camera (e.g., 3200) to have a second distance away from the object corner (e.g., $3722C_1$), wherein the second distance may be smaller than the first distance. The smaller distance may allow the second image information to capture or otherwise represent the object structure of the object (e.g., 3722) with a greater level of detail relative to the first image information. Thus, the second image information may be used to refine a description or estimate of the object structure.

Returning to FIG. 4, the method 4000 may in an embodiment include a step 4010, in which the computing system 1100 receives second image information (also referred to as a second set of image information) for representing an object structure, such as the object structure for the object 3722/3721 of FIG. 8A. The second image information may be generated by the camera (e.g., 3200) when the camera has the second camera pose, such as the camera pose illustrated in FIG. 8A. As stated above, the second camera pose may in some situations provide the camera (e.g., 3200) with a perspective view of the object (e.g., 3722). In such situations, the second image information may represent the perspective view of the object.

Figure 8B:
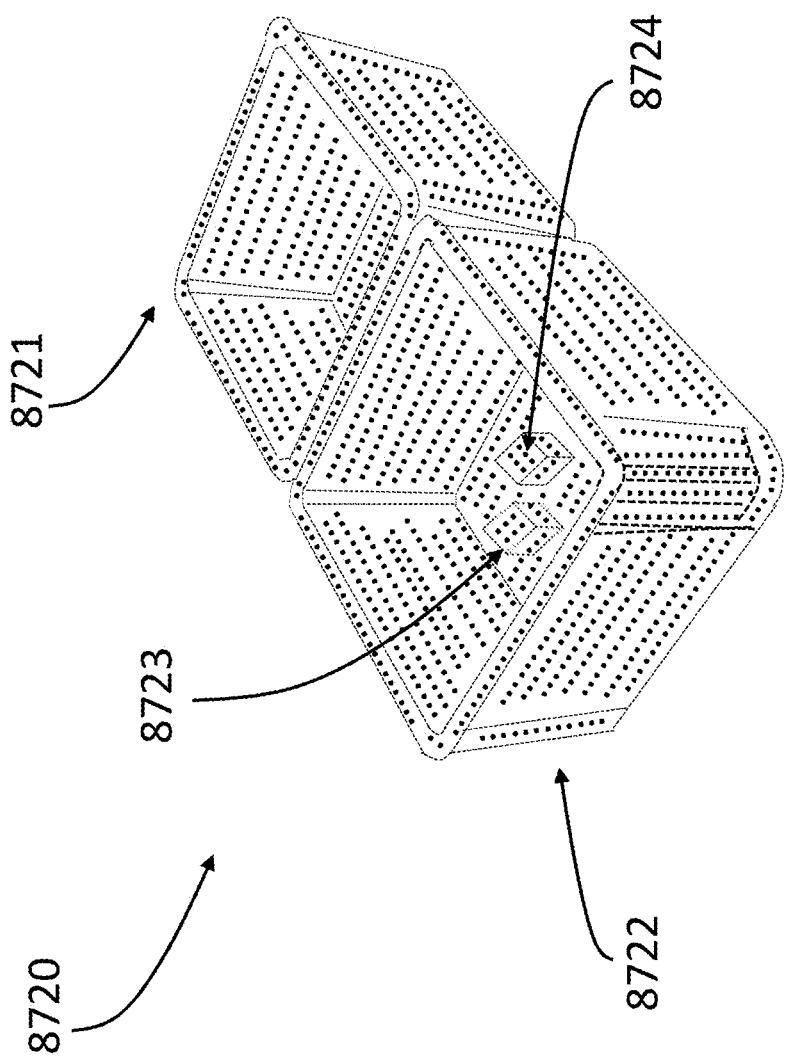

In some implementations, the second image information may be or may include 3D image information. As an example, FIG. 8B depicts 3D image information 8720 which may form or may be part of the second image information. The 3D image information 8720 may be or may include, e.g., a point cloud generated by the camera 3200 when the camera 3200 has the second camera pose illustrated in FIG. 8A. Like the first image information, the second image information may include values, such as depth values or coordinates, for locations on one or more surfaces of various object structures. More particularly, the second image information may include image portions 8721, 8722, 8723, and 8724, which may represent respective object structures for the objects 3721, 3722, 3723, and 3724 in FIG. 8A. In one example, if the object represented by the second image information has a ridge pattern, or more generally a plurality of physical ridges protruding from one or more outer side surfaces of the object, the 3D image information 8720 may describe or otherwise represent the plurality of ridges.

Figure 8C:
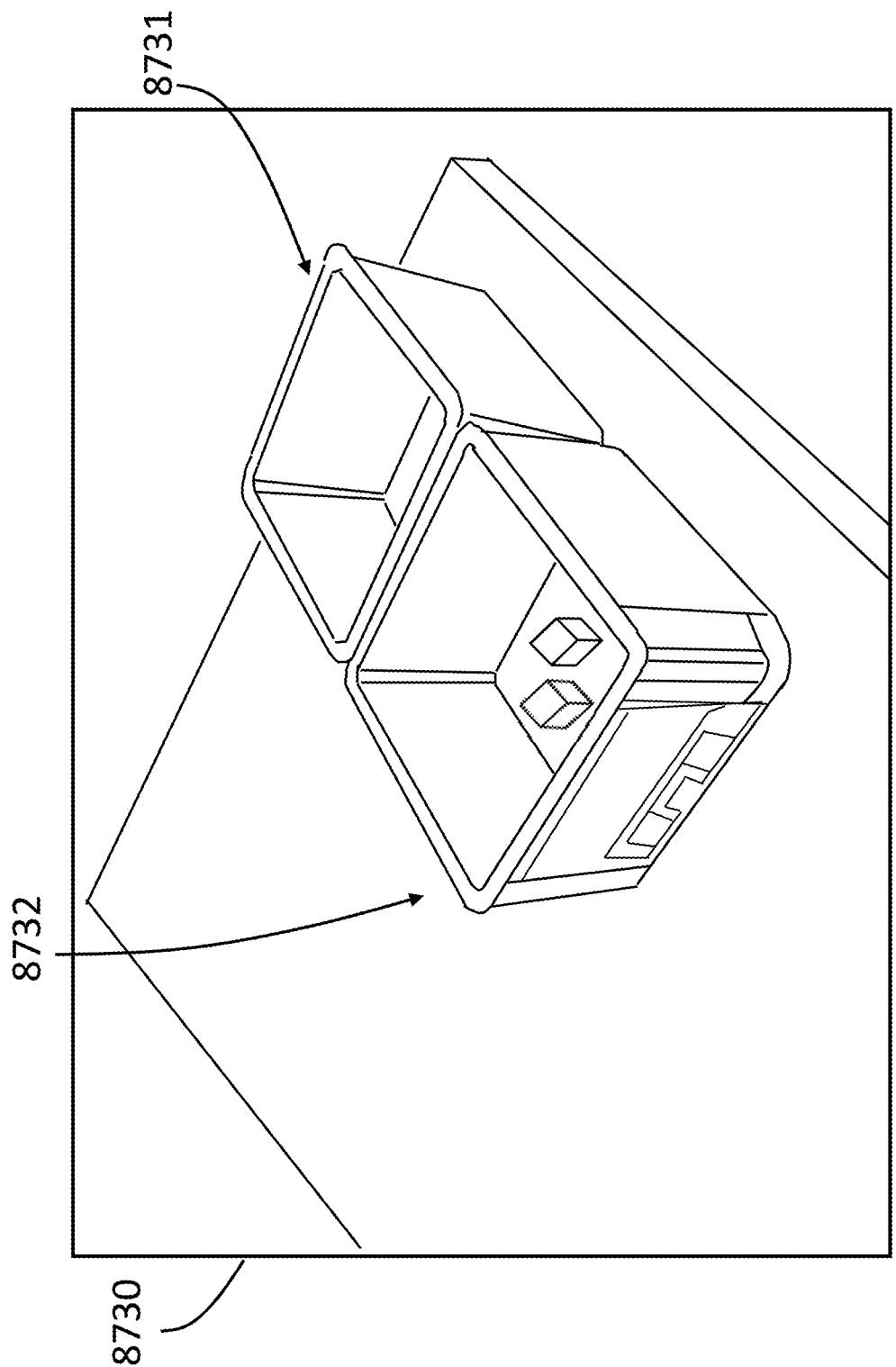

In some implementations, the second image information may be or may include 2D image information. For instance, FIG. 8C illustrates a 2D image 8730 that may form part of the second camera information. In this example, the 2D image 8730 may include at least image portions 8731, 8732 which represent respective appearances of the objects 3721, 3722 from a perspective or viewpoint of the camera 3200 when the camera 3200 has the second camera pose.

In an embodiment, as stated above, the first image information received in step 4002 may be associated with the camera (e.g., 3200) having a first distance from an object (e.g., 3722), and the second image information received in step 4010 may be associated with the camera (e.g., 3200) having a second distance from the object (e.g., 3722), wherein the second distance may be less than the first distance. In this embodiment, the first camera pose may be associated with the first distance between the camera and the object or a portion thereof (e.g., top portion of the object 3722), while the second camera pose may be associated with a second distance between the camera and the object or a portion thereof (e.g., corner of the object 3722), wherein the second distance is less than the first distance. As discussed above, the larger value of the first distance may cause the first image information to have a lesser level of detail, which may be sufficiently suitable for performing a rough detection phase involving identifying an object corner, but may not be sufficiently suitable for determining an object type associated with the object (e.g., 3722). The greater level of detail may be provided by the second image information, because the second image information is associated with a closer distance between the camera and the object (e.g., 3722). Further, as discussed above, the second image information may represent a portion of the object structure that is not represented or only partially represented in the first image information. Thus, the second image information may enhance an ability of the computing system 1100 to accurately determine the object type for the object (e.g., 3722), which is discussed below.

Figure 9:
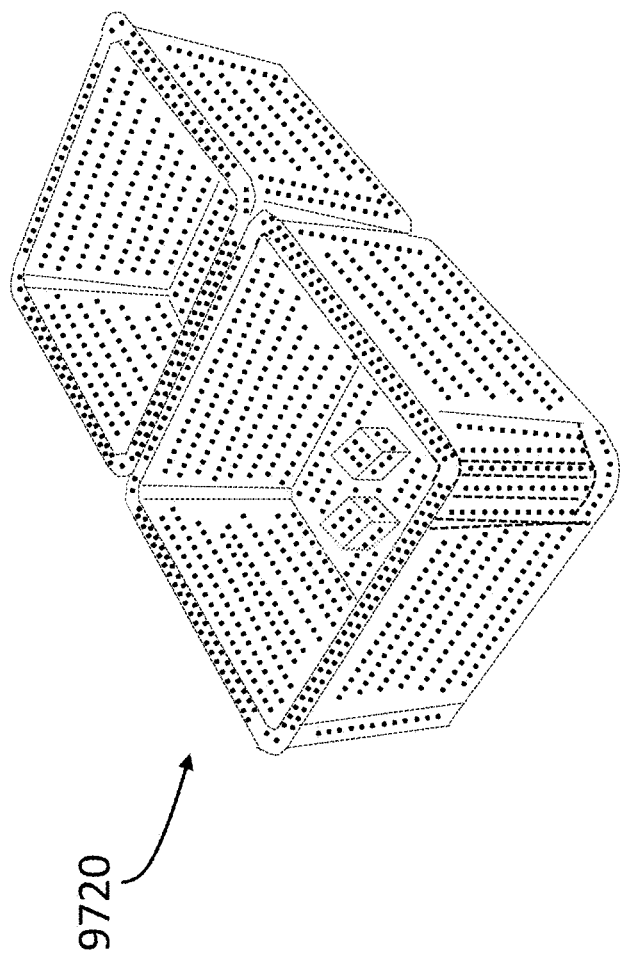
FIG. 9 illustrates sensed structure information based on image information, according to an embodiment hereof.

Returning to FIG. 4, the method 4000 may in an embodiment include a step 4012, in which the computing system 1100 updates the sensed structure information based on the second image information. The sensed structure information, after it is updated, may be referred to as updated sensed structure information. In some implementations, step 4012 may involve incorporating values, such as depth values or coordinates, from the second image information into the sensed structure information (e.g., 6720). If the sensed structure information, after being generated or updated in step 4004, includes values from the first image information, then step 4012 may generate updated sensed structure information which combines the first image information and the second image information, such as by containing both the first image information and the second image information. For instance, FIG. 6 illustrates sensed structure information 6720, which may be a global point cloud that incorporates or otherwise includes coordinates described by the first image information 5720. The sensed structure information 6720 in this example may represent a portion of an object structure for the object 3722 and/or 3721, or more specifically represent a rim and bottom inner surface for the object structure of the object 3722 and/or 3721. In this example, the computing system 1100 may update the sensed structure information 6720 by updating the global point cloud to insert or otherwise incorporate coordinates described by the second image information 8720 of FIG. 8B. The sensed structure information 6720 may be updated to yield updated sensed structure information 9720 of FIG. 9, which may be, e.g., an updated version of the global point cloud that includes a plurality of coordinates for representing the object structure associated with an object (e.g., 3721/3722). The plurality of coordinates of the updated version of the global point cloud may combine or otherwise merge coordinates that are described by the first image information 5720 and coordinates that are described by the second image information 8720. As stated above, the second image information may in some situations represent a perspective view of the object (e.g., 3721/3722). The perspective view may allow the second image information to represent at least a side portion(s) of the object structure for the object (e.g., 3721/3722). Because the updated sensed structure information (e.g., 9720) incorporates the second image information, the updated sensed structure information (e.g., 9720) may also represent the side portion(s) of the object structure. If the object (e.g., 3721/3722) in the camera field of view (e.g., 3202) has a ridge pattern on one or more outer side surfaces of the object, the updated sensed structure information (e.g., 9720) may describe or otherwise represent the ridge pattern.

Returning to FIG. 4, the method 4000 may in an embodiment include a step 4014 in which the computing system 1100 determines an object type associated with the object (e.g., 3722) in the camera field of view, wherein the determination may be based on the updated sensed structure information (e.g., 9720). For instance, if the objects 3721, 3722 are containers, step 4014 may involve determining a container type associated with the object 3721, and/or a container type associated with the object 3722. In an embodiment, the object type may be associated with a particular object design, which may include a physical design and/or visual design. In this embodiment, the physical design may refer to, e.g., a physical structure (also referred to as object structure) of objects belonging to otherwise associated with an object type. The physical structure may be characterized by an object shape, object size, and/or by physical features (e.g., a ridge pattern) disposed on a surface of objects associated with the object type.

Figure 10A:
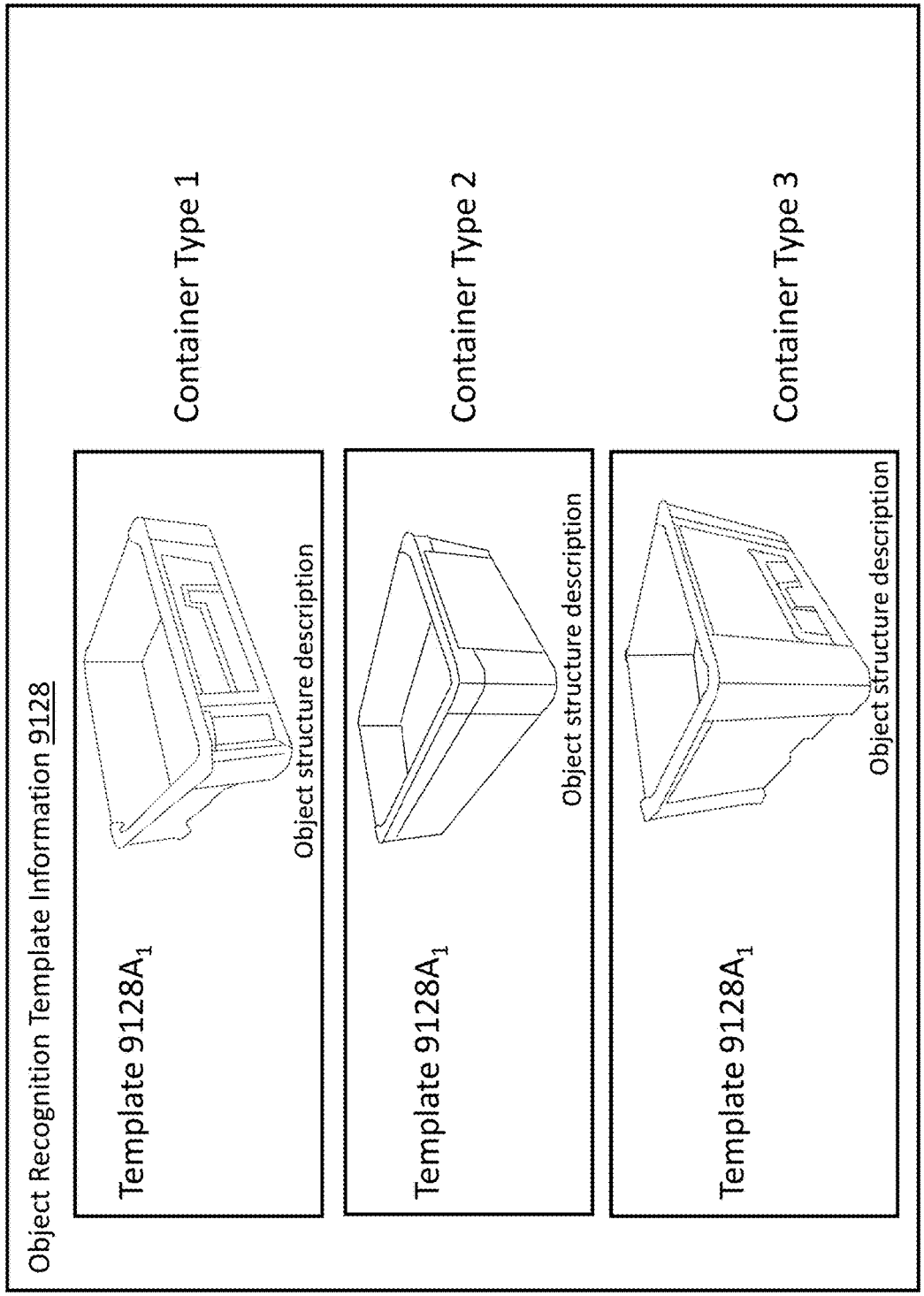
FIGS. 10A and 10B illustrate object recognition templates, according to an embodiment hereof.

In an embodiment, an object type may be associated with an object recognition template, such as a template which is described by the object recognition template information 1128 of FIG. 2D. In one example, the object recognition template may be a container template which describes a container design, or more specifically a visual design and/or physical design for a container type. If the object recognition template information 1128 describes multiple object recognition templates, the multiple object recognition templates may be associated with different object types, respectively. For instance, FIG. 10A depicts object recognition template information 9128 (which may be an embodiment of the object recognition template information 1128) that describes object recognition templates $9128A_1$, $9128A_2$, and $9128A_3$. In this example, the object recognition templates $9128A_1$, $9128A_2$, and $9128A_3$ may be associated with three different respective object types, namely container type 1, container type 2, and container type 3, respectively. The object recognition templates $9128A_1$, $9128A_2$, and $9128A_3$ stored or otherwise described by the template information 9128 may be used to populate a candidate set, or more specifically a template candidate set. The template candidate set may represent a set of candidate object recognition templates which may be candidates for potentially matching the object (e.g., 3722) in the camera field of view, or more specifically matching the updated sensed structure information. As discussed below, the computing system 1100 may compare the updated sensed structure information (e.g., global point cloud) against these candidate templates, to determine whether any object recognition template matches the updated structure information, and/or determine which object recognition template provides the best match.

In some implementations, some or all of the object recognition templates (e.g., $9128A_1$, $9128A_2$, and $9128A_3$) may each include a respective object structure description (also referred to as structure description information). The object structure description of an object recognition template may describe a physical design, or more specifically an object structure, for an object type associated with the object recognition template. In some instances, the object structure description may include a CAD file which describes the object structure. In some instances, the object structure description may include a point cloud (also referred to as a template point cloud) that describes a contour of the object structure, such as by describing edges, surfaces, a pattern of ridges, or other physical features which form the object structure. In an embodiment, the set of object recognition templates (e.g., $9128A_1$, $9128A_2$, and $9128A_3$) may describe a set of object structure models, which may describe respective object shapes, physical designs, or generally object structures associated with the respective container types. For instance, if the object structure description in an object recognition template includes a CAD file, the object structure model associated with the object recognition template may be a CAD model described by the CAD file. FIG. 10A provides an example in which the set of object recognition templates $9128A_1$ through $9128A_3$ describes a set of three object structure models, respectively, in their object structure description.

Figure 10B:
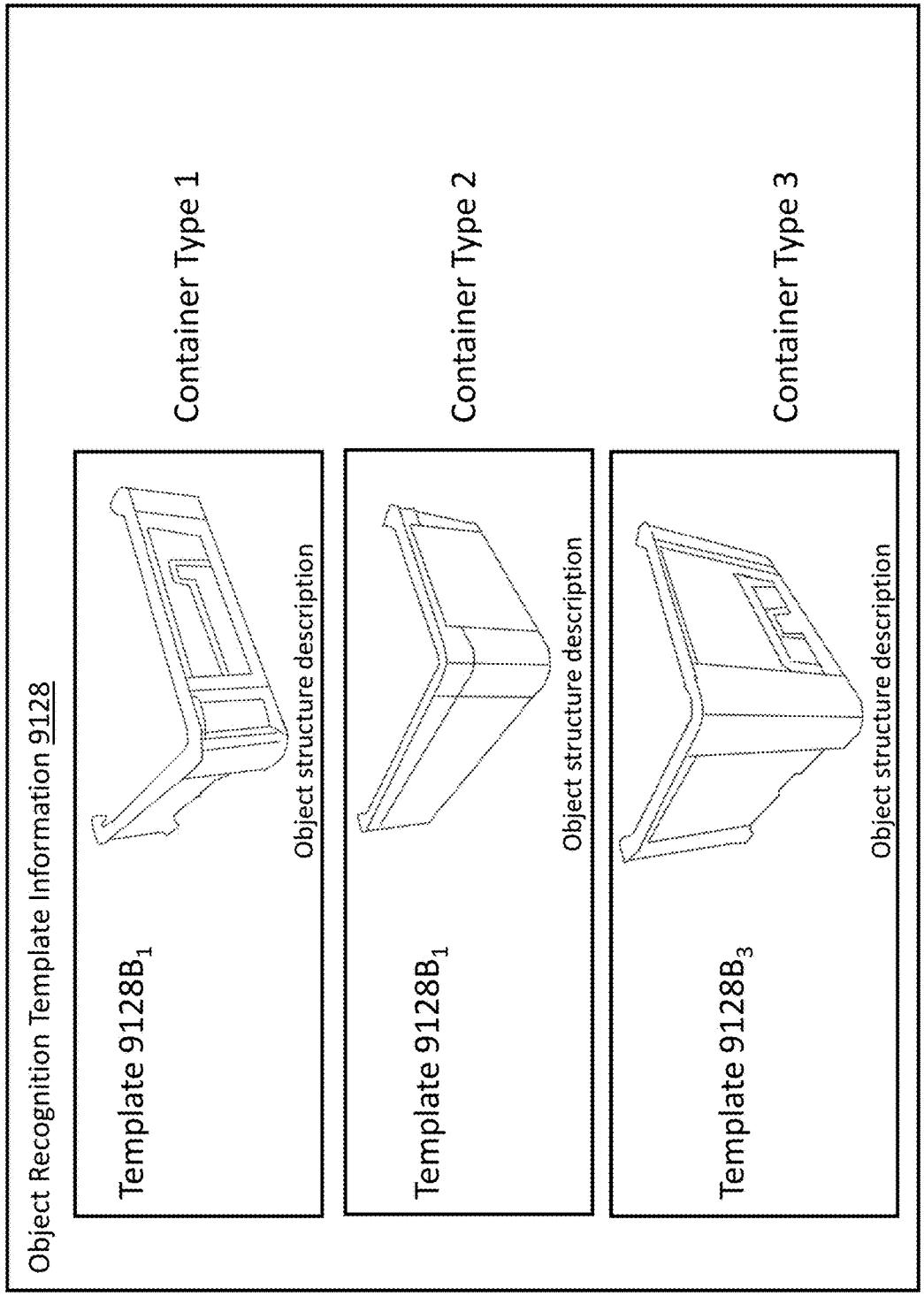

In an embodiment, the object structure description in an object recognition template may include a direct description of one portion of an object structure, and may omit a direct description of a remaining portion of the object structure, because the remaining portion of the object structure may have structural detail which is the same or substantially the same as the portion of the object structure directly described by the object recognition description. For example, FIG. 10B illustrates the object recognition template information 9128 describing object recognition templates $9128B_1$, $9128B_2$, and $9128B_3$, which may also be associated with container type 1, container type 2, and container type 3, respectively, and which may describe respective container structures associated with the container types 1 through 3. In the example of FIG. 10B, each of the object recognition templates $9128B_1$, $9128B_2$, and $9128B_3$ may have an object structure description that directly describes structural detail for two perpendicular sides of a respective container structure while omitting a direct description of two remaining perpendicular sides of the respective container structure. The direct description of the two remaining perpendicular sides may be omitted because their structural details may be the same or substantially the same as the structural detail described by the object structure description. In other words, the object structure description may already indirectly describe the two remaining perpendicular sides of the respective container structure.

Figure 11A:
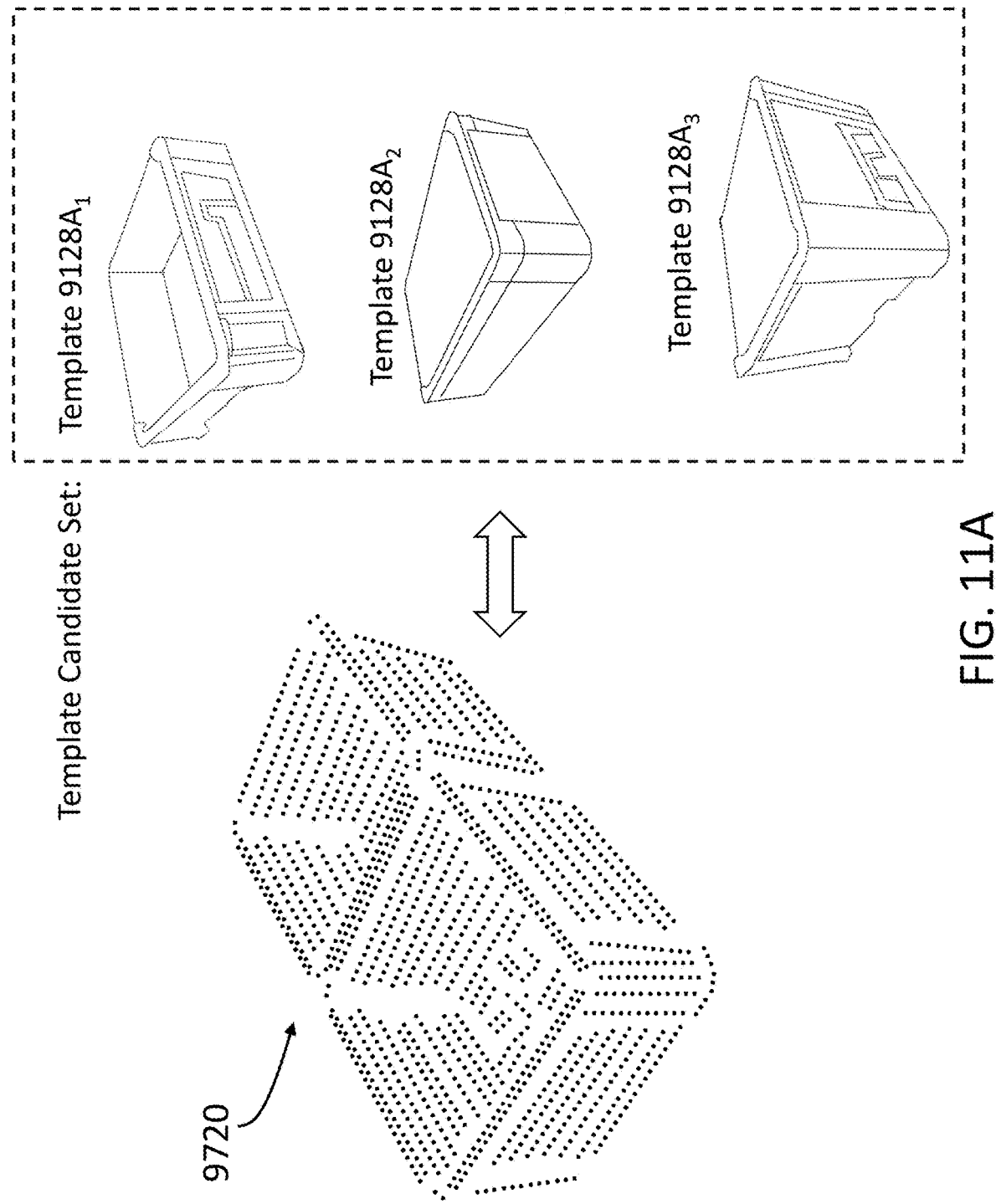
FIGS. 11A and 11B illustrate a comparison between sensed structure information and a set of object recognition templates, according to an embodiment hereof.
Figure 11B:
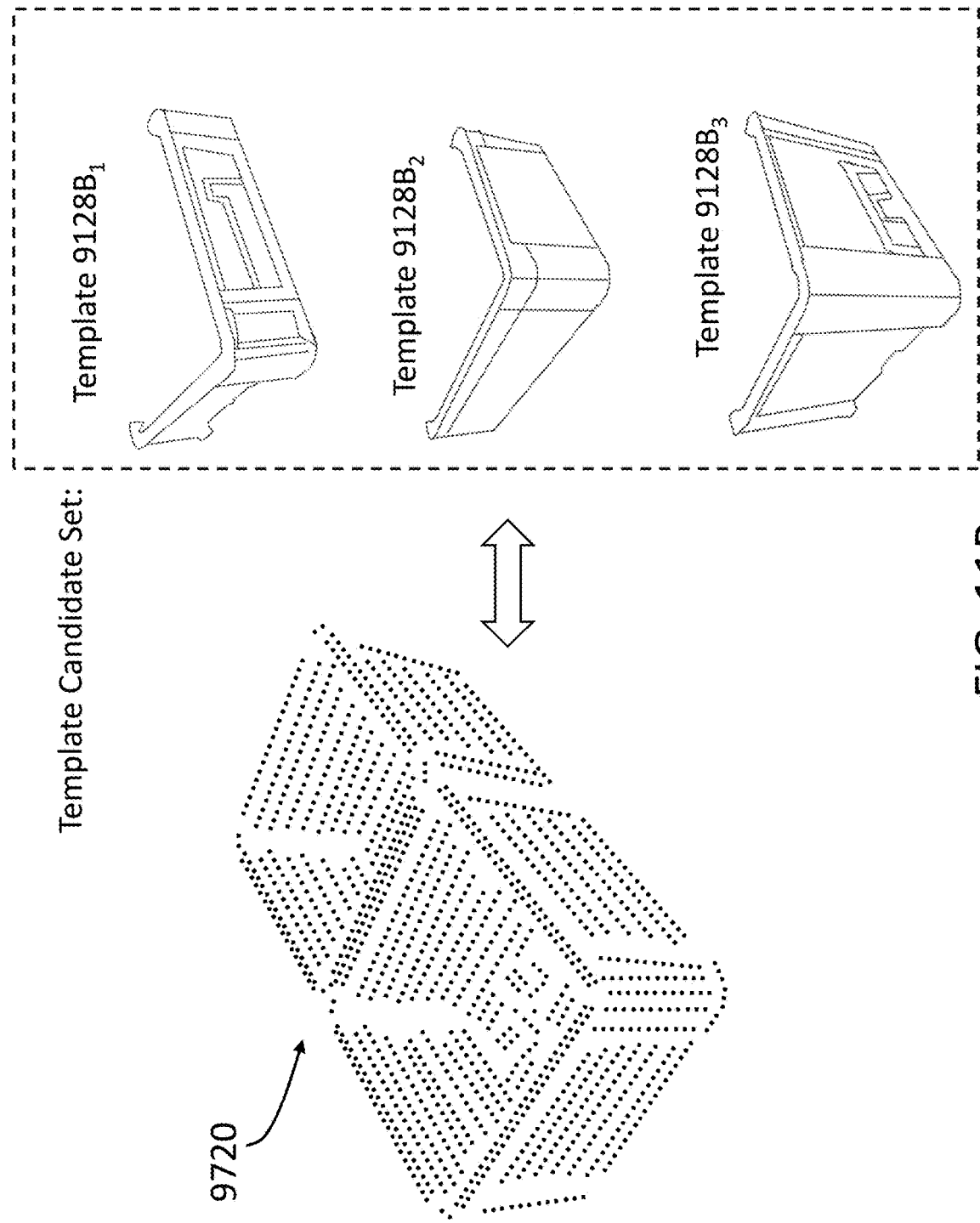

As stated above, the object recognition templates (e.g., $9128B_1$ through $9128B_3$) that are stored on the computing system 1100 or elsewhere may be used to populate a template candidate set, which may be a set of object recognition templates, wherein the object recognition templates in the set may describe object structures associated with different object types (e.g., container type 1, 2, and 3). In an embodiment, determining the object type associated with an object (e.g., 3722) may involve performing a comparison between the updated sensed structure information of step 4012 (e.g., global point cloud) against the object recognition templates in the template candidate set. As an example, FIG. 11A illustrates a comparison of the updated sensed structure information 9720, which may represent an object structure for the object 3721 and an object structure for the object 3722 of FIG. 8A, against a template candidate set that includes object recognition templates $9728A_1$ through $9728A_3$. Similarly, FIG. 11B illustrates a comparison of the updated sensed structure information 9720 with a template candidate set that includes object recognition templates $9728B_1$ through $9728B_3$.

In an embodiment, the comparison discussed above may be used to determine respective degrees by which each object recognition template (e.g., $9728A_1$ through $9728A_3$ or $9728B_1$ through $9728B_3$) in the template candidate set matches the updated sensed structure information. The comparison may indicate how well each of the object recognition templates is supported or explained by the updated sensed structure information (e.g., global point cloud). In one example, the computing system 1100 may select, based on the comparison, an object recognition template (e.g., 9728A₃ or 9728B₃) from the template candidate set. The selected object recognition template may represent an object type (e.g., container type 3) associated with the object (e.g., 3722). More particularly, the selected object recognition template may be associated with the object type. Thus, in this example, determining the object type for an object in a camera field of view may involve selecting an object recognition template which is associated with the object type.

In an embodiment, the selection of the object recognition template may be based on, e.g., which object recognition template of the template candidate set most closely matches the updated sensed structure information. As discussed below in more detail, the comparison may involve determining error values that each describes a respective amount of deviation between an object recognition template and the updated sensed structure information. In such a scenario, the selection of the object recognition template may be based on the error values, as discussed below in more detail. In an embodiment, the computing system 1100 may be configured to use the object structure description in the selected object recognition template in step 4016, to determine one or more robot interaction locations. If the object structure description includes an object structure model, the computing system may be configured to use the object structure model of the selected object recognition template to determine the one or more robot interaction locations.

As stated above, the computing system 1100 may compare updated sensed structure information against a set of candidate object recognition templates, or more specifically against a set of respective object structure descriptions in those object recognition templates. For example, if the updated sensed structure information describes a plurality of ridges protruding from a side surface of an object structure (e.g., container structure), the computing system 1100 may detect the plurality of ridges based on the updated sensed structure information and/or the second image information, and may compare the detected ridges against ridges or other physical features described by the object structure descriptions in the object recognition templates. In such an example, the object type (e.g., container type) for an object in the camera field of view may be determined based on selecting which object recognition template best matches the detected ridges on the outer side surface of the object. Thus, the object type in this example may be determined based on the detected ridges on the outer side surface of the container structure. In some instances, the set of object structure descriptions may describe a set of respective object structure models. In some instances, the comparison may take into account an orientation of the object structure models. Thus, the computing system 1100 may more specifically compare the updated sensed structure information against candidate combinations of object structure models and orientations for those object structure models. In this example, the template candidate set may more specifically be a model-orientation candidate set, which may be a set that includes model-orientation combinations. Each of the model-orientation combinations in the candidate set may be a combination of: (i) an object structure model that is one of the set of object structure models discussed above, and (ii) an orientation for the object structure model. In such an example, the computing system 1100 may compare the updated sensed structure information against model-orientation combinations in the model-orientation candidate set.

In an embodiment, if an object structure model represents or describes a plurality of outer side surfaces (also referred to as outer lateral surfaces) of an object structure for a particular object type, the orientation of the object structure model may refer to a respective direction that each of the plurality of outer side surfaces is facing. In an embodiment, the orientation of an object structure model may refer to how the computing system 1100 is attempting to align the object structure model with a point cloud or other sensed structure information. In one example, the point cloud may represent, e.g., at least a first outer side surface and a second, perpendicular outer side surface of a container or other object in a camera field of view (e.g., 3202). In this example, the object structure model may also represent or describe at least a first outer side surface and a second outer side surface for an object type associated with the object structure model, wherein the second outer side surface of the object structure model may be perpendicular to the first outer side surface thereof. The first outer side surface and the second outer side surface described by the point cloud and/or by the object structure model may represent, e.g., two perpendicular sidewalls of a container or container structure.

In some instances, a first orientation for the object structure model may refer to the computing system 1100 determining how well the first outer side surface and the second outer side surface of the object structure model align with the first outer side surface and the second outer side surface, respectively, represented by the point cloud. More specifically, when the object structure model has the first orientation, the computing system 1100 may compare physical features (e.g., ridges) or other properties (e.g., size) of the first outer side surface of the object structure model against physical features or other properties of the first outer side surface described by the point cloud, and may compare physical features or other properties of the second outer side surface of the object structure model against physical features of the second outer side surface described by the point cloud. Further in this example, the second orientation for the object structure model may involve a rotation of the first outer side surface and the second outer side surface of the object structure model by 90 degrees relative to the first orientation. When the object structure model has the second orientation, the computing system 1100 may determine how well the first outer side surface and the second outer side surface of the object structure model align with the second outer side surface and the first outer side surface, respectively, described by the point cloud. More specifically, when the object structure model has the second orientation, the computing system 1100 may compare physical features or other properties of the first outer side surface of the object structure model against physical features of the second outer side surface described by the point cloud, and may compare physical features or other properties of the second outer side surface of the object structure model against physical features of first outer side surface described by the point cloud.

In an embodiment, the alignment between the object structure model and the point cloud may be better when the object structure model has one of the first orientation or the second orientation, relative to when the object structure model has the other of the first orientation or the second orientation. Such an embodiment may occur because the first outer side surface and the second outer side surface described by the object structure model may have different physical features, such as different ridge patterns, and/or other different properties (e.g., different sizes). As an example, if the first outer side surface of the object structure model corresponds to the first outer side surface sensed by the point cloud, then a level of alignment between physical features (e.g., a ridge pattern) described by the object structure model and physical features (e.g., a ridge pattern) described by the point cloud may be better when the object structure model has the first orientation than when the object structure model has the second orientation, because the first orientation may result in the first outer side surface of the object structure model being compared with the first outer side surface of the point cloud.

Figure 12B:
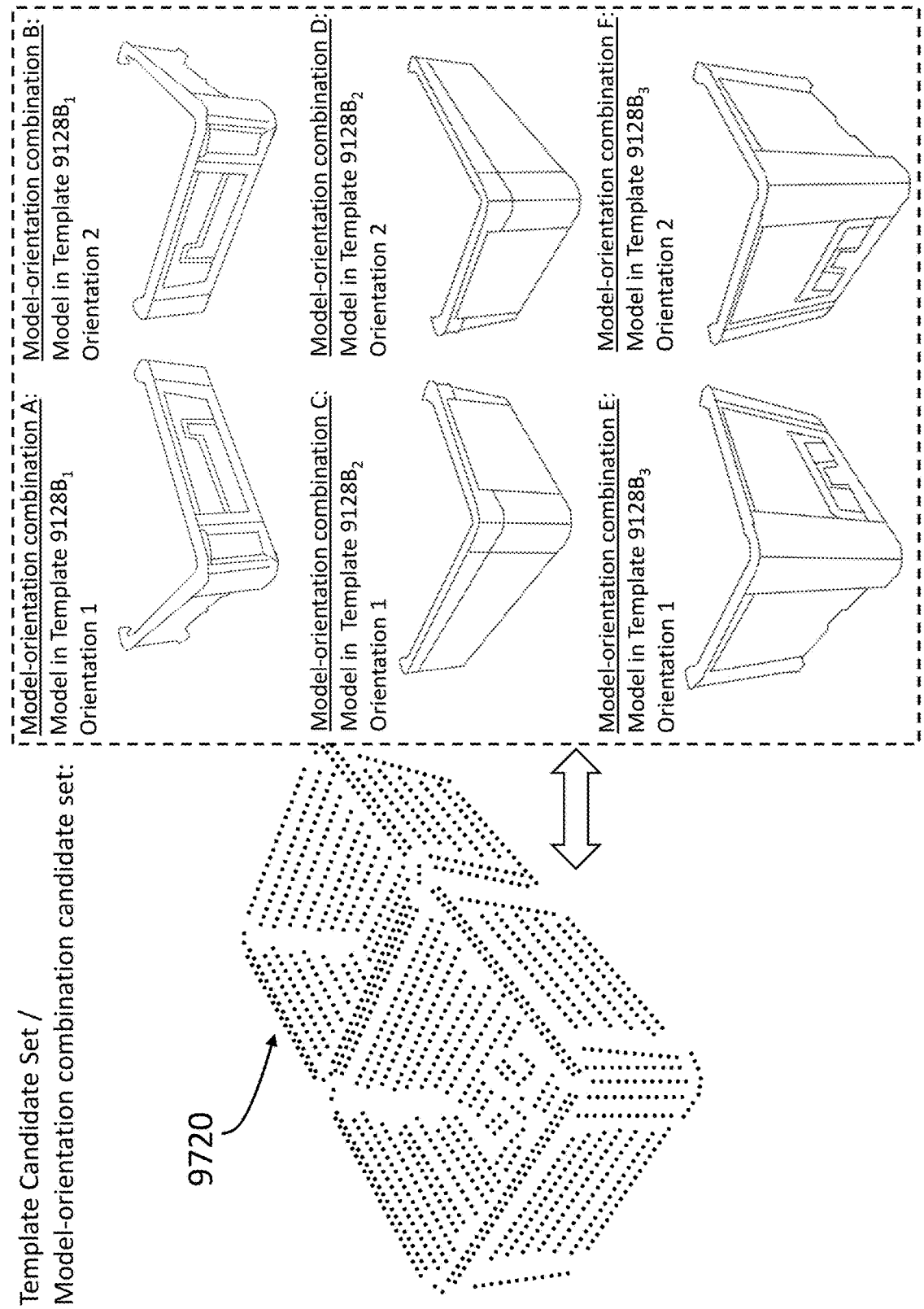

For instance, FIGS. 12A and 12B illustrate comparisons between the updated sensed structure information 9720 and a model-orientation candidate set that includes model-orientation combinations A through F (as illustrated in FIG. 12B) or U through Z (as illustrated in FIG. 12A). In FIG. 12A, each model-orientation combination may be a combination of: (i) an object structure model described by one of the object recognition templates $9128A_1$ through $9128A_3$, and (ii) an orientation for that object structure model. Similarly, each model-orientation combination in FIG. 12B may be a combination of: (i) an object structure model described by one of the object recognition templates $9128B_1$ through $9128B_3$, and (ii) an orientation for that object structure model. As an example, the model-orientation combination Y in FIG. 12A may be a combination of an object structure model described by the object recognition template $9128A_3$, and a first orientation for the object structure model, while the model-orientation combination Z may be a combination of the same object structure model and a second orientation for the object structure model. In this embodiment, determining an object type for an object in a camera field of view may more specifically involve selecting a particular model-orientation combination, wherein an object structure model of the selected combination is associated with the object type. The object structure model and an orientation of the selected model-orientation combination may be used by the computing system 1100 to determine robot interaction locations, as discussed below in more detail. If the selection involves determining error values by the computing system 1100, such error values in this embodiment may be associated with model-orientation combinations in the model-orientation candidate set.

In an embodiment, the computing system 1100 may, as part of step 4014, determine whether to filter out an object recognition template(s) from the template candidate set or whether to filter out a model-orientation combination(s) from the model-orientation candidate set. Filtering out the templates or combinations may remove them from being considered as a potential match to the updated sensed structure information (e.g., 9720). In some instances, if the computing system 1100 determines error values based on the template candidate set or the model-orientation candidate set, they may be determined after these candidate sets have been filtered, which may reduce a total number of error values that need to be calculated, and thus conserve computing resources. In other words, the filtering may generate a filtered candidate set, and the error values may be generated based on object recognition templates or model-orientation combinations in the filtered candidate set.

In an embodiment, determining whether to filter out an object recognition template or a model-orientation combination from the candidate set (e.g., template candidate set of model-orientation candidate set) may involve determining whether a corresponding object structure model has at least a portion which falls outside a region occupied by the updated sensed structure information (e.g., 9720). More specifically, the updated sensed structure information may estimate a region of space occupied by an object structure for an object (e.g., 3722) in the camera field of view (e.g., 3202). If a particular object recognition template or model-orientation combination includes an object structure model which falls outside the region of space, the computing system 1100 may determine that there is a high probability that the object structure model does not represent the object, and that it is therefore unnecessary to even determine an error value for the object recognition template or model-orientation combination. Thus, the computing system 1100 may remove the template or the combination from the candidate set.

As an example, the computing system 1100 may filter the template candidate set of FIG. 11A or 11B by identifying one or more object recognition templates which include one or more respective object structure models that do not fit or do not substantially fit within the estimated region, and removing those one or more object recognition templates from the template candidate set. In other words, the computing system 1100 may determine whether to filter out a particular object recognition template from the candidate set by determining whether an object structure model described by the object recognition template is sufficiently supported or explained by the updated sensed structure information. Such a determination may involve whether the object structure model substantially fits within the estimated region of space occupied by the object structure. There may be a substantial fit when the object structure model completely fits within the estimated region, or when a percentage of the object structure model that falls outside of the estimated region is less than a predefined threshold. If the object structure model does not substantially fit within the estimated region, the computing system 1100 may determine that the object structure model is not sufficiently supported or is not sufficiently explained by the updated sensed structure information (e.g., 9702) associated with the object structure. Thus, the computing system 1100 may filter out the object recognition template by removing the object recognition template from the template candidate set.

In an embodiment, the computing system 1100 may perform the filtering operation by determining, for an object recognition template in the template candidate set, whether an object structure model described by the object recognition template substantially fits within the estimated region for at least one orientation of the object structure model. If there is at least one orientation of the object structure model which would cause the object structure model to substantially fit within the estimated region, the computing system may determine not to filter out the associated object recognition template from the template candidate set.

Figure 13A:
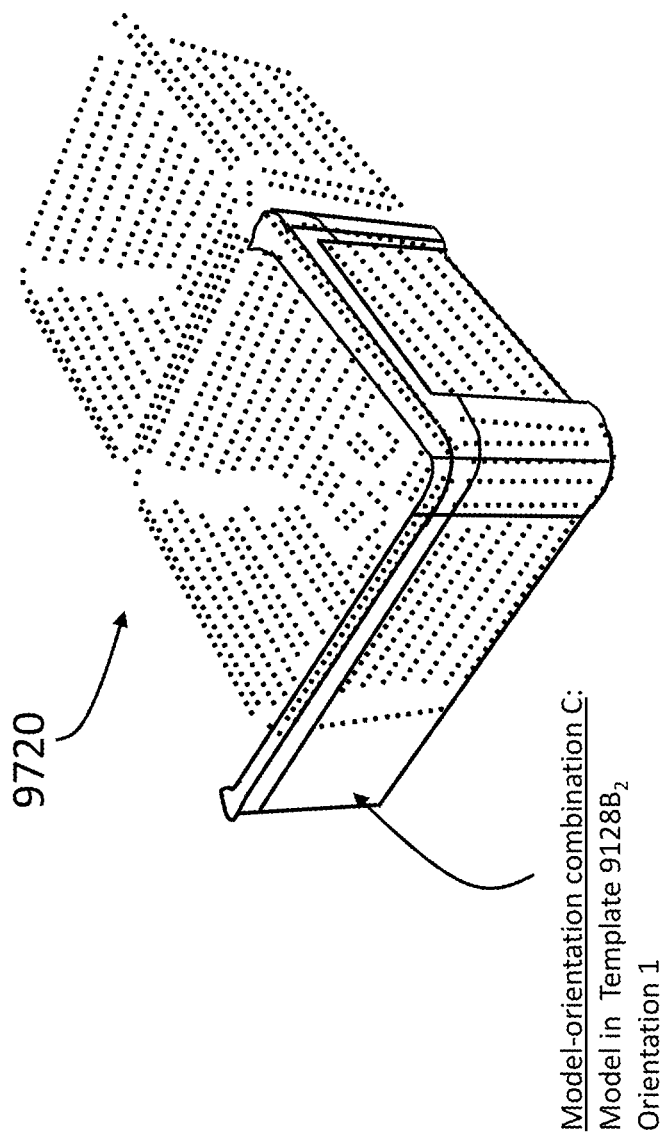

In an embodiment, the computing system 1100 may filter out a candidate orientation, or more specifically a candidate combination of an object structure model and an orientation for that object structure model. In such an embodiment, the computing system 1100 may more specifically determine whether to filter out a model-orientation combination from a model-orientation candidate set. As an example, the model-orientation candidate set may include model-orientation combination A through F in FIG. 12B. In this example, the computing system 1100 may be configured to perform a filtering operation by determining, for each of the model-orientation combinations in the candidate set, whether to remove the model-orientation combination from the candidate set. More particularly, the computing system may determine whether an object structure model included in or associated with the model-orientation combination substantially fits within the estimated region discussed above when the object structure model has an orientation associated with the model-orientation combination. For example, FIG. 13A depicts an example involving a determination of whether to filter out the model-orientation combination C from the model-orientation candidate set. As illustrated in FIG. 13A, this model-orientation combination may involve an object structure model described in the object recognition template $9128B_2$, and may involve the object structure model having orientation 1. The computing system 1100 may determine that the object structure model included in the model-orientation combination C, when having the orientation indicated in or associated with the model-orientation combination C, does not substantially fit within an estimated region defined by the updated sensed structure information 9720. In response to such a determination, the computing system 1100 may remove the model-orientation combination C from the model-orientation candidate set, or may generate an indication that the model-orientation combination C is to be removed from the candidate set. FIG. 13B depicts the model-orientation candidate set after the model-orientation combination C is removed. The model-orientation candidate set may represent a filtered candidate set.

Figure 13C:
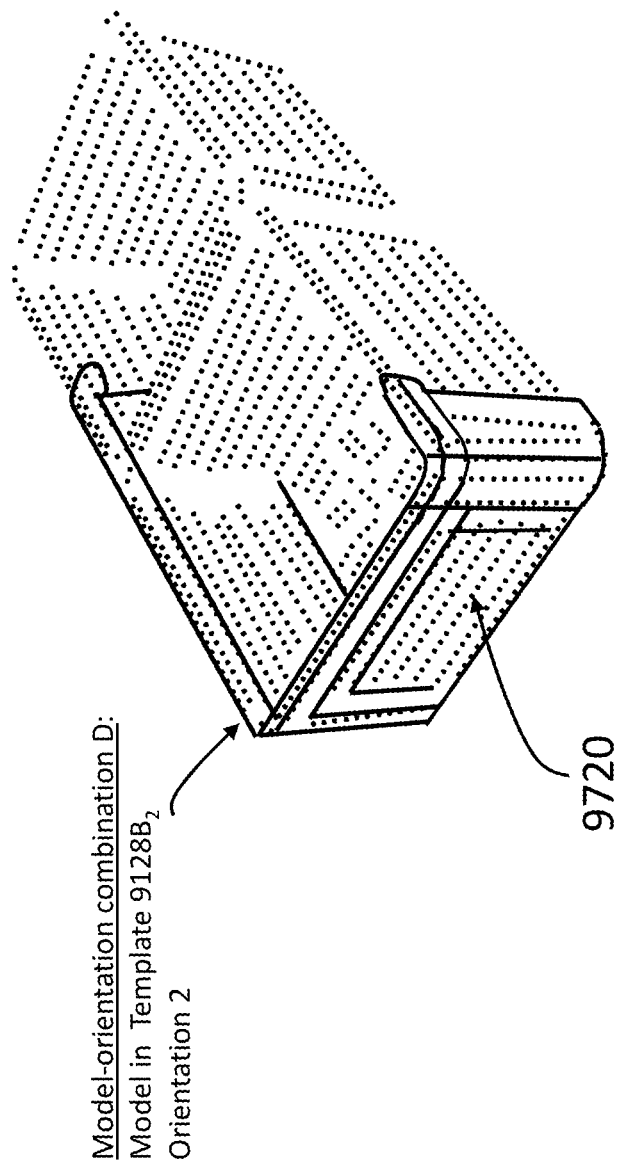

FIG. 13C depicts another example of determining whether a model-orientation combination (model-orientation combination D) is to be removed from the model-orientation candidate set. More particularly, the computing system 1100 in this example may determine whether an object structure model associated with the model-orientation combination D, when having an orientation (orientation 2) associated with the model-orientation combination D, substantially fits within the estimated region defined by the updated sensed structure information. This object structure model may be the same as the object structure model of the model-orientation combination C, but may have a different orientation than the orientation of the model-orientation combination C. In this example, the computing system 1100 may determine that the object structure model associated with the model-orientation combination D substantially fits within the estimated region when the object structure model has the orientation associated with the model-orientation combination D. As a result, the computing system 1100 may determine not to remove the model-orientation combination from the candidate set.

As discussed above, the computing system 1100 may determine a set of error values for model-orientation combinations in the model-orientation candidate set after the candidate set has been filtered. For instance, the computing system 1100 may determine to filter out the model-orientation combination C of FIG. 12B from the candidate set, and determine not to filter out the model-orientation combinations A, B, D, E, and F. In this example, the computing system 1100 may determine error values for model-orientation combinations A, B, D, E, and F, which remain in the candidate set after the candidate set has been filtered.

In an embodiment, the computing system 1100 may perform a refinement operation (e.g., a pose refinement operation) that adjusts object structure description in an object recognition template, or more specifically pose information associated with physical features described by the object recognition template, so as to cause the object structure description more closely match the updated sensed structure information (relative to a level of match before the adjustment). In some instances, the pose refinement operation may be performed with respect to an object structure model associated with an object recognition template, and more specifically with respect to an object structure model associated with a model-orientation combination. The object recognition template, object structure description, pose information, and the object structure model may, after they have been adjusted by the pose refinement operation, be referred to as a refined object recognition template, refined object structure description, refined pose information, and a refined object structure model, respectively.

In some implementations, the pose refinement operation discussed below may be performed in parallel with the comparison between object recognition templates and sensed structure information. For instance, if the filtering operation discussed above is performed, the pose refinement operation may be performed in parallel with the filtering operation and/or in parallel with the calculation of error values, which is discussed below in more detail. In some implementations, the pose refinement operation may be performed before the comparison between object recognition templates and sensed structure information. For example, the pose refinement operation may be performed before the filtering operation, and/or before the calculation of error values. In some implementations, the pose refinement operation may be performed after the filtering operation, and/or before the calculation of error values. In such implementations, the pose refinement operation may be performed on object recognition templates in the template candidate set or the model-orientation candidate set after those candidate sets have been filtered.

Figure 14:
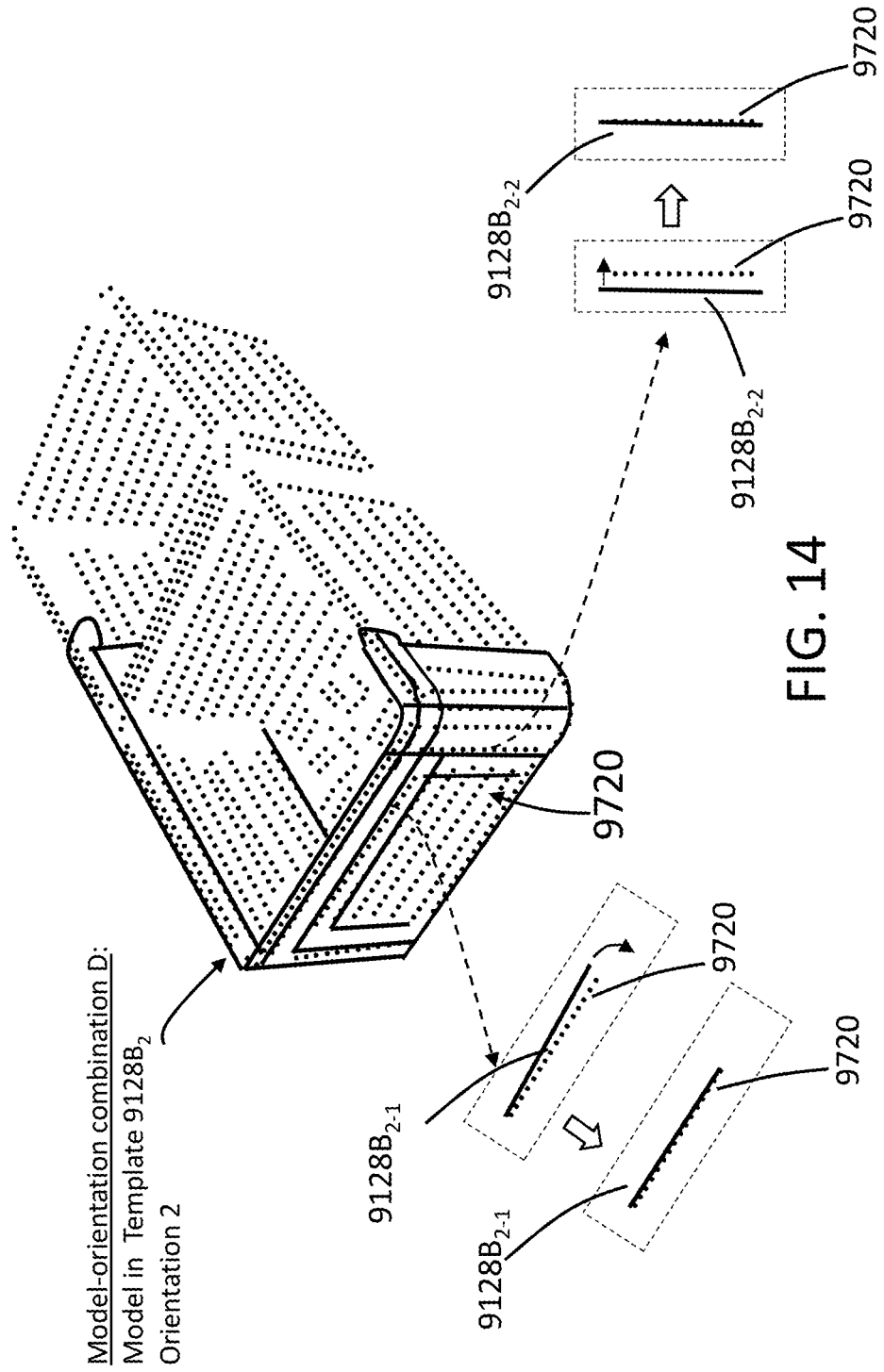
FIG. 14 illustrates various aspects of a pose refinement operation, according to an embodiment hereof.

For example, FIG. 14 illustrates a pose refinement operation that involves adjusting the object structure model associated with the object recognition template $9128B_2$, or more specifically the object structure model associated with the model-orientation combination D of FIGS. 12B and 13B, so as to generate a refined object recognition template, or more specifically a refined object structure model. In some implementations, the object structure model being adjusted may describe at least one physical feature (e.g., edge, corner, ridge, outer surface) for an object structure associated with the object recognition template $9128B_2$ and associated with the object structure model. In the example of FIG. 14, the object structure model being adjusted may describe physical features $9128B_{2-1}$, $9128B_{2-2}$, each of which may be a respective edge of the object structure associated with or represented by the object recognition template $9128B_2$. More particularly, the object structure model being adjusted may include pose information that describes respective poses of the physical features $9128B_{2-1}$, $9128B_{2-2}$, which may refer to a combination of a location and orientation of the physical features $9128B_{2-1}$, $9128B_{2-2}$. As stated above, the computing system 1100 may adjust the pose information in the object structure model based on the updated sensed structure information, so as to generate refined pose information and/or a refined object structure model. For instance, as illustrated in FIG. 14, the computing system 1100 may adjust the pose information to indicate an adjustment for the physical feature $9128B_{2-1}$, and/or an adjustment for the physical feature $9128B_{2-2}$. The adjustment may involve, e.g., changing an orientation for the physical feature $9128B_{2-1}$ by, e.g., 0.5 to 1 degree, so as to rotate the physical feature $9128B_{2-1}$ closer toward one group of coordinates described by the updated sensed structure information 9720. The adjustment may further involve shifting a location for the physical feature $9128B_{2-2}$ by, e.g., 2-5 mm, so as to move the physical feature $9128B_{2-2}$ closer toward another group of coordinates described by the updated sensed structure information 9720. The adjustment may cause the physical features $9128B_{2-1}$, $9128B_{2-2}$ described by the refined object structure model being generated in FIG. 14 to be more closely matched by the updated sensed structure information 9720.

In some instances, the pose refinement may generate refined pose information, a refined object structure model, and/or a refined object recognition template that provides enhanced accuracy for comparison with sensed structure information (e.g., the updated sensed structure information of step 4012). If the refined object recognition template is used to determine robot interaction locations, as discussed below in more detail, the enhanced accuracy of the refined pose information in the refined object recognition template may cause the robot interaction locations to be more optimal. In some instances, the enhanced accuracy of the refined pose information in the object recognition template may facilitate determining object type, such as by facilitating the comparison between the refined object recognition templates and the updated sensed structure information. The comparison may involve determining error values that indicate respective degrees of deviation between the refined object recognition templates and the updated sensed structure information. In such an example, the pose refinement operation may be performed to adjust the object recognition templates before the error values are determined. In some scenarios, the adjustment of the object recognition templates may cause the error values to be more reliable or more useful for determining which object recognition template, after being adjusted by the pose refinement operation, most closely matches the updated sensed structure information.

In some implementations, the pose refinement may facilitate a robust determination of object type in a real-world, non-ideal environment which may be affected by manufacturing tolerance, physical damage, or other sources of deviation between an object structure model and actual objects associated with the model. For example, the manufacturing tolerance may cause objects of the same object type to have minor structural variations, and thus may cause at least some of those objects to exhibit differences when compared to an object recognition template, or more specifically an object structure model, associated with the object type. As another example, some of those objects may experience minor physical damage or some other form of structural change during use as a result of interaction with their environment. In these examples, the pose refinement may be used to account for a minor structural variation which may be naturally present between an actual object in the physical environment of the camera versus an object structure model associated with that object. More particularly, the pose refinement operation may adjust the object structure model to cause the refined object structure model to be closer to the sensed structure information for the object, so as to reduce the deviation discussed above.

In an embodiment, the computing system may perform a comparison between object recognition templates in the template candidate set and updated sensed structure information by calculating or otherwise determining at least one respective error value for each object recognition template in the candidate set. For instance, if the updated sensed structure information includes a global point cloud having a plurality of coordinates, as discussed above, the at least one respective error value may be calculated based on, e.g., how closely coordinates from the plurality of coordinates of the global point cloud match the corresponding object recognition template, or more specifically how closely the coordinates of the global point cloud matches one or more physical features (e.g., edges, corners, ridges, surfaces, etc.) described by an object structure description information included in the object recognition template. In some implementations, if the object structure description of an object recognition template includes a point cloud (also referred to as a template point cloud), an error value associated with the object recognition template may be based on respective distances between coordinates in the global point cloud and coordinates in the template point cloud. In some implementations, the template point clouds and the object recognition templates may be refined template point clouds or refined object recognition templates generated from a pose refinement operation, which is discussed above. In some implementations, an error value may indicate a degree of deviation between physical features (e.g., ridges, edges, and/or corners) described by an object structure model of an object recognition template and physical features (e.g., ridges, edges, and/or corners) described by the global point cloud.

Figure 15A:
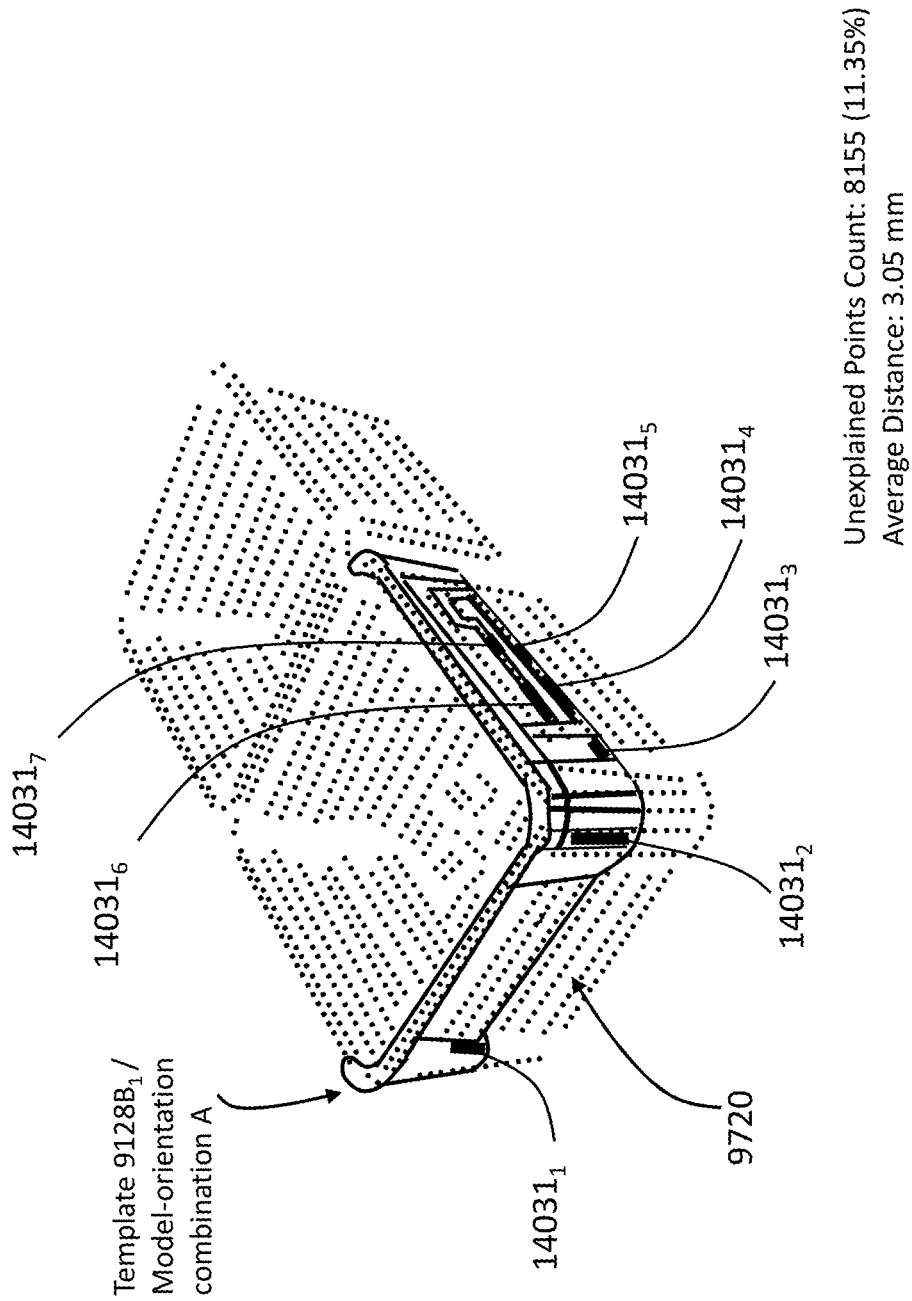
FIGS. 15A-15C illustrate various aspects of determining error values, according to an embodiment hereof.
Figure 15B:
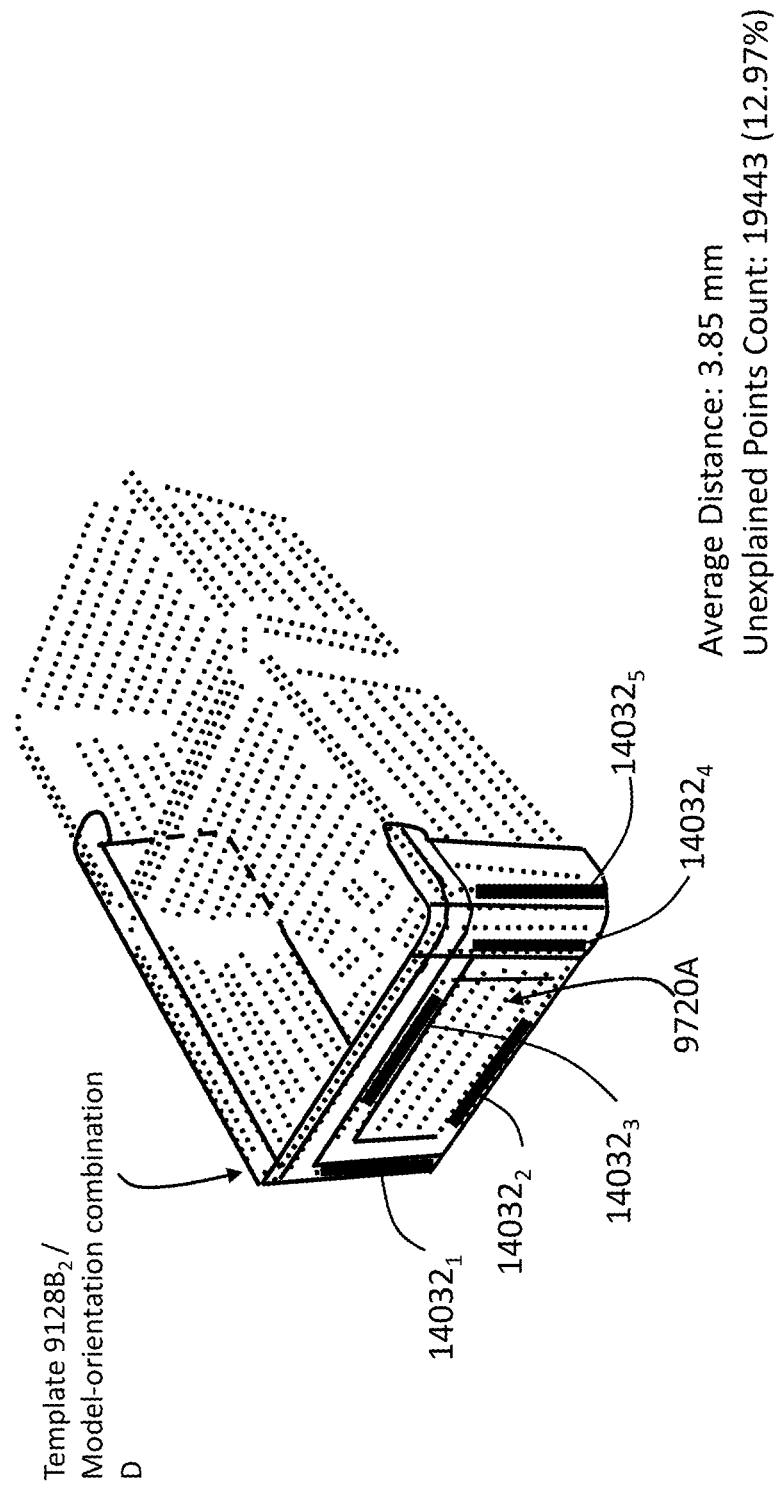
Figure 15C:
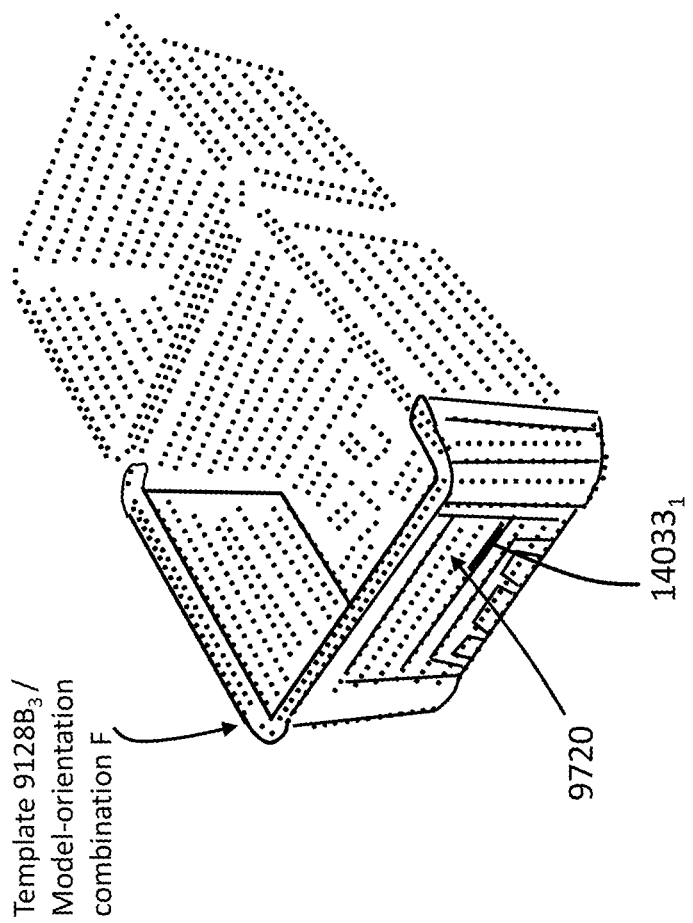
Figure 16:
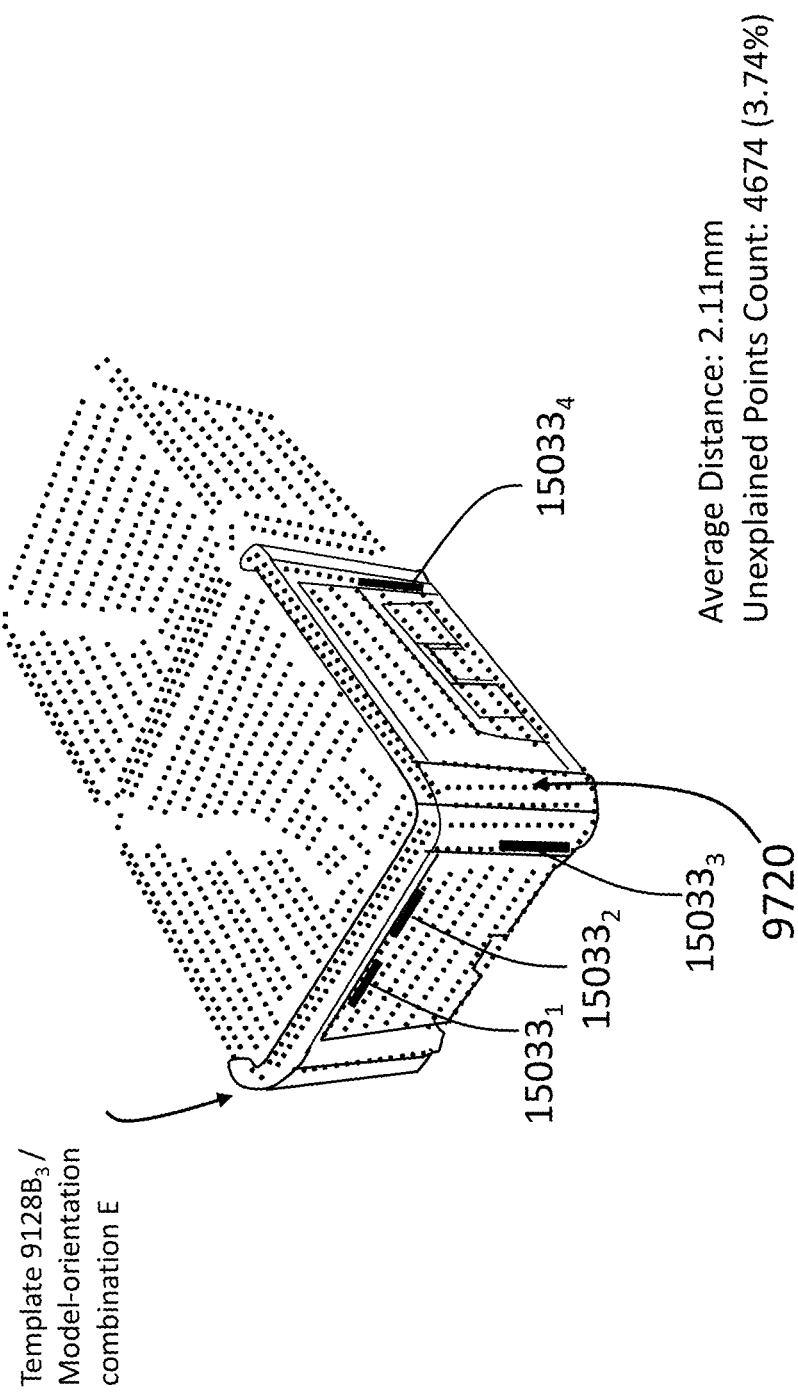
FIG. 16 illustrates an aspect of determining an error value, according to an embodiment hereof.

FIGS. 15A-15C depict an example of the computing system 1100 performing a comparison between the object recognition templates 9128B$_1$ through 9128B$_3$ (which may be, e.g., refined object recognition templates that have been adjusted by a pose refinement operation) in the template candidate set of FIG. 11B and the updated sensed structure information 9720. More specifically, FIG. 15A illustrates the computing system 1100 determining at least one error value for the object recognition template 9128B$_1$ in the template candidate set, while FIG. 15B illustrates the computing system 1100 determining at least one error value for the object recognition template 9128B$_2$ in the template candidate set, and FIG. 15C illustrates the computing system 1100 determining at least one error value for the object recognition template 9128B$_3$ in the template candidate set. In some implementations, the computing system 1100 may determine multiple error values (e.g., two error values) for an object recognition template. The multiple error values may correspond to multiple orientations, respectively, for an object structure model (e.g., a refined object structure model generated by a pose refinement operation) described by the object recognition template. For example, as discussed below in more detail, FIG. 15C may illustrate the computing system 1100 determining one error value for the object recognition template 9128B$_3$ (corresponding to one orientation), while FIG. 16 illustrates the computing system 1100 determining another error value for the object recognition template 9128B$_3$ (corresponding to another orientation).

Returning to the example in FIG. 15A, which relates to an error value associated with the object recognition template 9128B$_1$, the error value may indicate a respective degree of deviation between an object structure description (e.g., an object structure model) in the object recognition template 9128B$_1$ and the updated sensed structure information 9720. In some implementations, the computing system 1100 in FIG. 15A may detect or otherwise determine whether the object structure model of the object recognition template 9128B$_1$ has any portion which is not sufficiently explained by the updated sensed structure information 9720. As an example, the computing system 1100 may determine whether a distance between a particular portion of the object structure model and a corresponding (e.g., closest) portion of the updated sensed structure information 9720 is greater than a predefined distance threshold. For instance, if the object structure model and the updated sensed structure information 9720 are both point clouds that each includes a plurality of coordinates (also referred to as points), the computing system may determine whether the object structure model has any coordinate which is separated from a corresponding (e.g., closest) coordinate of the updated sensed structure information 9720 by more than the predefined distance threshold. If the distance separating the two corresponding coordinates is greater than the predefined distance threshold, the computing system 1100 may determine that the particular coordinate, or more generally the particular portion of the object structure model, is not sufficiently explained by the updated sensed structure information 9720. Such a portion may be referred to as an unexplained portion, or more specifically as an unexplained coordinate or unexplained point. FIG. 15A depicts an example in which the computing system 1100 determines that portions $14031_1$-$14031_7$ of the object structure model has coordinates that are not sufficiently explained by coordinates of the updated sensed structure information 9720 (e.g., global point cloud). These unexplained coordinates (also referred to as unexplained points) may form about 11% of a total number of coordinates or points in the object structure model, and may have an average distance of about 3.05 mm with corresponding coordinates in the updated sensed structure information 9720. In the example of FIG. 15A, the computing system 1100 may determine the error value associated with the object recognition template $9128B_1$ to be equal to or based on the average distance or the unexplained points count in FIG. 15A.

As illustrated in FIGS. 15B and 15C, the computing system 1100 may determine an error value associated with the object recognition template $9128B_2$ and an error value associated with the object recognition template $9128B_3$. In the example of FIG. 15B, the computing system 1100 may determine that an object structure model of the object recognition template $9128B_2$ has portions $14032_1$-$14032_5$ which have coordinates that are not sufficiently explained by the updated sensed structure information 9720. As a specific example, these unexplained coordinates may form about 13% of a total number of coordinates in the object structure model of the object recognition template $9128B_2$, and may have an average distance of about 3.85 mm from corresponding coordinates in the updated sensed structure information 9720. In the example of FIG. 15C, the computing system 1100 may determine that an object structure model of the object recognition template $9128B_3$ has a portion $14033_1$ which includes coordinates that are not sufficiently explained by the updated sensed structure information 9720. These unexplained coordinates in the portion $14033_1$ may form about 0.09% of a total number of coordinates in the object structure model, and may have an average distance of about 1.31 mm with corresponding coordinates in the updated sensed structure information 9720.

As stated above, the computing system may in an embodiment determine a set of error values associated with respective model-orientation combinations in a model-orientation candidate set, such as the candidate set of FIG. 12A, 12B, or 13B. As further discussed above, each model-orientation combination of the candidate set may be a combination of an object structure model and an orientation for the object structure model. In this example, each error value of the set of error values may indicate a respective degree of deviation between (i) the updated sensed structure information (e.g., 9720) and (ii) an object structure model of a respective model-orientation combination associated with the error value when he object structure model has an orientation associated with the respective model-orientation combination. For instance, FIGS. 15A-15C illustrate the computing system 1100 determining three error values that are associated with three respective model-orientation combinations, namely model-orientation combination A (as depicted in FIG. 15A), model-orientation combination D (as depicted in FIG. 15B), and model-orientation combination F (as depicted in FIG. 15C). FIG. 16 further illustrates the computing system 1100 determining an error value associated with model-orientation combination E. In the example of FIG. 16, the computing system 1100 may determine that when an object structure model of the object recognition template $9128B_3$ has an orientation (orientation 2) of the model-orientation combination E, the object structure model has portions $15033_1$-$15033_4$ which includes coordinates that are not sufficiently explained by the updated sensed structure information 9720. Further, the error value in FIG. 15C may indicate a degree of deviation between the updated sensed structure information 9720 and an object structure model of the object recognition template $9128B_3$ when the object structure model has orientation 1, which is an orientation of the model-orientation combination F, while the error value in FIG. 16 may indicate a degree of deviation between the updated sensed structure information 9720 and the same object structure model when the object structure model has orientation 2, which is an orientation associated with the model-orientation combination E.

In an embodiment, the computing system 1100 may be configured to determine an object type by determining the set of error values discussed above based on the updated sensed structure information, and selecting an object recognition template and/or a model-orientation combination based on the set of error values, wherein the selected object recognition template and/or an object structure model of the model-orientation combination is associated with the object type. In one example, the computing system 1100 may select an object recognition template (e.g., $9128B_3$) from among a template candidate set (e.g., $9128B_1$ through $9128B_3$). The selected object recognition template may have a lowest error value among the set of error values. For instance, if the set of error values includes the percentage values of 11.35%, 12.97%, and 0.09% associated with the object recognition templates $9128B_1$ through $9128B_3$ in FIGS. 15A-15C, the computing system 1100 may select the object recognition template $9128B_3$ associated with a lowest percentage value, namely 0.09%, among the set of percentage values.

In one example, the computing system 1100 may select a model-orientation combination from a model-orientation candidate set, such as the candidate set in FIG. 12A or 12B, or 13B. For instance, if the candidate set includes at least the model-orientation combinations A, D, F, and E illustrated in FIGS. 15A-15C and 16, then the set of error values may in one example include the set of percentage values of 11.35%, 12.97%, 0.09%, and 3.74%, in those figures. In this example, the computing system 1100 may be configured to select the model-orientation combination F, which is associated with a lowest percentage value in the set of error values. As stated above, the selected object recognition template and/or selected model-orientation combination may be associated with an object type of an object (e.g., 3722) in a camera field of view (e.g., 3202). Thus, the computing system 1100 may in an embodiment determine an object type associated with the object (e.g., 3722) in step 4014 by selecting an object recognition template or a model-orientation combination.

Returning to FIG. 4, the method 4000 may in an embodiment include a step 4016, in which the computing system 1100 may determine (e.g., via the robot interaction planning module 1122) the one or more robot interaction locations based the object type determined in step 4014. As stated above, an object type may be associated with an object design for a type or class of objects, or more specifically a physical design (e.g., physical shape) and/or visual design for the type or class of objects. In such instances, the computing system 1100 may determine the one or more robot interaction locations based on the physical design associated with the object type determined in step 4014. As an example, the object (e.g., 3722) may be a container, and the one or more robot interaction locations may be a plurality of grip locations at which the container is to be gripped, picked up, or otherwise engaged by a robot (e.g., 3300), or more specifically by an end effector apparatus (e.g., 3500). In such an example, the plurality of grip locations may be determined based on the physical design (e.g., physical shape) associated with the object type.

In an embodiment, the one or more robot interaction locations may be determined based on the selected object recognition template and/or based on the selected model-orientation combination discussed above, such as the object recognition template $9128B_3$ and/or the model-orientation combination F of FIG. 15C. More specifically, the one or more robot interaction locations may be determined based on an object structure model included in the object recognition template and/or in the model-orientation combination.

Figure 17A:
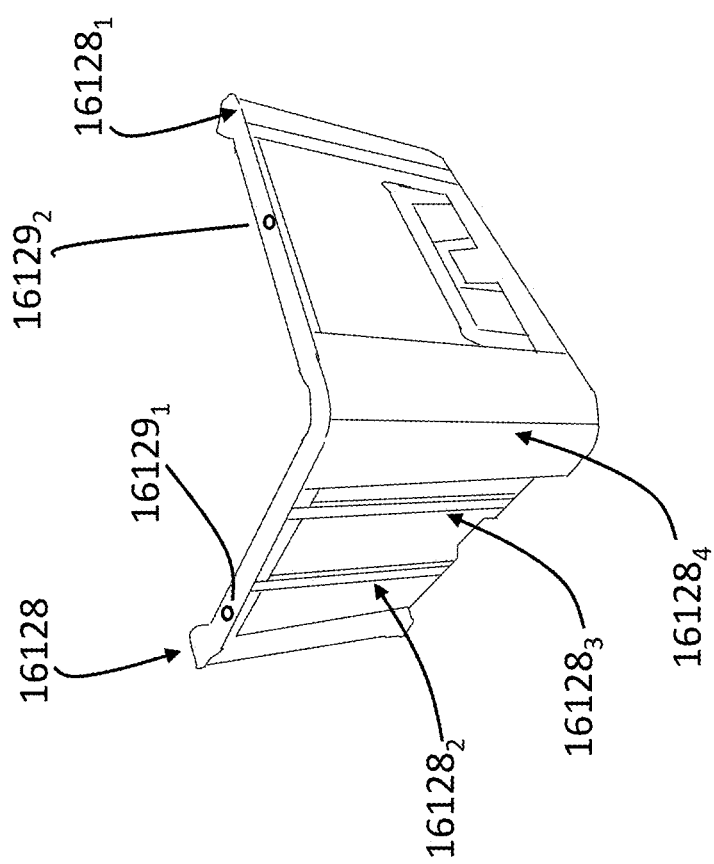
FIGS. 17A-17D illustrate various aspects of determining robot gripping locations, according to an embodiment hereof.

In an embodiment, the object structure model may already include or otherwise identify one or more robot grip locations. For example, FIG. 17A illustrates an object recognition template 16128 having an object structure model that identifies robot grip locations $16129_1$ and $16129_2$. In this example, the object structure model may be a container structure model, which may describe a physical structure associated with a container type. More specifically, the container structure model in FIG. 17A may be associated with a type or class of containers which has a physical feature $16128_1$ that is a container rim. In other words, the container structure model may describe a container rim structure. In this example, the robot grip locations $16129_1$ and $16129_2$ may be locations along the container rim structure. The container structure model in FIG. 17A may further describe other physical features $16128_2$, $16128_3$, and $16128_4$, which may be a first ridge or other protrusion, a second ridge or other protrusion, and a corner, respectively.

Figure 17B:
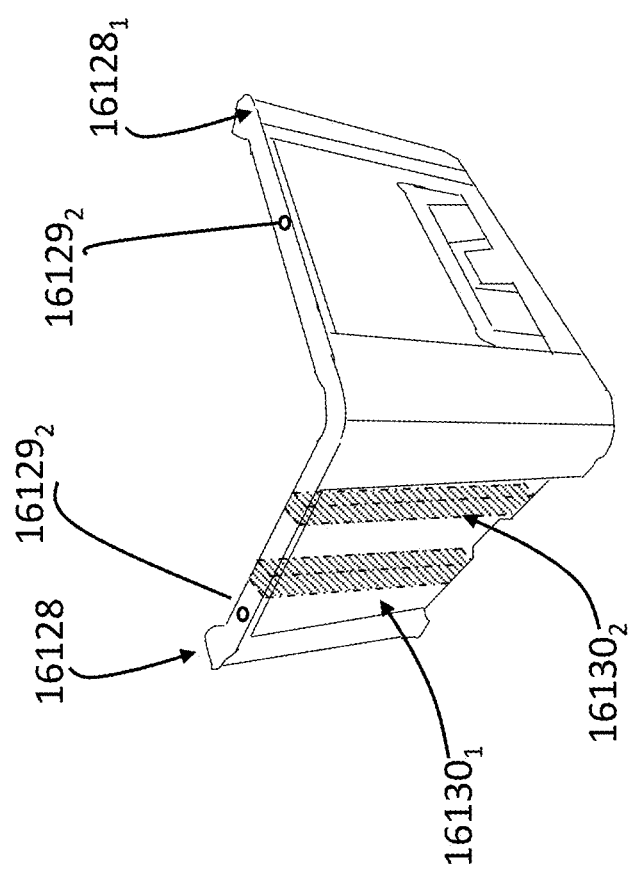

In an embodiment, the object structure model of a selected object recognition template or selected model-orientation combination may identify regions which may have a physical feature that may interfere with robot gripping. For example, FIG. 17B illustrates an example in which the object structure model of the object recognition template 16128 identifies a first region $16130_1$ (e.g., rectangular region) that represents a space around the first ridge ($16128_2$) of FIG. 17A, and identifies a second region $16130_2$ that represents a space around the second ridge ($16128_3$). In this example, if gripping a container represented by the object recognition template 16128 involves moving gripper fingers of an end effector apparatus (e.g., 3500) toward the container's rim so that the gripper fingers can clamp around the rim, the first ridge and the second ridge may interfere with that movement because they may block the gripper fingers from an inward direction. Thus, if the gripping locations are near the first ridge or the second ridge, the gripper fingers may be unable to achieve a grip at those locations, or may be able to achieve only a shallow grip at those locations. Thus, the container structure model in FIG. 17B may identify the first region $16130_1$ and the second region $16130_2$, which surround the first ridge and the second ridge, so that the computing system 1100 may avoid determining gripping locations that are in the regions $16130_1$, $16130_2$.

In such scenarios, the computing system 1100 may determine the plurality of grip locations (also referred to as gripping locations) based on the container rim structure, such as the container rim structure described by the object recognition template 16128. In some implementations, this determination may involve determining overhang distances at different locations along the container rim, wherein a large overhang distance at a particular location may indicate that a deep or stable grip is likely achievable at that location, while a small overhang distance at a particular location may indicate that only a shallow grip is likely at that location. More particularly, the computing system 1100 may determine a plurality of overhang distances associated with a plurality of respective locations along the container rim structure, such as the rim structure for the container rim 16128 in FIGS. 17A and 17B. In this example, each overhang distance of the plurality of overhang distances may be a distance by which a robot arm (e.g., 3400), or more specifically an end effector apparatus (e.g., 3500) or a gripper finger thereof, is able to extend under the container rim structure in an inward direction toward the container structure. For instance, the overhang distance associated with a particular location along the rim structure may indicate how far a lower gripper finger of the end effector apparatus, if the gripper finger is at that location along the rim structure, is able to extend in the inward direction toward the container. In some instances, the determination of the overhang distances may be part of a simulation in which the computing system 1100 simulates the robot arm (e.g., 3400) sliding the end effector apparatus (e.g., 3500) or portions thereof to different locations along the rim structure. In this embodiment, the computing system may select the plurality of grip locations from among the plurality of respective locations along the container rim structure based on the plurality of overhang distances. For example, the plurality of grip locations may be locations having the maximum overhang distances, or more generally some of the highest overhang distances. In some scenarios, a higher overhang distance for a particular location along a rim structure may indicate that a wider portion of the rim structure can be engaged by the end effector apparatus (e.g., 3500) at that location, which may facilitate a deeper or more stable grip at the location.

In an embodiment, the computing system 1100 may determine whether the object (e.g., 3722) in the camera field of view (e.g., 3202) has a container lid, and may determine the one or more robot interaction locations (e.g., grip locations) based on whether the object has the container lid. For instance, the computing system 1100 may determine whether the first image information of step 4002, the second image information of step 4010, and/or the updated sensed structure information indicates presence of a container lid. The computing system 1100 may determine a plurality of grip locations based on it detects presence of a container lid.

Figure 17C:
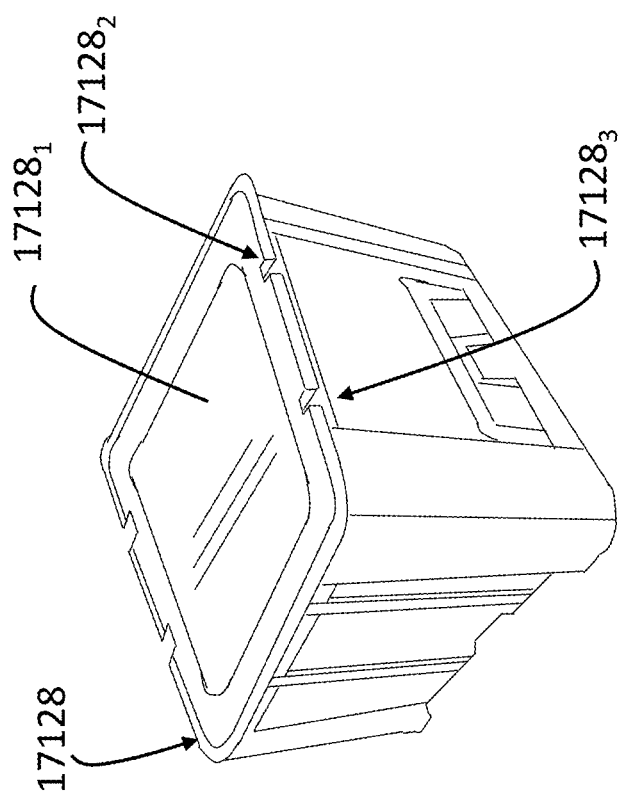
Figure 17D:
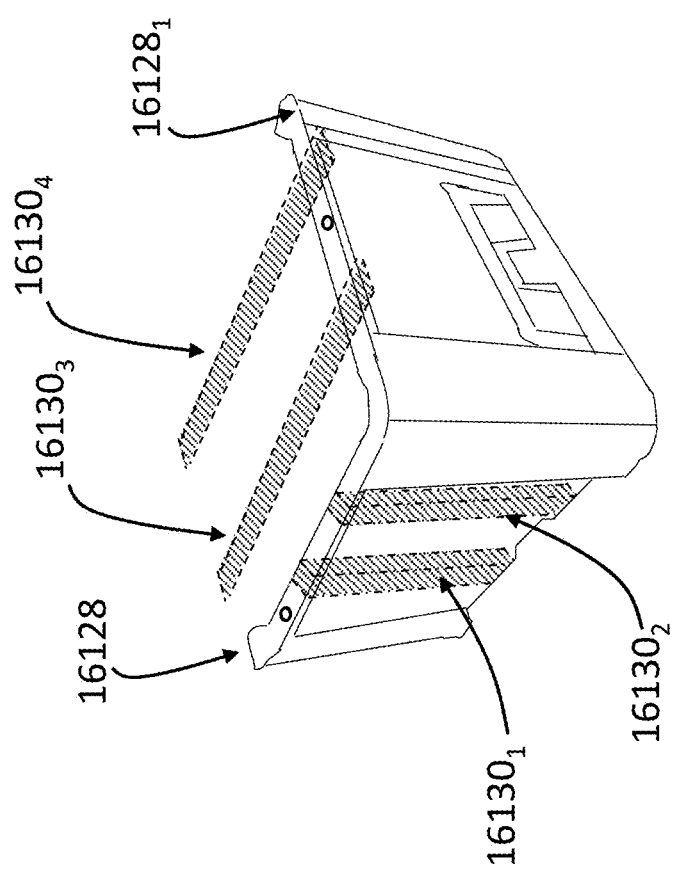

In an embodiment, if the selected object recognition template may include a container structure model for describing at least a container lid structure, the computing system 1100 may determine the plurality of grip locations based on the container lid structure. For example, FIG. 17C illustrates an object recognition template 17128 which may include a container structure model that identifies presence of a lid $17128_1$. The container structure model in this example may further identify features in the container lid structure, such as gaps $17128_2$ and $17128_3$ that may interfere with gripping with grip locations are near the gaps $17128_2$ and $17128_3$. Thus, the computing system 1100 may in an embodiment use the object recognition template 17128 to avoid determining grip locations which are near the gaps $17128_2$ and $17128_3$. FIG. 17D provides an example in which the gaps $17128_2$ and $17128_3$ of the lid structure may be represented by regions $16130_3$ and $16130_4$. More specifically, the regions $16130_3$ and $16130_4$ may encompass the gaps $17128_2$ and $17128_3$. In this example, the computing system 1100 may determine the grip locations in a manner such that the grip locations are not within the regions 16130₃ and 16130₄.

In an embodiment, if a selected object recognition template or model-orientation combination includes an object structure model represents a container structure which is rotationally symmetric, or more specifically has 4-fold rotational symmetry, the computing system 1100 may use the symmetry to simplify the determination of multiple grip locations. For instance, the computing system may determine a first grip location based on the object structure model. Because the container structure is rotationally symmetric, the computing system 1100 may determine a second grip location based on the first grip location. For example, the computing system 1100 may determine that the first grip location has a first distance from a corner of the container structure, wherein the first grip location is on a first side of the container structure. The computing system 1100 in this example may determine the second grip location as a location which is on a second side of the container structure, and which has the same distance from the corner of the container structure. In the above examples, the 4-fold rotational symmetry or other rotational symmetry of a container structure may refer to rotational symmetry about a vertical rotational axis running through a center of the container structure, wherein the vertical rotational axis may be an axis that is perpendicular to a floor or ground.

In an embodiment, the method 4000 of FIG. 4 may further include a step in which the computing system 1000 causes the one or more robot interactions, which may be based on the grip locations or other robot interaction locations discussed above. For instance, the computing system 1100 may output one or more robot interaction movement commands for causing the interaction at the one or more robot interaction locations, wherein the one or more robot interaction movement commands may be generated based on the one or more robot interaction locations.

In an embodiment, an object structure that is rotationally symmetric, or that more specifically has 4-fold rotational symmetry, may affect how object registration is performed. The object registration may involve, e.g., generating a new object recognition template for an object or object structure which does not match any existing object recognition template. For instance, the computing system 1100 may perform the object registration when an additional object (e.g., a new container) is in the camera field of view, if the additional object does not match any existing object recognition template stored on the non-transitory computer-readable medium 1120 or 1600. The object registration may involve generating, based on the image information of the additional object, an additional object recognition template. If the additional object has a rotationally symmetric object structure, the computing system 1100 may generate the additional object recognition template based on one corner of the object structure for the additional object, without being based on remaining corners of the object structure for the additional object. More specifically, if the object structure of the additional object is rotationally symmetric, or more specifically has 4-fold rotational symmetry, the object structure may have corners that have substantially the same structure, and/or sides that have substantially the same structure. Thus, while the computing system 1100 may determine an object recognition template which directly describes one corner and one side of the object structure, it may be unnecessary for the additional object recognition template to further directly describe remaining corners or sides of the object structure, because they may have substantially the same structure as the corner or side described by the additional object recognition template.

Additional discussion of various embodiments:

Embodiment 1 relates to a computing system for performing object detection, or a method which may be performed by the computing system, such as when the computing system executes instructions on a non-transitory computer-readable medium. In this embodiment, the computing system comprises a communication interface and at least one processing circuit. The communication interface is configured to communicate with: (i) a robot having a robot arm and an end effector apparatus disposed at or forming one end of the robot arm, and (ii) a camera mounted on the robot arm and having a camera field of view. The at least one processing circuit is configured, when an object is in the camera field of view, to perform the following: receiving first image information that represents at least a first portion of an object structure associated with the object, wherein the first image information is generated by the camera when the camera is in a first camera pose in which the camera is pointed at the first portion of the object structure; generating or updating, based on the first image information, sensed structure information that represents the object structure associated with the object; identifying, based on the sensed structure information, an object corner associated with the object structure; outputting one or more camera placement movement commands which, when executed by the robot, causes the robot arm to move the camera to a second camera pose in which the camera is pointed at the object corner; receiving second image information for representing the object structure, wherein the second image information is generated by the camera while the camera is in the second camera pose; updating the sensed structure information based on the second image information to generate updated sensed structure information; determining, based on the updated sensed structure information, an object type associated with the object; determining one or more robot interaction locations based on the object type, wherein the one or more robot interaction locations are one or more locations for interaction between the end effector apparatus and the object; and output one or more robot interaction movement commands for causing the interaction at the one or more robot interaction locations, wherein the one or more robot interaction movement commands are generated based on the one or more robot interaction locations. In some instances, the computing system may omit the outputting of one or more robot interaction movement commands (which may be performed by another computing system).

Embodiment 2 includes the computing system of embodiment 1. In this embodiment, the at least one processing circuit is configured to determine the object type by: performing a comparison between the updated sensed structure information and a template candidate set, wherein the template candidate set is a set that includes object recognition templates which describe object structures associated with different object types; selecting, based on the comparison, an object recognition template from the template candidate set, such that the object recognition template is a selected object recognition template, wherein the selected object recognition template represents the object type associated with the object. In this embodiment, the at least one processing circuit is configured to determine the one or more robot interaction locations based on an object structure description associated with the selected object recognition template.

Embodiment 3 includes the computing system of embodiment 2. In this embodiment, the at least one processing circuit is configured to perform the comparison between the updated sensed structure information and the template candidate set by calculating a set of error values associated with the object recognition templates in the template candidate set, wherein each error value of the set of error values indicates a respective degree of deviation between (i) the updated sensed structure information and (ii) an object structure description included in an object recognition template associated with the error value, wherein the selected object recognition template is associated with a lowest error value among the set of error values.

Embodiment 4 includes the computing system of embodiment 3. In this embodiment, the updated sensed structure information is a point cloud that includes a plurality of coordinates for representing the object structure associated with the object, wherein the at least one processing circuit is configured, for each object recognition template of the template candidate set, to calculate at least one error value based on how closely coordinates from the plurality of coordinates of the point cloud match one or more physical features described by a respective object structure description included in the object recognition template.

Embodiment 5 includes the computing system of embodiment 3 or 4. In this embodiment, the object recognition templates in the template candidate set describe a set of object structure models, respectively. Further in this embodiment, the template candidate set is a model-orientation candidate set, which is a set that includes model-orientation combinations, wherein each model-orientation combination of the model-orientation candidate set is a combination of: (i) an object structure model that is one of the set of object structure models, and (ii) an orientation for the object structure model. Further in this embodiment, the set of error values are associated with the model-orientation combinations, respectively, of the model-orientation candidate set, wherein each error value of the set of error values indicates a respective degree of deviation between (i) the updated sensed structure information and (ii) an object structure model of a respective model-orientation combination associated with the error value, wherein the error value is further associated with the object structure model having an orientation of the respective model-orientation combination.

Embodiment 6 includes the computing system of embodiment 5. In this embodiment, the at least one processing circuit is configured to select the object recognition template by selecting, from the model-orientation candidate set, a model-orientation combination that includes an object structure model described by the selected object recognition template, wherein the model-orientation combination that is selected is associated with the lowest error value among the set of error values, and wherein the at least one processing circuit is configured to determine the one or more robot interaction locations based on the object structure model of the model-orientation combination that is selected, and based on an orientation of the model-orientation combination that is selected.

Embodiment 7 includes the computing system of embodiment 6. In this embodiment, the updated sensed structure information defines an estimated region occupied by the object structure for the object in the camera field of view, wherein the at least one processing circuit is configured, before calculating the set of error values associated with the model-orientation candidate set, to filter the model-orientation candidate set by performing the following for each model-orientation combination in the model-orientation candidate set: determining whether an object structure model of the model-orientation combination substantially fits within the estimated region when the object structure model has an orientation of the model-orientation combination, and in response to a determination that the object structure model does not substantially fit within the estimated region when the object structure model has the orientation of the model-orientation combination, removing the model-orientation combination from the model-orientation candidate set, wherein the set of error values are calculated based on model-orientation combinations which remain in the model-orientation candidate set after the model-orientation candidate set is filtered.

Embodiment 8 includes the computing system of any one of embodiments 3-7. In this embodiment, the updated sensed structure information defines an estimated region occupied by the object structure, wherein the object recognition templates in the template candidate set describe a set of object structure models, respectively. In this embodiment, the at least one processing circuit is configured, before calculating the set of error values associated with the object recognition templates in the template candidate set, to filter the template candidate set by: identifying one or more object recognition templates which include one or more respective object structure models that do not substantially fit within the estimated region, and removing the one or more object recognition templates from the template candidate set, and wherein the set of error values are calculated based on object recognition templates which remain in the template candidate set after the template candidate set is filtered.

Embodiment 9 includes the computing system of any one of embodiments 2-8. In this embodiment, the at least one processing circuit is configured, for at least one object recognition template of the template candidate set, to adjust a respective object structure description included in the object recognition template based on the updated sensed structure information.

Embodiment 10 includes the computing system of embodiment 9. In this embodiment, the respective object structure description of the at least one object recognition template describes a physical feature of a respective object structure described by the at least one object recognition template, and wherein the respective object structure description further includes pose information that describes a pose of the physical feature, and wherein the at least one processing circuit is configured to adjust the pose information based on the updated sensed structure information to increase a degree by which the physical feature described by the at least one object recognition template matches the updated sensed structure information.

Embodiment 11 includes the computing system of any one of embodiments 1-10. In this embodiment, the at least one processing circuit is configured, when the object is a container and when the object structure is a container structure, to determine the one or more robot interaction locations as a plurality of grip locations associated with gripping the container, such that the plurality of grip locations are determined based on the object type, the object type being a container type associated with the container.

Embodiment 12 includes the computing system of embodiment 11. In this embodiment, the at least one processing circuit is configured, when the container structure includes a plurality of ridges protruding from a side surface of the container structure, to detect the plurality of ridges based on the second image information or the updated sensed structure information, such that the plurality of ridges are detected ridges on the side surface of the container structure, wherein the container type associated with the container is determined based on the detected ridges on the side surface of the container structure.

Embodiment 13 includes the computing system of embodiment 11 or 12. In this embodiment, the at least one processing circuit is configured to determine the container type by: performing a comparison between the updated sensed structure information and a template candidate set, wherein the template candidate set is a set that includes object recognition templates which describe container structures associated with different container types; selecting, based on the comparison, an object recognition template from the template candidate set, such that the object recognition template is a selected object recognition template, wherein the selected object recognition template represents the container type associated with the container, wherein the at least one processing circuit is further configured, when the selected object recognition template includes a container structure model for describing at least a container rim structure, to determine the plurality of grip locations based on the container rim structure.

Embodiment 14 includes the computing system of any one of embodiments 11-13. In this embodiment, wherein the at least one processing circuit is configured to determine a plurality of overhang distances associated with a plurality of respective locations along the container rim structure, wherein each overhang distance of the plurality of overhang distances is a distance by which the end effector apparatus is able to extend under the container rim structure in an inward direction toward the container structure if the end effector apparatus is present at a respective location of the plurality of locations, wherein the at least one processing circuit is configured to select the plurality of grip locations from among the plurality of respective locations along the container rim structure based on the plurality of overhang distances.

Embodiment 15 includes the computing system of any one of embodiments 11-14. In this embodiment, the at least one processing circuit is configured to determine whether the first image information or the second image information indicates presence of a container lid, wherein the plurality of grip locations are determined further based on whether the first image information or the second image information indicates presence of the container lid.

Embodiment 16 includes the computing system of embodiment 15. In this embodiment, the at least one processing circuit is configured, when the selected object recognition template includes a container structure model for describing at least a container lid structure, to determine the plurality of grip locations based on the container lid structure.

Embodiment 17 includes the computing system of any one of embodiments 1-16. In this embodiment, the at least one processing circuit is configured, when an additional object is in the camera field of view and the additional object is rotationally symmetric, to: receive additional image information for representing an object structure for the additional object; and generate, based on the additional image information, an additional object recognition template for the set of object recognition templates, wherein the additional object recognition template is generated based on one corner of the object structure for the additional object, without being based on remaining corners of the object structure for the additional object.

Embodiment 18 includes the computing system of any one of embodiments 1-17, wherein the first image information is associated with the camera having a first distance from the object, and the second image information is associated with the camera having a second distance from the object that is less than the first distance.

Embodiment 19 includes the computing system of any one of embodiments 1-18, wherein the sensed structure information that is based on the first image information describes multiple object corners for the object structure, and wherein the at least one processing circuit is configured to identify the object corner by selecting the object corner from among the multiple object corners, the selecting being based on at least one of: (i) respective levels of accessibility to the multiple object corners for robot interaction with the robot arm, or (ii) respective levels of occlusion for sensing the multiple object corners by the camera.

It will be apparent to one of ordinary skill in the relevant arts that other suitable modifications and adaptations to the methods and applications described herein can be made without departing from the scope of any of the embodiments. The embodiments described above are illustrative examples and it should not be construed that the present invention is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single component, module, or unit for purposes of clarity, it should be understood that the features and functions described herein may be performed by any combination of components, units, or modules. Thus, various changes and modifications may be affected by one skilled in the art without departing from the spirit or scope of the invention as defined in the appended claims.

The invention claimed is:

1. A computing system comprising:
 a communication interface configured to communicate with: (i) a robot having a robot arm and an end effector apparatus disposed at or forming one end of the robot arm, and (ii) a camera mounted on the robot arm and having a camera field of view; and
 at least one processing circuit configured, when an object is in the camera field of view, to:
  receive first image information that represents at least a first portion of an object structure associated with the object, wherein the first image information is generated by the camera when the camera is in a first camera pose in which the camera is pointed at the first portion of the object structure;
  generate or update, based on the first image information, sensed structure information that represents the object structure associated with the object;
  identify, based on the sensed structure information, an object corner associated with the object structure;
  output, based on the sensed structure information gathered from the first image information received from the camera in the first camera pose, one or more camera placement movement commands which, when executed by the robot, causes the robot arm to move the camera to a second camera pose in which the camera is pointed at the object corner;
  receive second image information for representing the object structure, wherein the second image information is generated by the camera while the camera is in the second camera pose;

update the sensed structure information based on the second image information to generate updated sensed structure information;

determine, based on the updated sensed structure information, an object type associated with the object;

determine one or more robot interaction locations based on the object type, wherein the one or more robot interaction locations are one or more locations for interaction between the end effector apparatus and the object; and output one or more robot interaction movement commands for causing the interaction at the one or more robot interaction locations, wherein the one or more robot interaction movement commands are generated based on the one or more robot interaction locations.

2. The computing system of claim 1, wherein the at least one processing circuit is configured to determine the object type by:

performing a comparison between the updated sensed structure information and a template candidate set, wherein the template candidate set is a set that includes object recognition templates which describe object structures associated with different object types;

selecting, based on the comparison, an object recognition template from the template candidate set, such that the object recognition template is a selected object recognition template, wherein the selected object recognition template represents the object type associated with the object, wherein the at least one processing circuit is configured to determine the one or more robot interaction locations based on an object structure description associated with the selected object recognition template.

3. The computing system of claim 2, wherein the at least one processing circuit is configured to perform the comparison between the updated sensed structure information and the template candidate set by calculating a set of error values associated with the object recognition templates in the template candidate set, wherein each error value of the set of error values indicates a respective degree of deviation between (i) the updated sensed structure information and (ii) an object structure description included in an object recognition template associated with the error value, wherein the selected object recognition template is associated with a lowest error value among the set of error values.

4. The computing system of claim 3, wherein the updated sensed structure information is a point cloud that includes a plurality of coordinates for representing the object structure associated with the object, wherein the at least one processing circuit is configured, for each object recognition template of the template candidate set, to calculate at least one error value based on how closely coordinates from the plurality of coordinates of the point cloud match one or more physical features described by a respective object structure description included in the object recognition template.

5. The computing system of claim 3, wherein the object recognition templates in the template candidate set describe a set of object structure models, respectively, wherein the template candidate set is a model-orientation candidate set, which is a set that includes model-orientation combinations, wherein each model-orientation combination of the model-orientation candidate set is a combination of: (i) an object structure model that is one of the set of object structure models, and (ii) an orientation for the object structure model, wherein the set of error values are associated with the model-orientation combinations, respectively, of the model-orientation candidate set wherein each error value of the set of error values indicates a respective degree of deviation between (i) the updated sensed structure information and (ii) an object structure model of a respective model-orientation combination associated with the error value, wherein the error value is further associated with the object structure model having an orientation of the respective model-orientation combination.

6. The computing system of claim 5, wherein the at least one processing circuit is configured to select the object recognition template by selecting, from the model-orientation candidate set, a model-orientation combination that includes an object structure model described by the selected object recognition template, wherein the model-orientation combination that is selected is associated with the lowest error value among the set of error values, and wherein the at least one processing circuit is configured to determine the one or more robot interaction locations based on the object structure model of the model-orientation combination that is selected, and based on an orientation of the model-orientation combination that is selected.

7. The computing system of claim 6, wherein the updated sensed structure information defines an estimated region occupied by the object structure for the object in the camera field of view, wherein the at least one processing circuit is configured, before calculating the set of error values associated with the model-orientation candidate set, to filter the model-orientation candidate set by performing the following for each model-orientation combination in the model-orientation candidate set:

determining whether an object structure model of the model-orientation combination substantially fits within the estimated region when the object structure model has an orientation of the model-orientation combination, and in response to a determination that the object structure model does not substantially fit within the estimated region when the object structure model has the orientation of the model-orientation combination, removing the model-orientation combination from the model-orientation candidate set, wherein the set of error values are calculated based on model-orientation combinations which remain in the model-orientation candidate set after the model-orientation candidate set is filtered.

8. The computing system of claim 3, wherein the updated sensed structure information defines an estimated region occupied by the object structure, wherein the object recognition templates in the template candidate set describe a set of object structure models, respectively, wherein the at least one processing circuit is configured, before calculating the set of error values associated with the object recognition templates in the template candidate set, to filter the template candidate set by: identifying one or more object recognition templates which include one or more respective object structure models that do not substantially fit within the estimated region, and removing the one or more object recognition templates from the template candidate set, and wherein the set of error values associated are calculated based on object recognition templates which remain in the template candidate set after the template candidate set is filtered.

9. The computing system of claim 2, wherein the at least one processing circuit is configured, for at least one object recognition template of the template candidate set, to adjust a respective object structure description included in the object recognition template based on the updated sensed structure information.

10. The computing system of claim 9, wherein the respective object structure description of the at least one object recognition template describes a physical feature of a respective object structure described by the at least one object recognition template, and wherein the respective object structure description further includes pose information that describes a pose of the physical feature, and
wherein the at least one processing circuit is configured to adjust the pose information based on the updated sensed structure information to increase a degree by which the physical feature described by the at least one object recognition template matches the updated sensed structure information.

11. The computing system of claim 1, wherein the at least one processing circuit is configured, when the object is a container and when the object structure is a container structure, to determine the one or more robot interaction locations as a plurality of grip locations associated with gripping the container, such that the plurality of grip locations are determined based on the object type, the object type being a container type associated with the container.

12. The computing system of claim 11, wherein the at least one processing circuit is configured, when the container structure includes a plurality of ridges protruding from a side surface of the container structure, to detect the plurality of ridges based on the second image information or the updated sensed structure information, such that the plurality of ridges are detected ridges on the side surface of the container structure,
wherein the container type associated with the container is determined based on the detected ridges on the side surface of the container structure.

13. The computing system of claim 11, wherein the at least one processing circuit is configured to determine the container type by:
performing a comparison between the updated sensed structure information and a template candidate set, wherein the template candidate set is a set that includes object recognition templates which describe container structures associated with different container types;
selecting, based on the comparison, an object recognition template from the template candidate set, such that the object recognition template is a selected object recognition template, wherein the selected object recognition template represents the container type associated with the container,
wherein the at least one processing circuit is further configured, when the selected object recognition template includes a container structure model for describing at least a container rim structure, to determine the plurality of grip locations based on the container rim structure.

14. The computing system of claim 13, wherein the at least one processing circuit is configured to determine a plurality of overhang distances associated with a plurality of respective locations along the container rim structure, wherein each overhang distance of the plurality of overhang distances is a distance by which the end effector apparatus is able to extend under the container rim structure in an inward direction toward the container structure if the end effector apparatus is present at a respective location of the plurality of locations,
wherein the at least one processing circuit is configured to select the plurality of grip locations from among the plurality of respective locations along the container rim structure based on the plurality of overhang distances.

15. The computing system of claim 11, wherein the at least one processing circuit is configured to determine whether the first image information or the second image information indicates presence of a container lid, wherein the plurality of grip locations are determined further based on whether the first image information or the second image information indicates presence of the container lid.

16. The computing system of claim 15, wherein the at least one processing circuit is configured, when a selected object recognition template includes a container structure model for describing at least a container lid structure, to determine the plurality of grip locations based on the container lid structure.

17. The computing system of claim 2, wherein the at least one processing circuit is configured, when an additional object is in the camera field of view and the additional object is rotationally symmetric, to:
receive additional image information for representing an object structure for the additional object; and
generate, based on the additional image information, an additional object recognition template for the set of object recognition templates, wherein the additional object recognition template is generated based on one corner of the object structure for the additional object, without being based on remaining corners of the object structure for the additional object.

18. The computing system of claim 1, wherein the first image information is associated with the camera having a first distance from the object, and the second image information is associated with the camera having a second distance from the object that is less than the first distance.

19. A non-transitory computer-readable medium having instructions that, when executed by at least one processing circuit of a computing system, causes the at least one processing circuit to:
receive first image information at the computing system, wherein the computing system is configured to communicate with: (i) a robot having a robot arm and an end effector apparatus disposed at or forming one end of the robot arm, and (ii) a camera mounted on the robot arm and having a camera field of view, wherein the first image information is for representing at least a first portion of an object structure associated with the object, wherein the first image information is generated by the camera when the camera is in a first camera pose in which the camera is pointed at the first portion of the object structure;
generate or update, based on the first image information, sensed structure information that represents the object structure associated with the object;
identify, based on the sensed structure information, an object corner associated with the object structure;
output, based on the sensed structure information gathered from the first image information received from the camera in the first camera pose, one or more camera placement movement commands which, when executed by the robot, causes the robot arm to move the camera to a second camera pose in which the camera is pointed at the object corner;

receive second image information for representing the object structure, wherein the second image information is generated by the camera while the camera is in the second camera pose;

update the sensed structure information based on the second image information to generate updated sensed structure information;

determine, based on the updated sensed structure information, an object type associated with the object;

determine one or more robot interaction locations based on the object type, wherein the one or more robot interaction locations are for interaction between the end effector apparatus and the object; and output one or more robot interaction movement commands for causing the interaction at the one or more robot interaction locations, wherein the one or more robot interaction movement commands are generated based on the one or more robot interaction locations.

20. A method performed by a computing system, the method comprising:

receiving first image information at the computing system, wherein the computing system is configured to communicate with: (i) a robot having a robot arm and an end effector apparatus disposed at or forming one end of the robot arm, and (ii) a camera mounted on the robot arm and having a camera field of view, wherein the first image information is for representing at least a first portion of an object structure associated with the object, wherein the first image information is generated by the camera when the camera is in a first camera pose in which the camera is pointed at the first portion of the object structure;

generating or updating, based on the first image information, sensed structure information that represents the object structure associated with the object;

identifying, based on the sensed structure information, an object corner associated with the object structure;

outputting, based on the sensed structure information gathered from the first image information received from the camera in the first camera pose, one or more camera placement movement commands which, when executed by the robot, causes the robot arm to move the camera to a second camera pose in which the camera is pointed at the object corner;

receiving second image information for representing the object structure, wherein the second image information is generated by the camera while the camera is in the second camera pose;

updating the sensed structure information based on the second image information to generate updated sensed structure information;

determining, based on the updated sensed structure information, an object type associated with the object;

determining one or more robot interaction locations based on the object type, wherein the one or more robot interaction locations are for interaction between the end effector apparatus and the object; and outputting one or more robot interaction movement commands for causing the interaction at the one or more robot interaction locations, wherein the one or more robot interaction movement commands are generated based on the one or more robot interaction locations.

* * * * *